(12) United States Patent
Heffron et al.

(10) Patent No.: US 6,895,793 B2
(45) Date of Patent: May 24, 2005

(54) APPARATUS AND METHOD FOR ROLLING WORKPIECES

(75) Inventors: Allan J. Heffron, Longboat Key, FL (US); Earl O. Brechtelsbauer, Saginaw, MI (US); Marc D. St. Pierre, Saginaw, MI (US)

(73) Assignee: Ingersoll CM Systems LLC, Midland, MI (US)

( * ) Notice: Subject to any disclaimer, the term of this patent is extended or adjusted under 35 U.S.C. 154(b) by 0 days.

(21) Appl. No.: 09/990,182

(22) Filed: Nov. 21, 2001

(65) Prior Publication Data

US 2002/0083751 A1 Jul. 4, 2002

Related U.S. Application Data

(60) Provisional application No. 60/252,543, filed on Nov. 22, 2000.

(51) Int. Cl.⁷ .................................................. B21H 7/18
(52) U.S. Cl. ........................................................ 72/110
(58) Field of Search ............................... 72/110; 29/6.01

(56) References Cited

U.S. PATENT DOCUMENTS

| | | |
|---|---|---|
| 4,437,328 A | 3/1984 | Wittkopp et al. |
| 4,554,811 A | 11/1985 | Hayashi et al. |
| 4,559,798 A | 12/1985 | Hayashi et al. |
| 4,646,551 A | 3/1987 | Rut |
| 4,682,489 A | 7/1987 | Bauerle et al. |
| 4,801,226 A | 1/1989 | Gleason |
| 5,022,129 A | 6/1991 | Gentry |
| 5,493,761 A | 2/1996 | Bone |
| 5,575,167 A | 11/1996 | Gottschalk et al. |
| 5,931,069 A * | 8/1999 | Garnett et al. ............... 82/106 |
| 6,233,810 B1 | 5/2001 | Asbeck |

FOREIGN PATENT DOCUMENTS

| | | | |
|---|---|---|---|
| DE | 31 08 717 A1 | 9/1982 | |
| DE | 31 08 746 A1 | 9/1982 | |
| DE | 31 08 780 A1 | 9/1982 | |
| JP | 60-24319 | 2/1985 | |
| JP | 1 183364 | 7/1989 | |
| JP | 03221369 A * | 9/1991 | .......... B24B/39/04 |
| JP | 11042560 A * | 2/1999 | .......... B24B/39/04 |
| WO | WO 96/22169 | 7/1996 | |

* cited by examiner

Primary Examiner—Lowell A. Larson
(74) Attorney, Agent, or Firm—Fitch, Even, Tabin & Flannery

(57) ABSTRACT

There is provided a new and improved apparatus and method for rolling workpieces such as crankshafts. The apparatus has first and second rolling heads mounted at spaced positions along a common rolling arm to receive a crankshaft bearing therebetween which can then be shifted relative to one another along the common rolling arm to close the heads or rolling tools for clamping onto the workpiece. The in-line clamping action and force provided by the tools on the rolling arm are created by actuation of a tall, thin cylinder assembly including a number of aligned individual cylinders sized to keep the width of the cylinder assembly to a minimum so that all of the rolling arms can likewise be of a thin construction pivotally mounted on one side of the crankshaft and axially spaced according to the crankshaft bearing spacing for rolling all of the bearings in a single rolling operation. A strain sensor can be utilized to generate clamping force readouts that are based on the amount of structural deflection of the arm detected by the sensor.

22 Claims, 38 Drawing Sheets

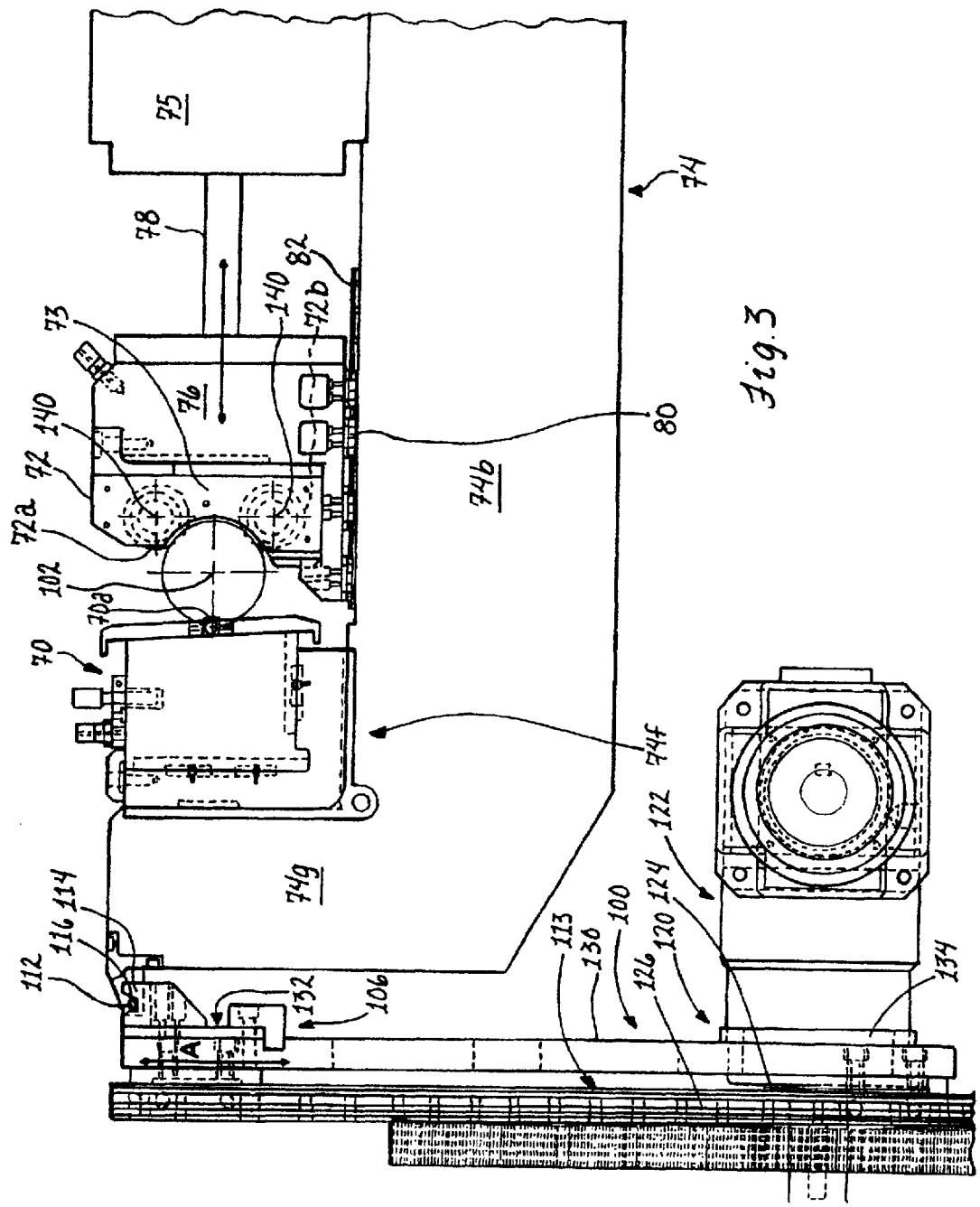

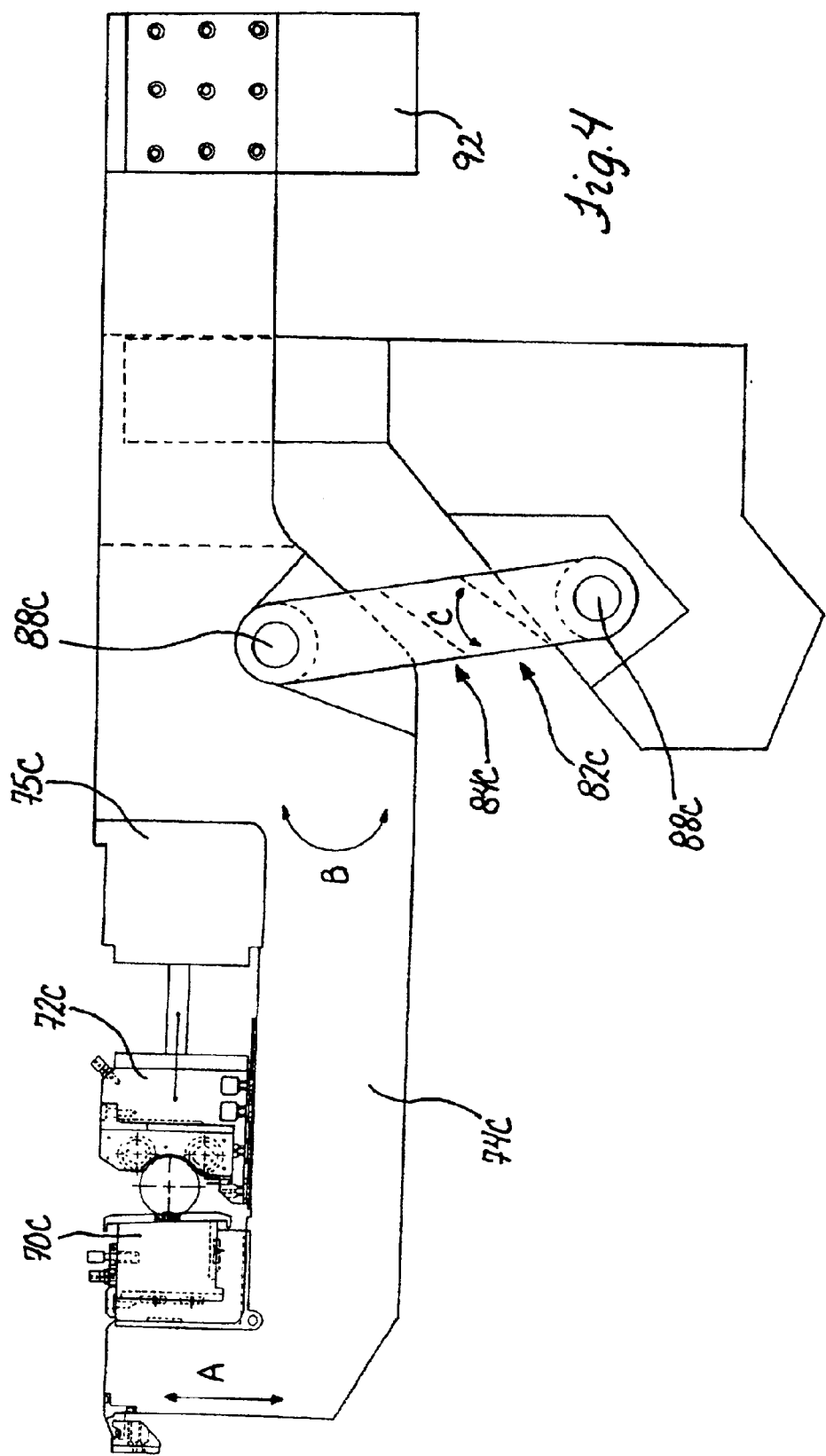

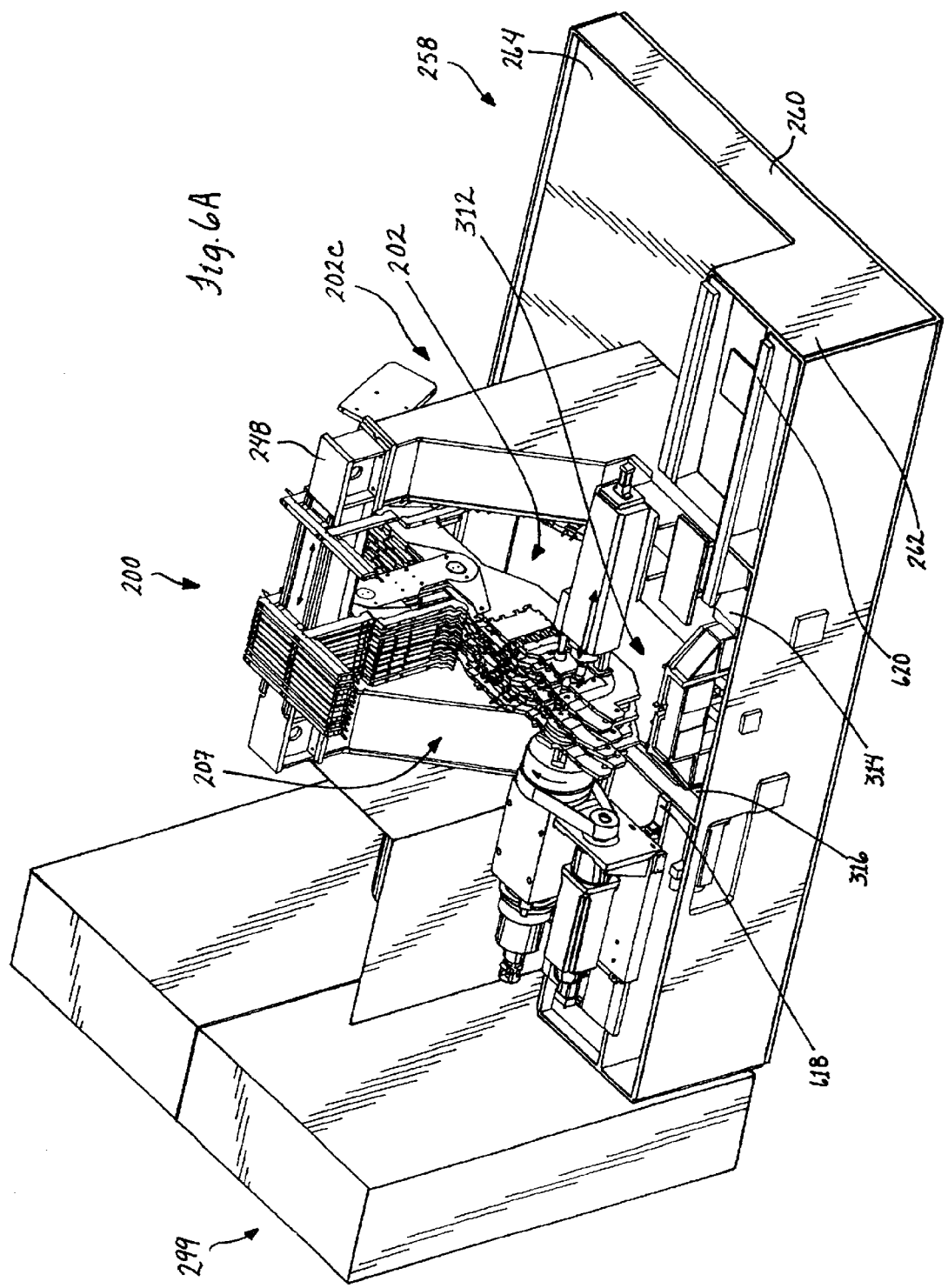

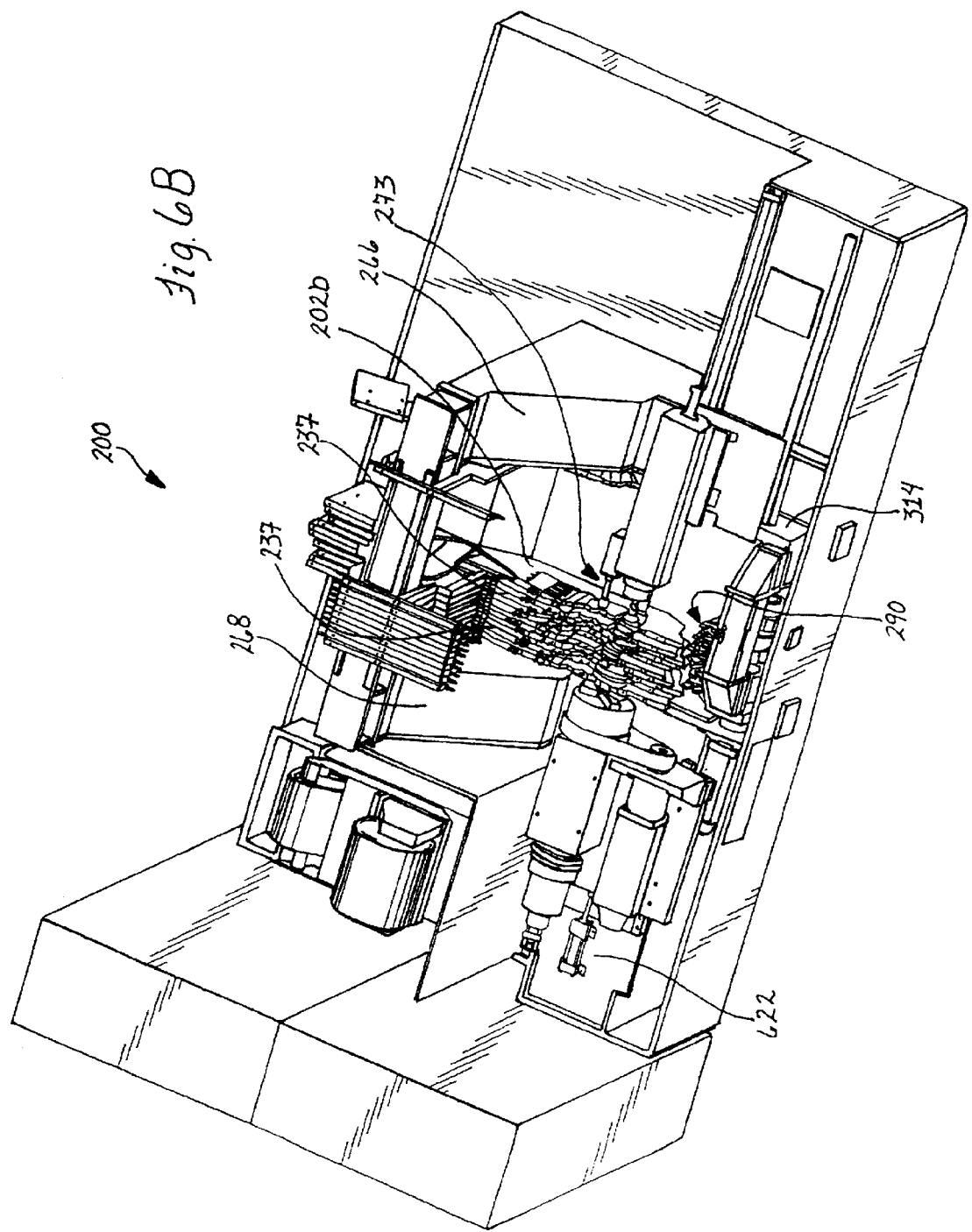

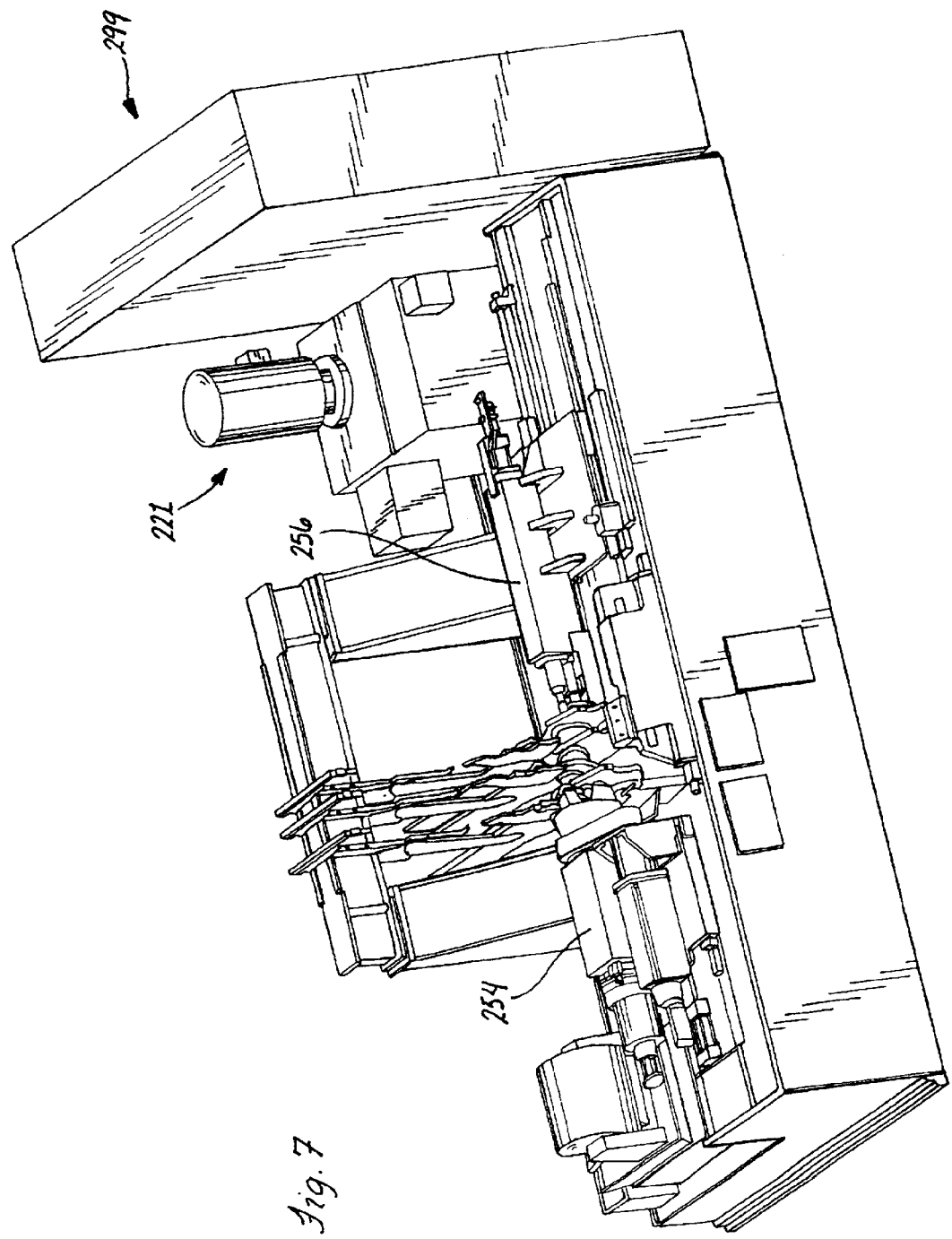

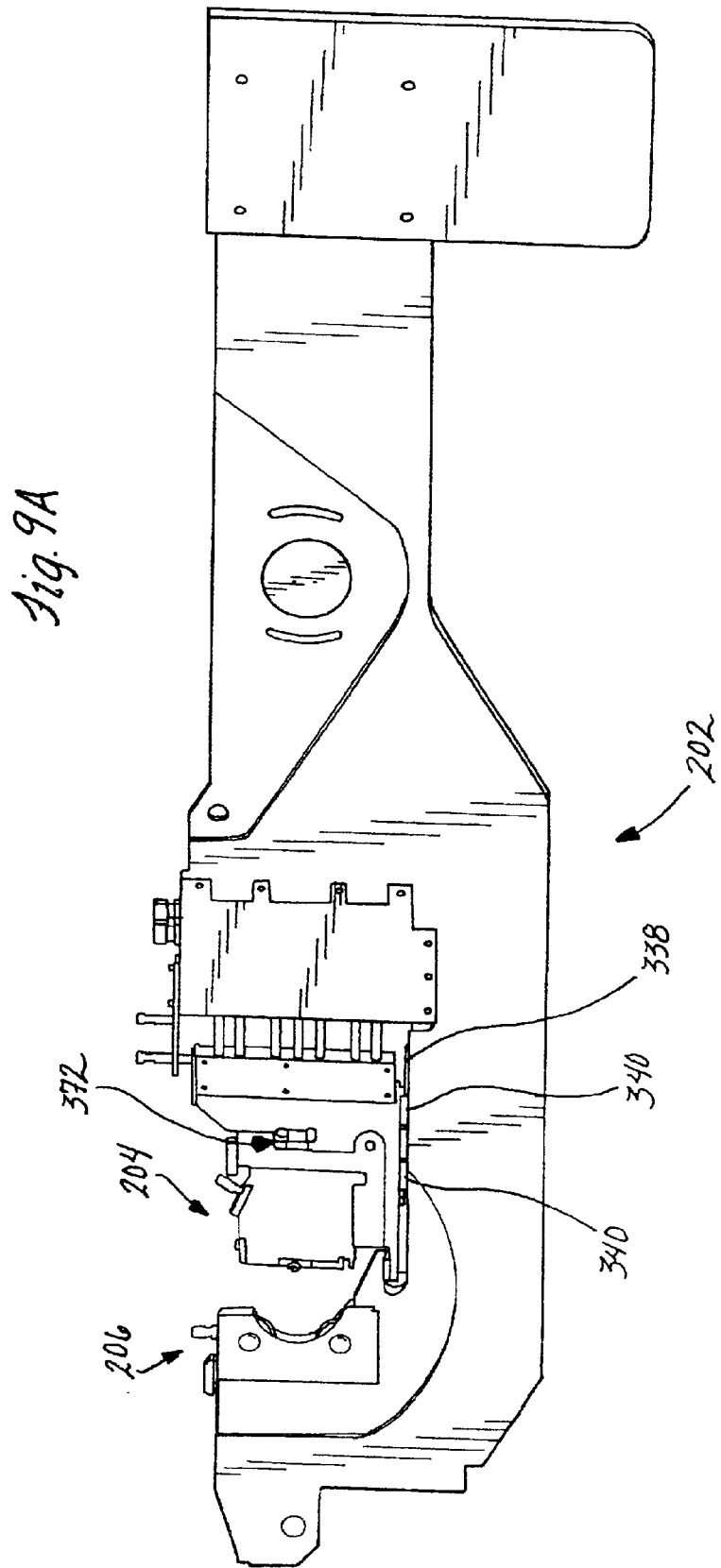

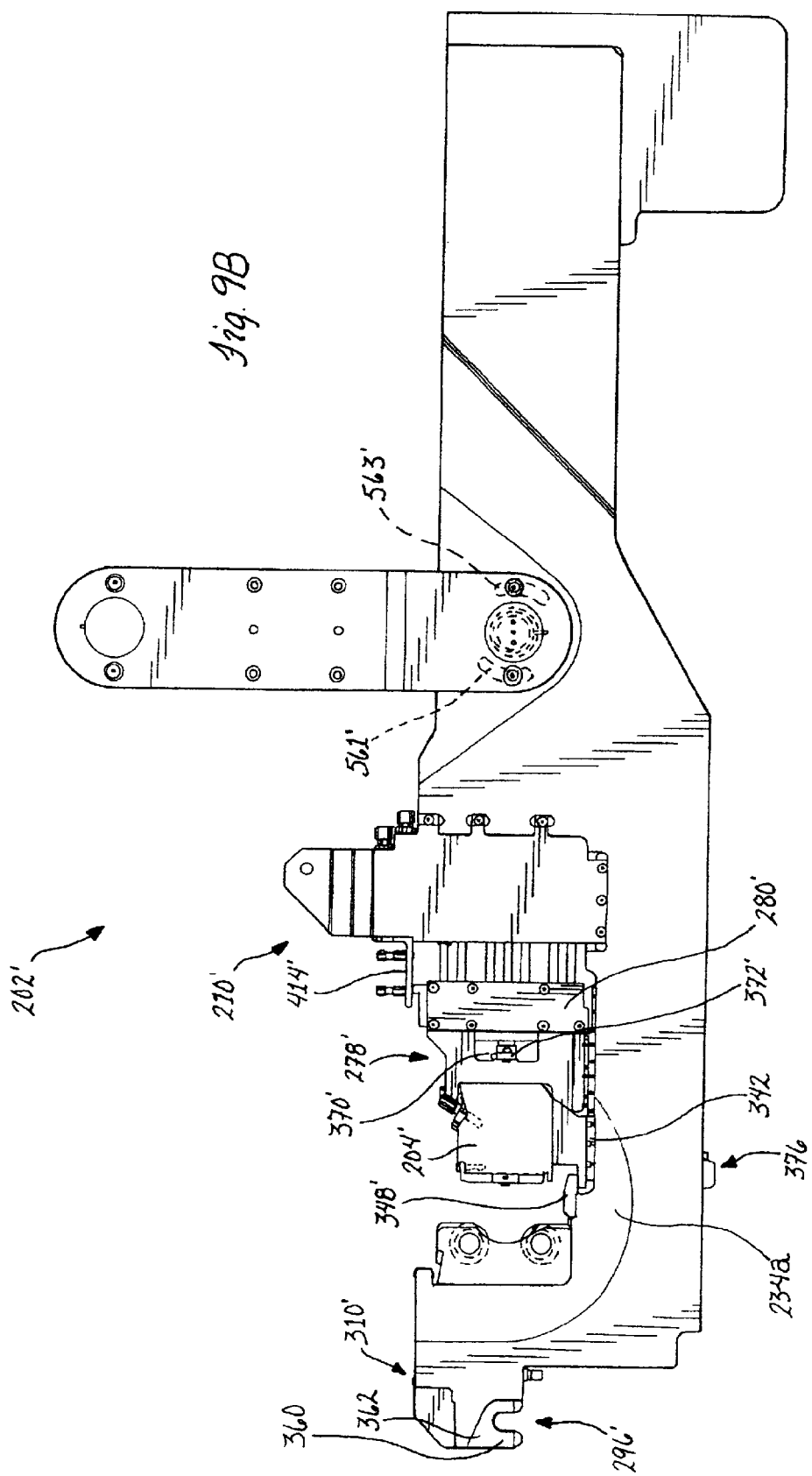

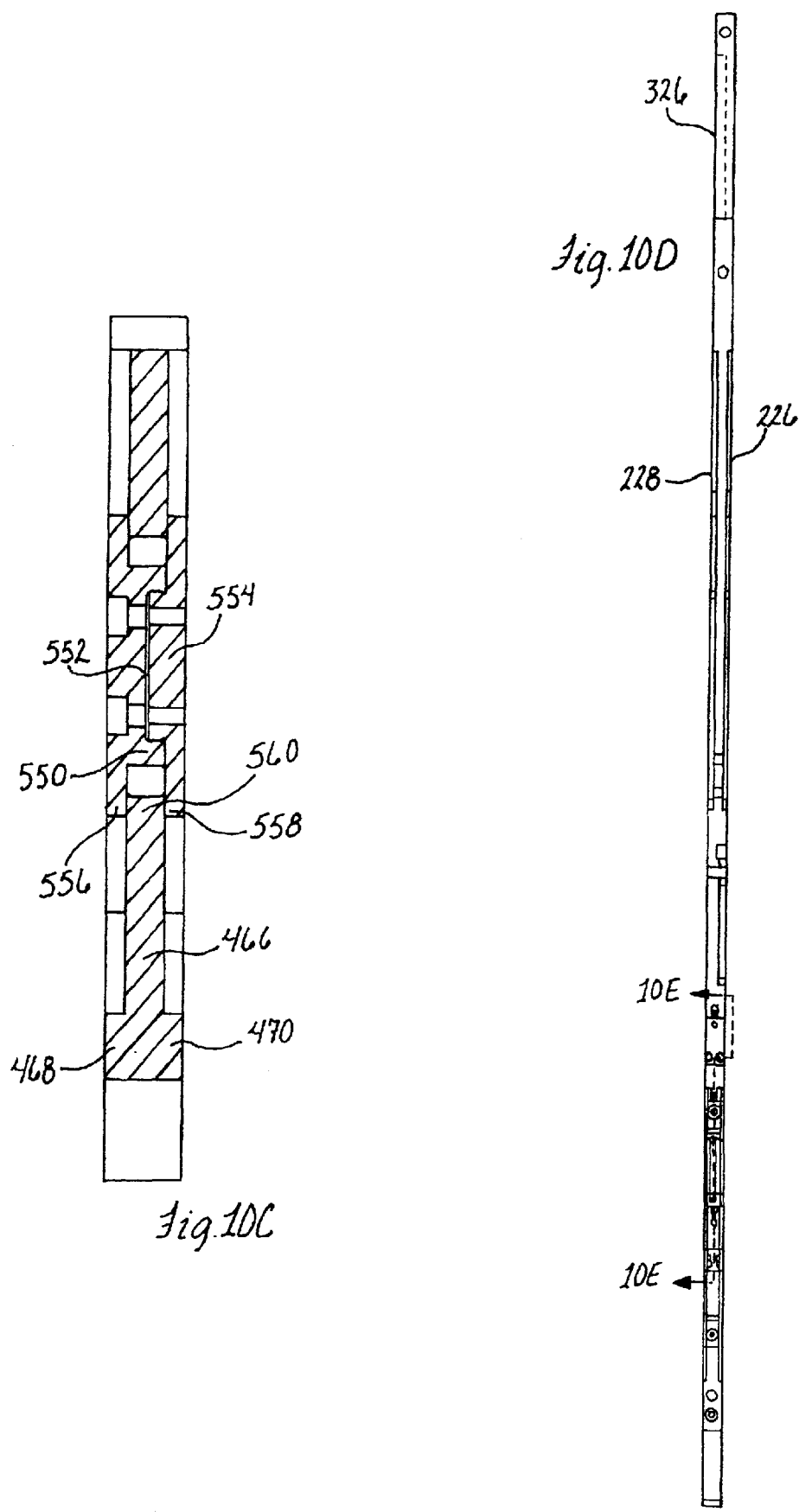

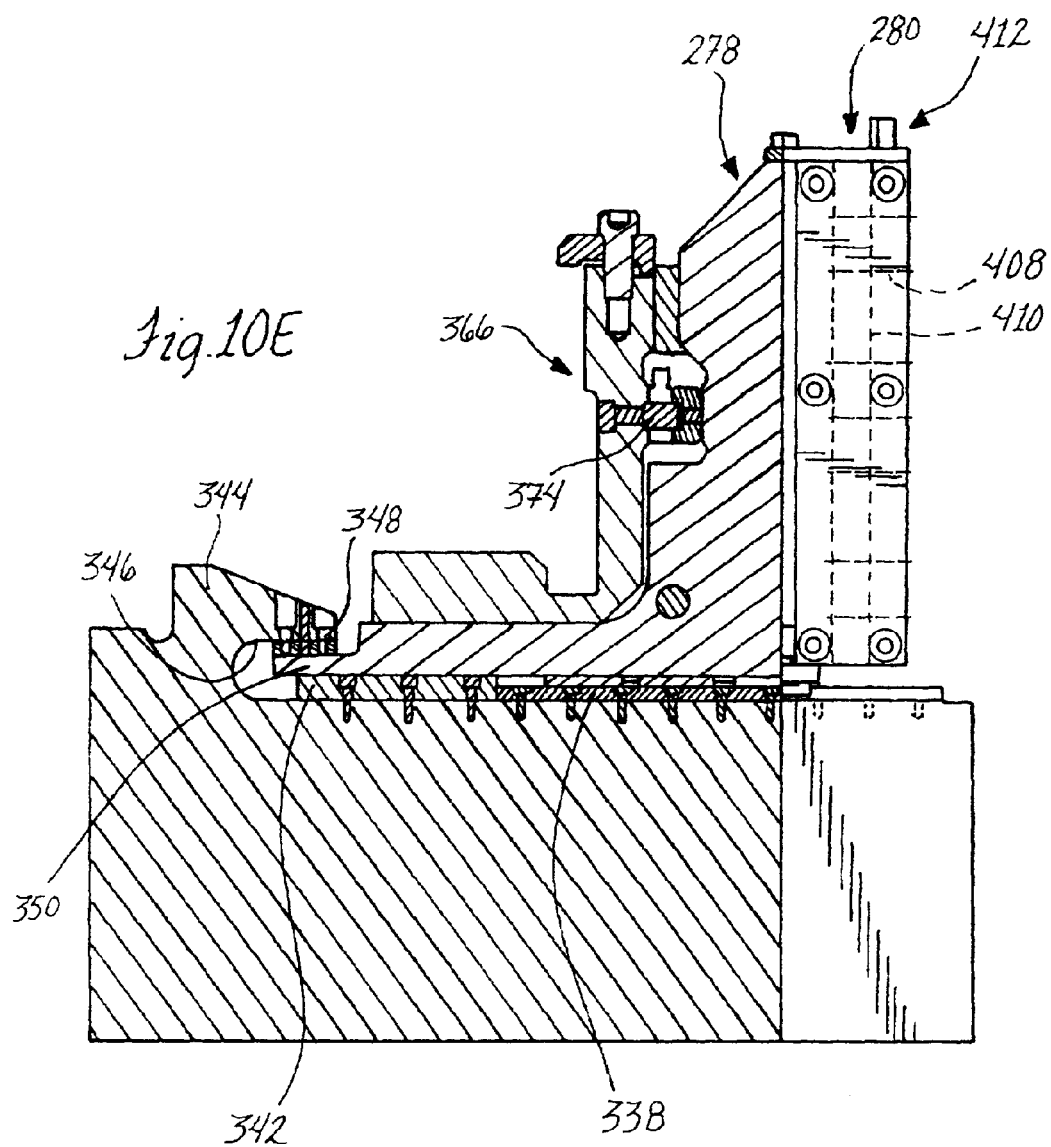

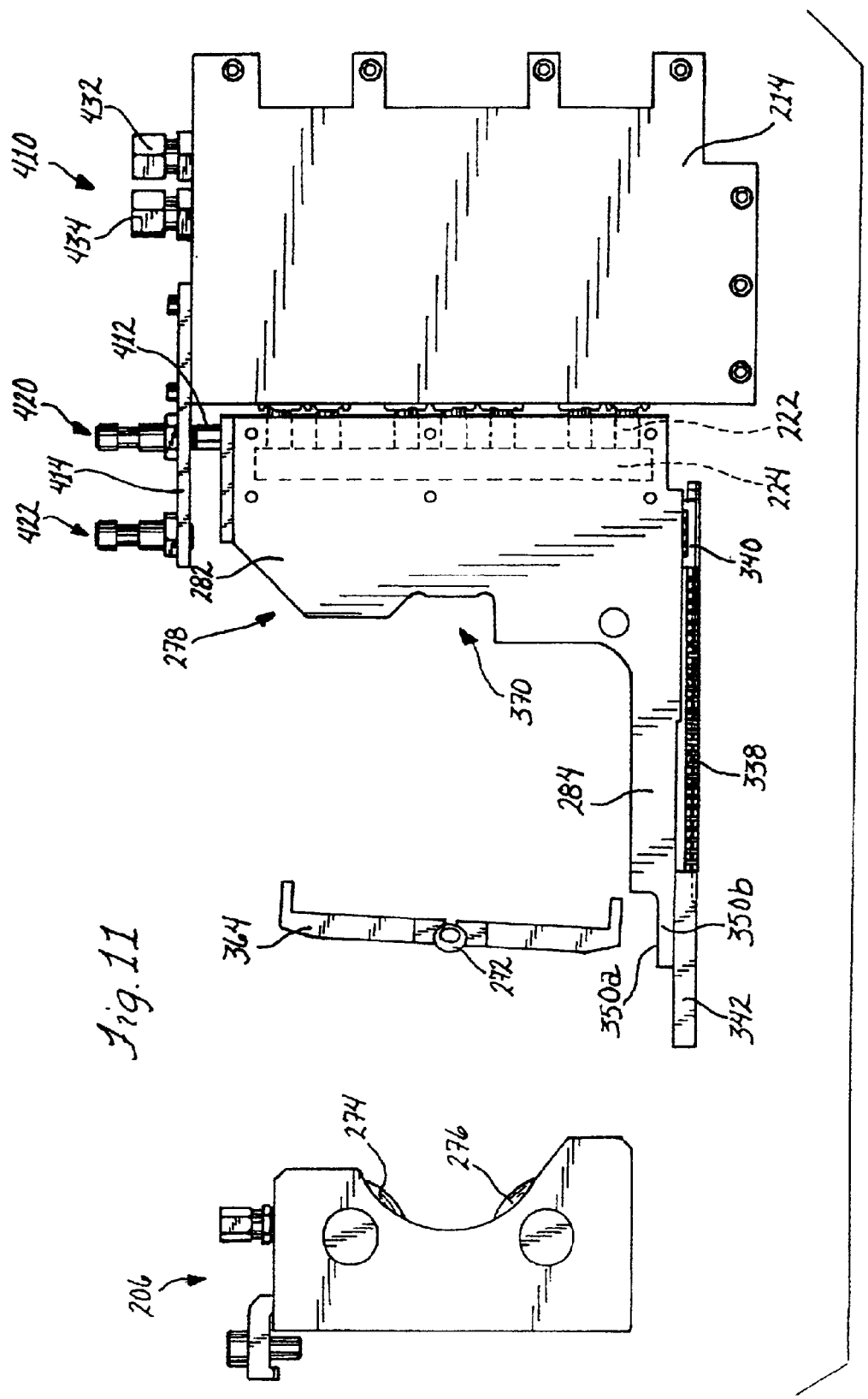

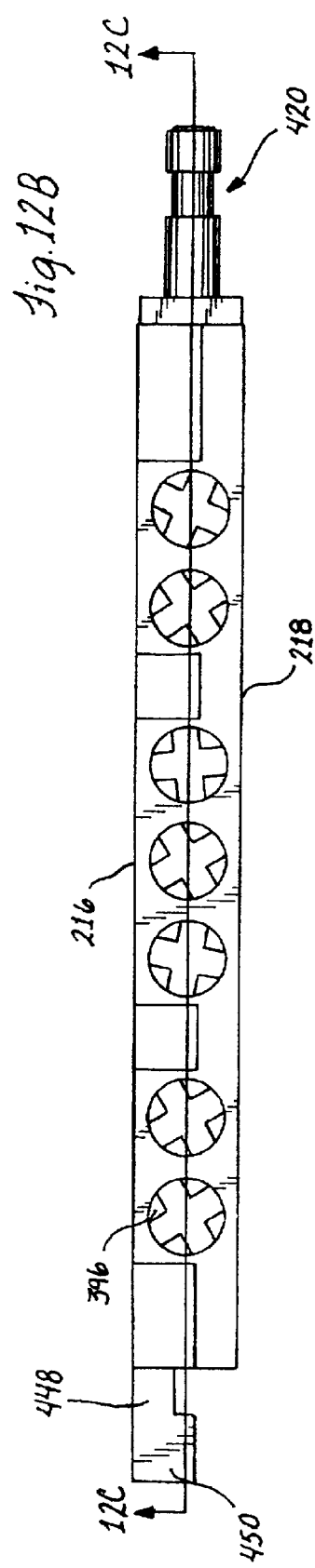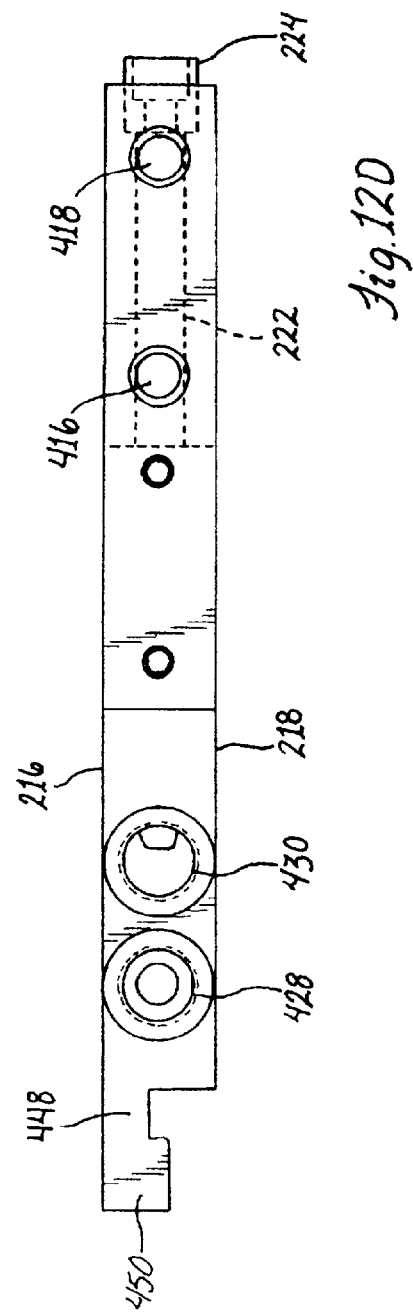

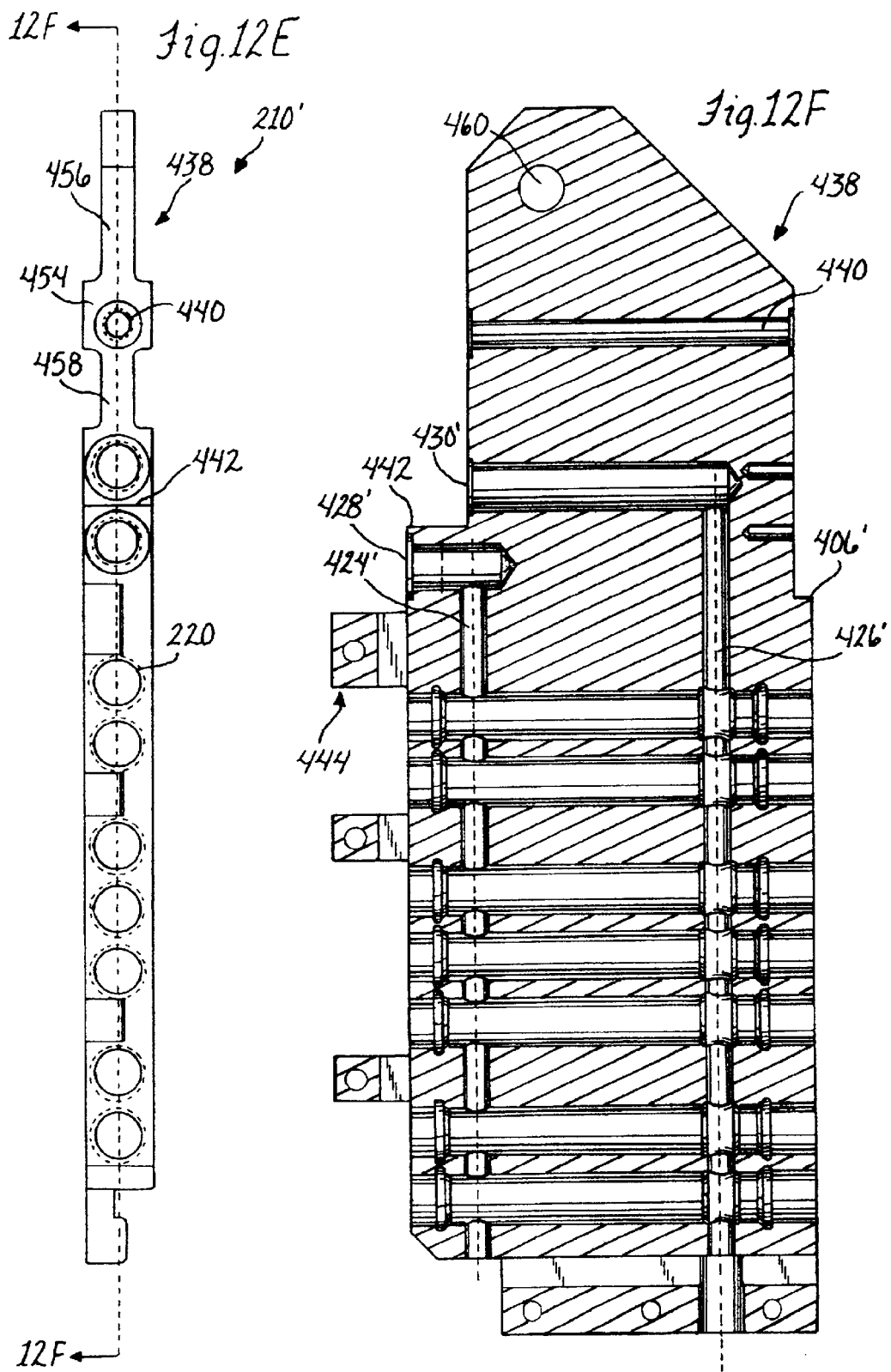

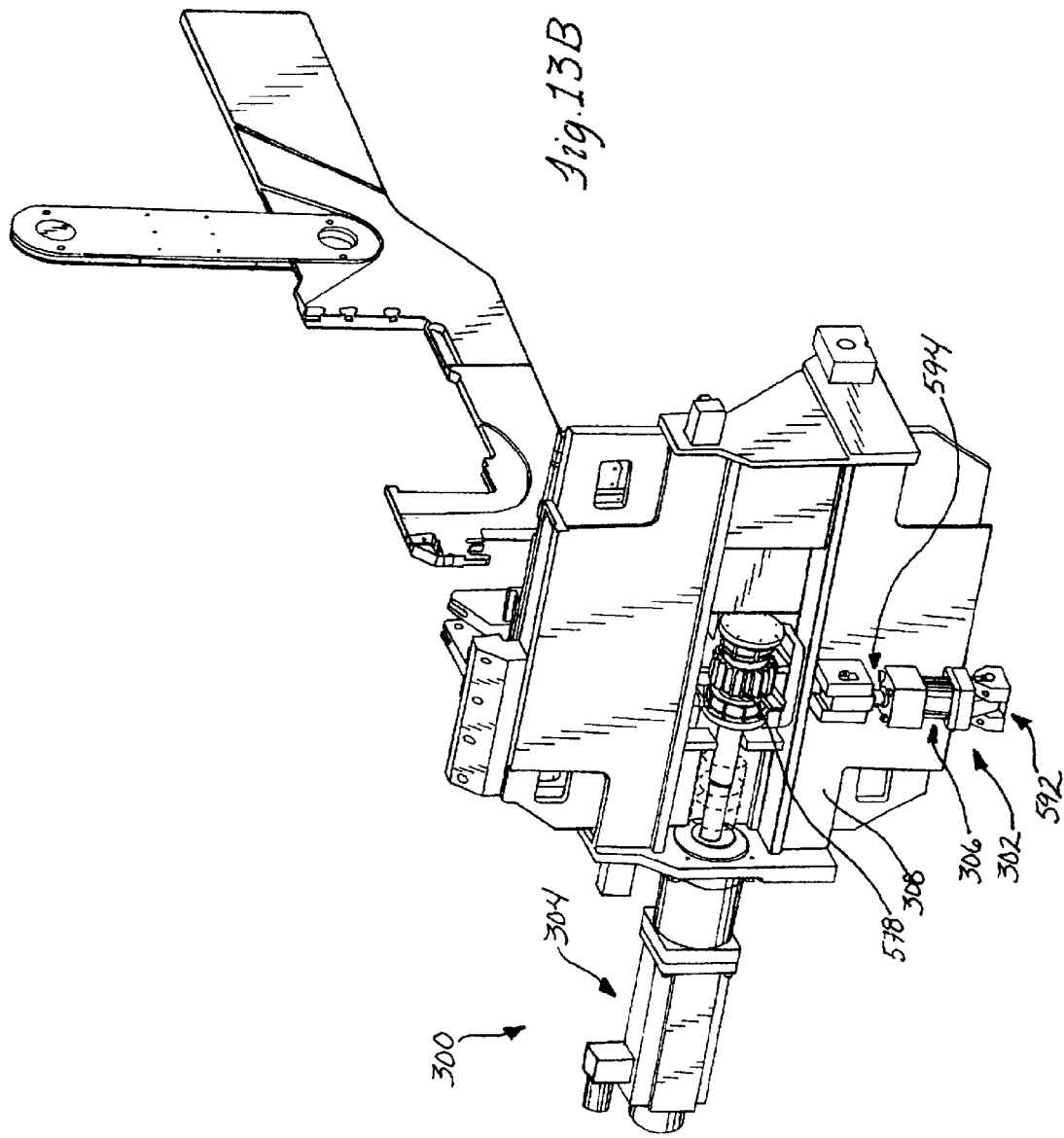

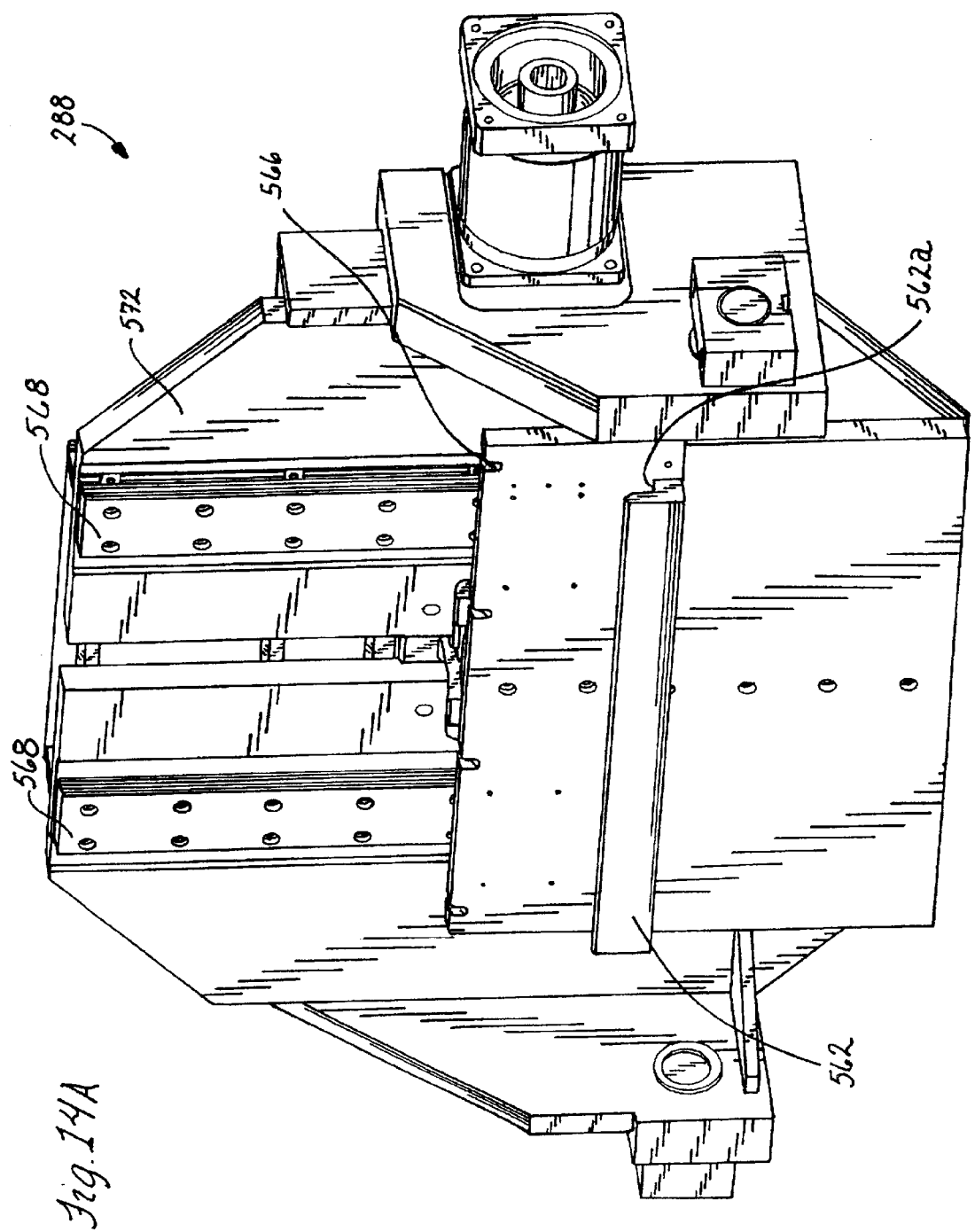

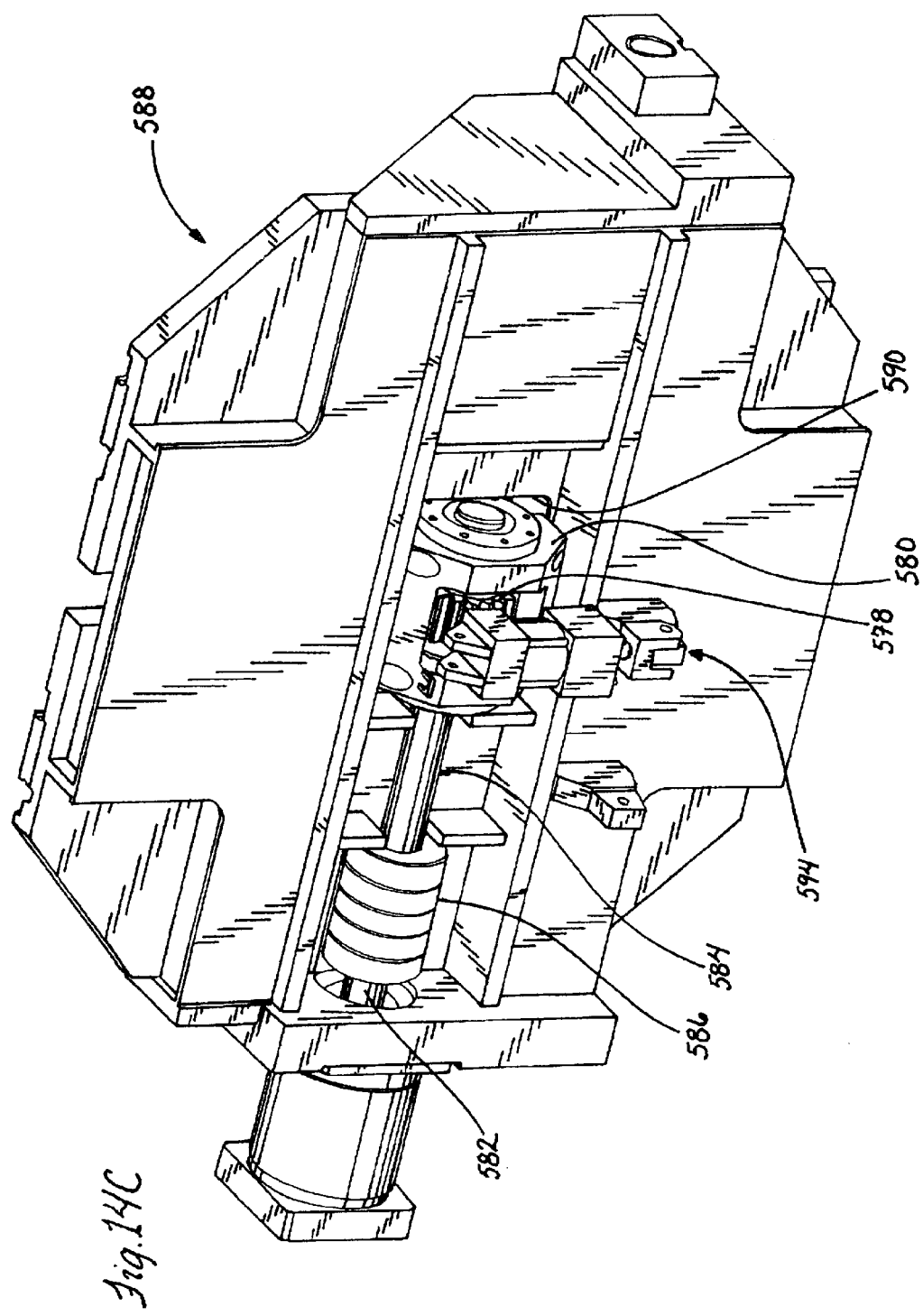

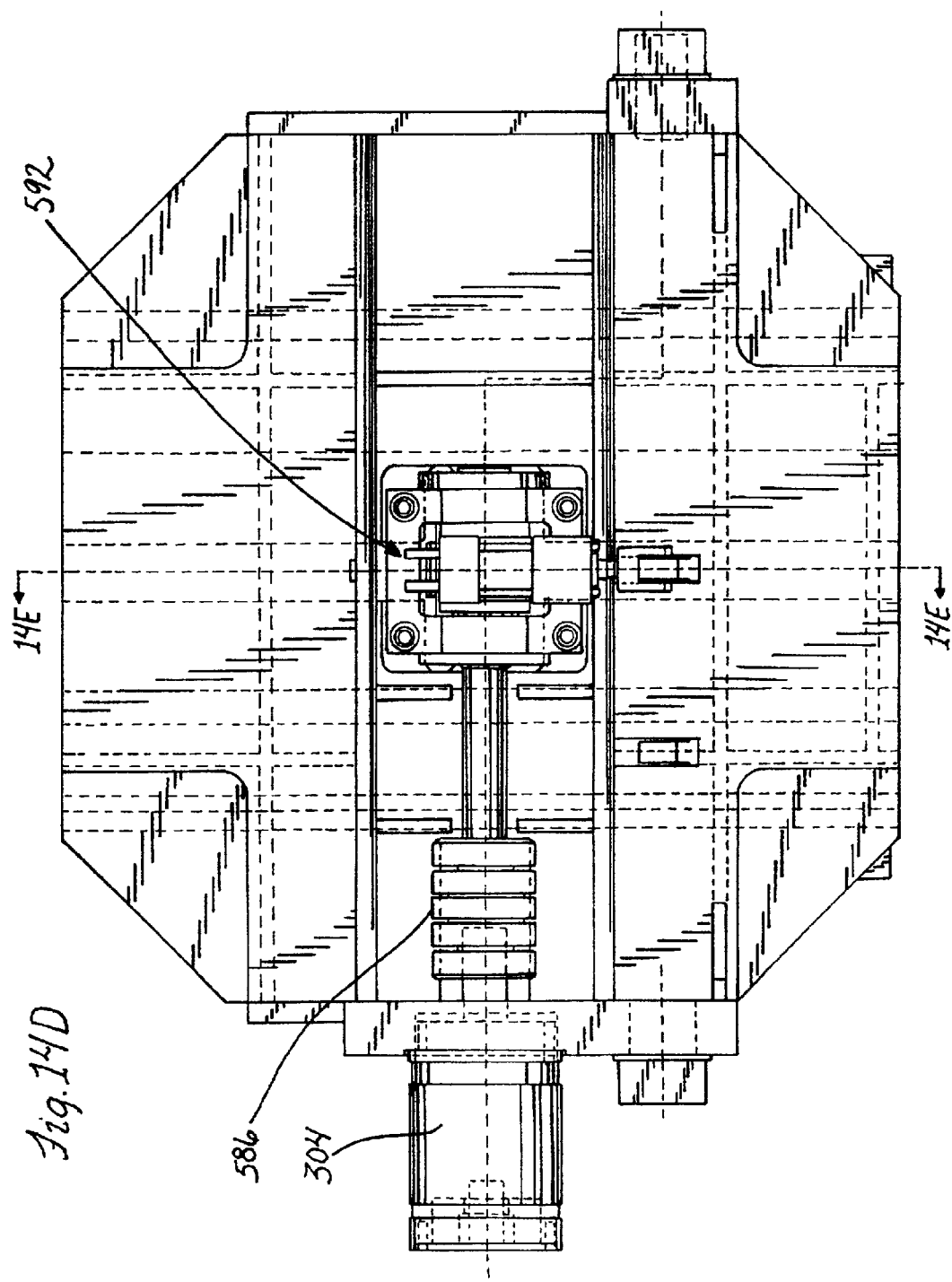

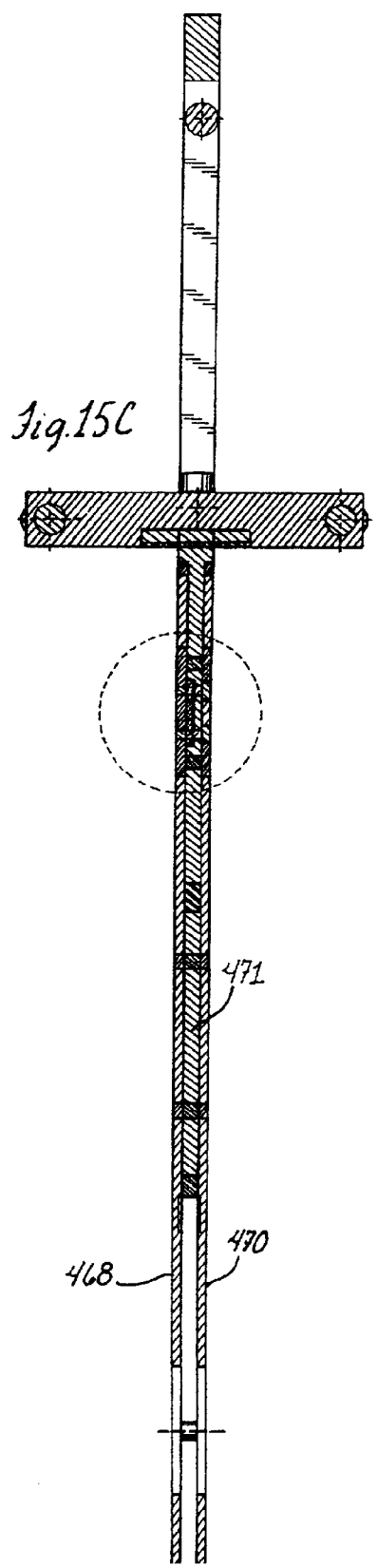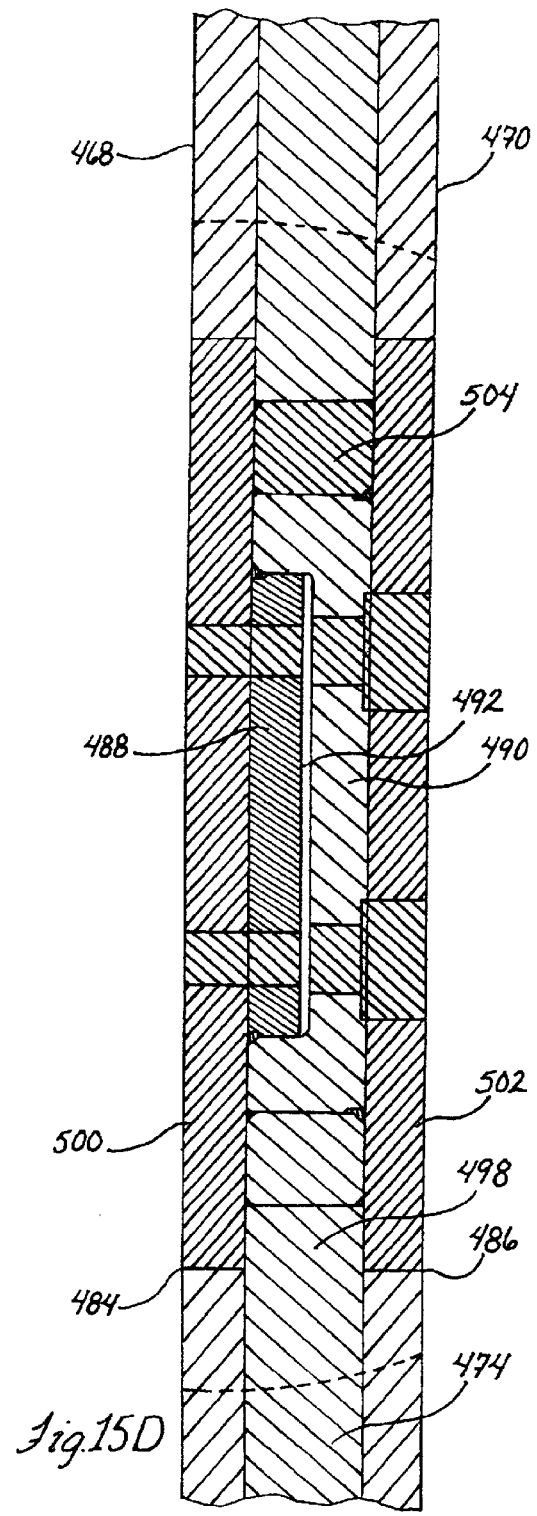

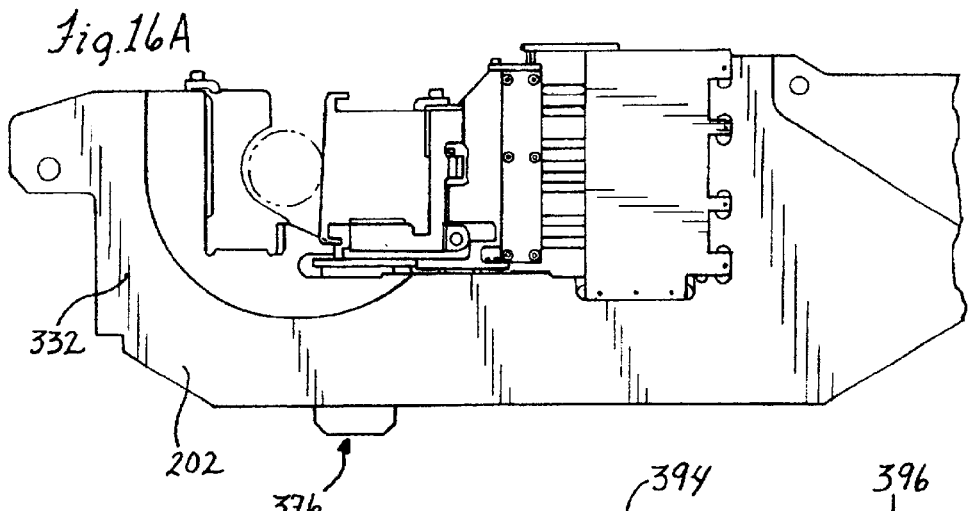
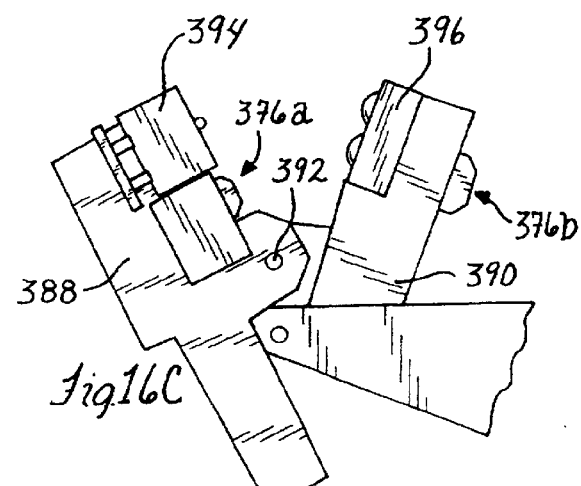
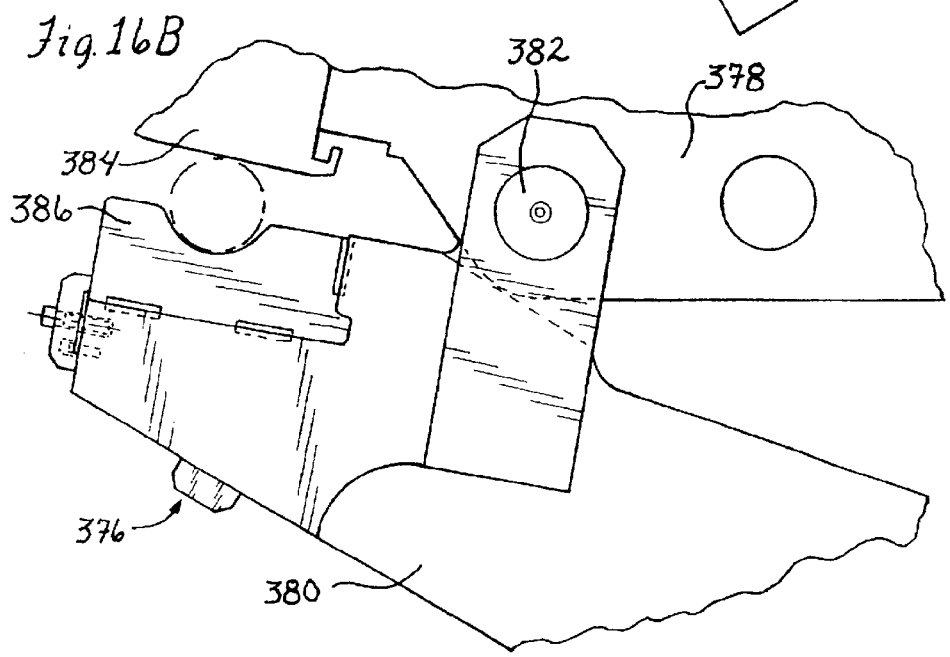

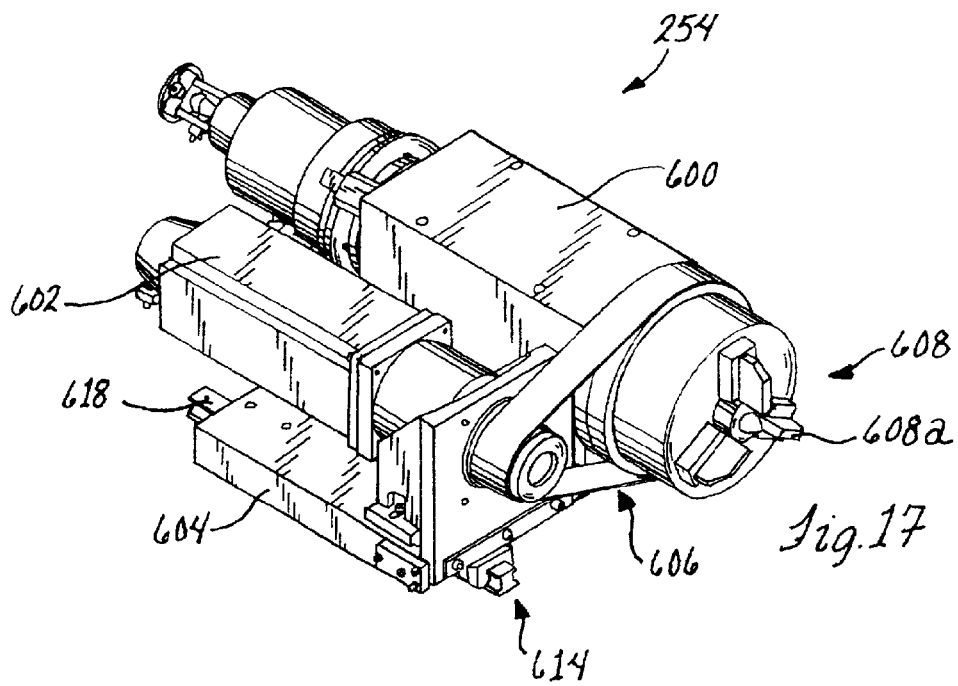
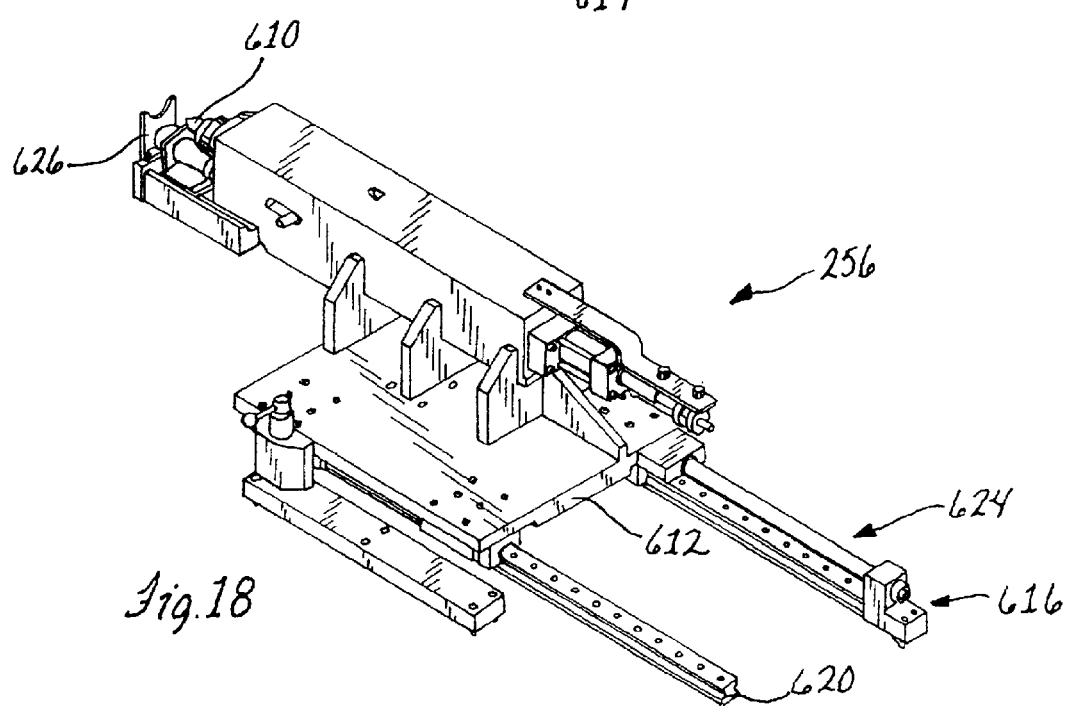

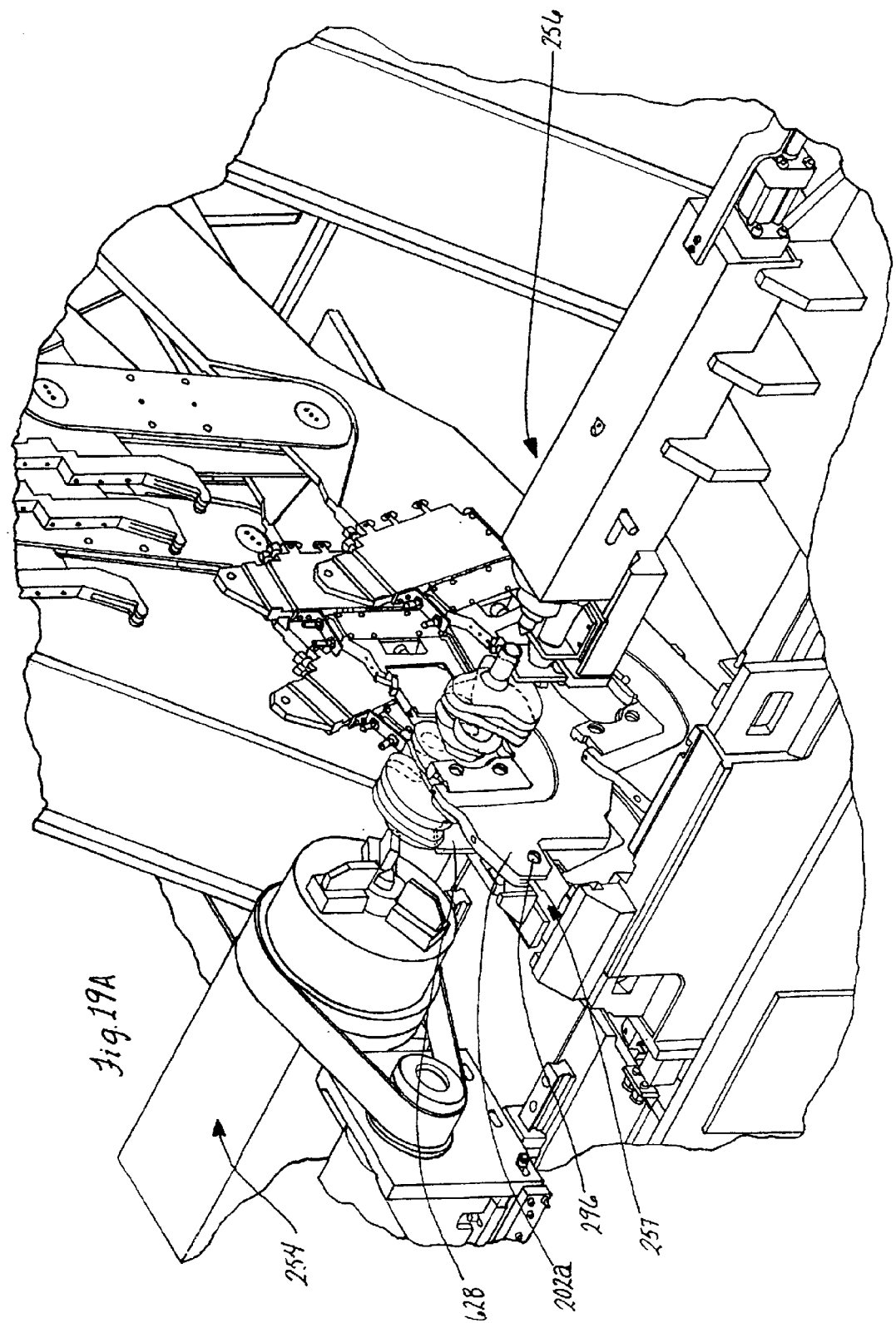

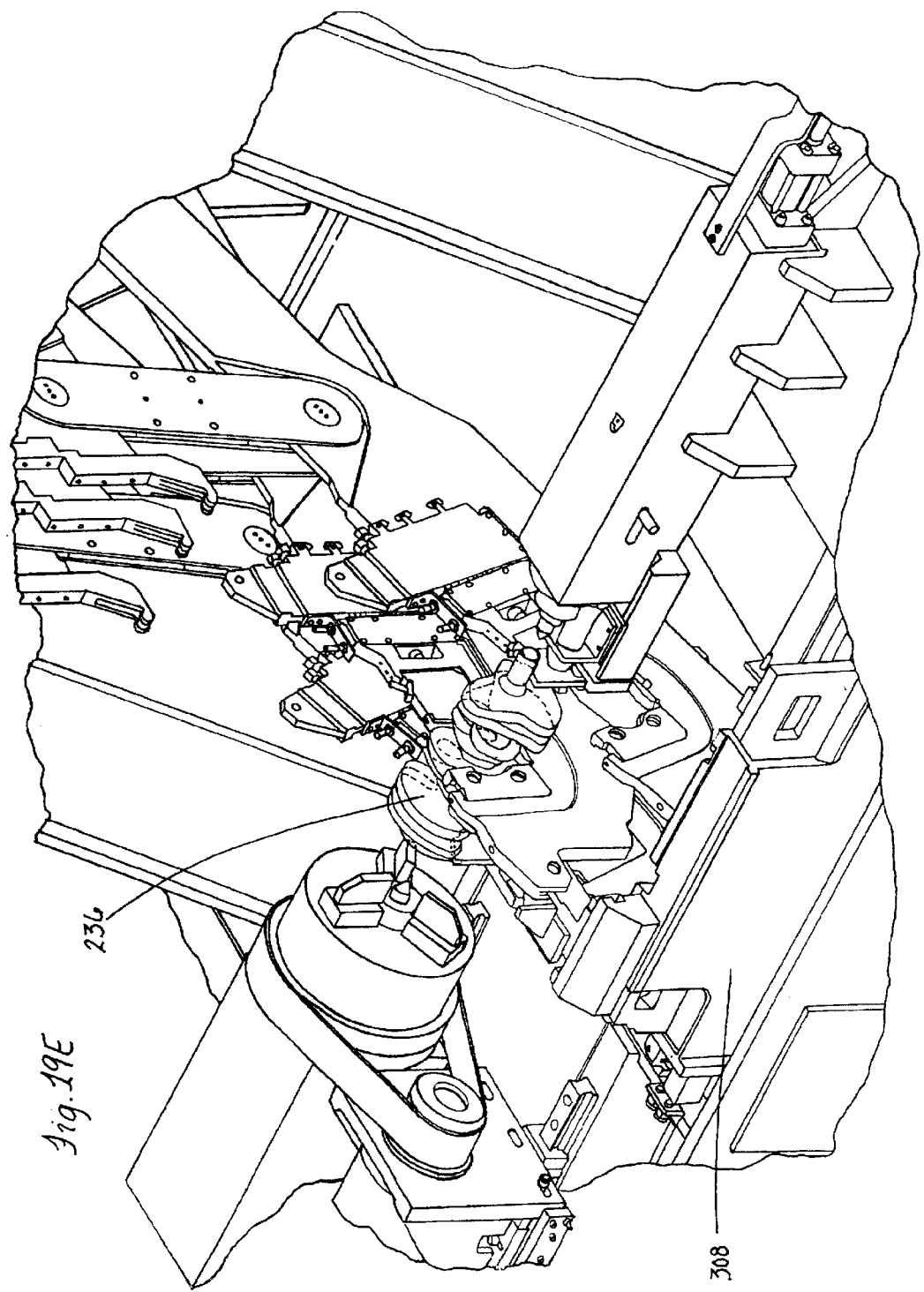

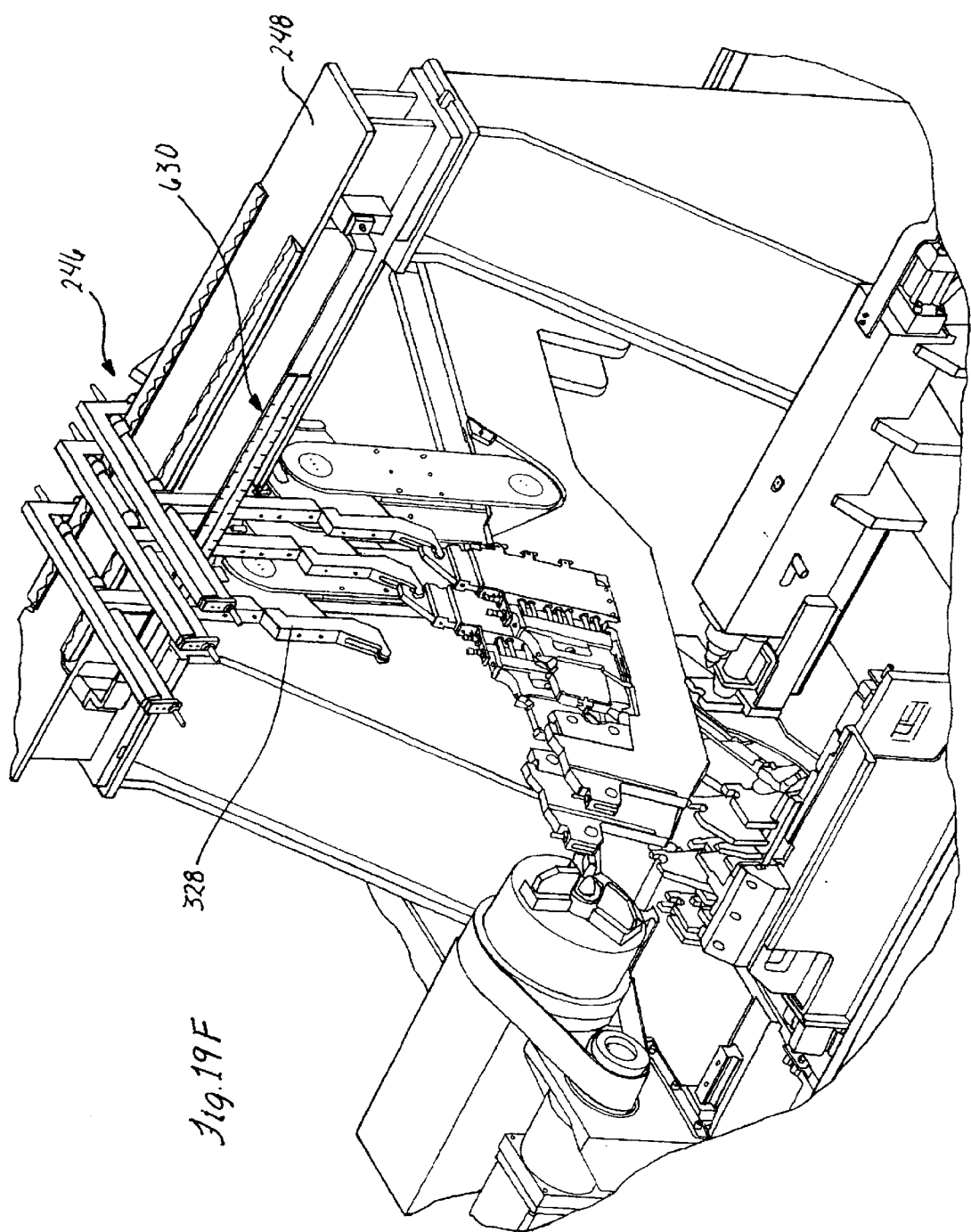

APPARATUS AND METHOD FOR ROLLING WORKPIECES

This application claims the benefit of Provisional Application No. 60/252,543, filed Nov. 22, 2000.

FIELD OF THE INVENTION

This invention relates to an apparatus and method for surface hardening or deep rolling of a rotating workpiece by rolling devices engaged with the rotary workpiece. This invention also relates to an improved rolling arm apparatus operatively associated with the rolling devices.

BACKGROUND OF THE INVENTION

The present invention is directed to a roll hardening apparatus used to surface or deep harden workpieces such as cam shafts and particularly crankshafts having main bearings and pin bearings. As described in U.S. Pat. No. 5,493,761, it is common in current crankshaft roll hardening machines to mount a rolling device such as a rolling head in a fixed position at the end of each of a pair of scissor action type lever arms having a common pivot and to open and close the scissor levers with hydraulic cylinder devices. That is, the hydraulic cylinder devices pivot the upper ends of the scissor lever arms to close and to clamp the hardening rollers of the rolling heads onto the respective bearing to be rolled and conversely, to pivot the upper ends of the scissor lever arms apart to a clearance or release position so that the rolling heads are disengaged from the crankshaft bearings for then being shifted away from the working area via advancing and retracting suspension devices to allow removal of the finished crankshaft and replacement with a new crankshaft to be rolled. Such an arrangement is shown in U.S. Pat. No. 5,943,893. The scissor lever arms are suspended by the suspension devices that allow the scissor lever arms to oscillate and follow the movement of a pin bearing as it travels eccentrically about the rotational axis of the crankshaft.

It will be appreciated that the main bearings and pin bearings on a crankshaft, particularly for automotive vehicles and trucks, are closely spaced, and that the scissor lever arms, their suspension devices and their hydraulic cylinder devices which can be quite elaborate and complex, thus have to be crowded into a small space. For example, the crankshaft rolling machine disclosed in U.S. Pat. No. 5,943,893 includes an angled bellcrank lever that is pivotally connected to the suspension device and to one of the respective scissor arms that cooperates to allow opening of the jaws defined between the respective rolling tools to a width that is greater than twice the maximum radius of the crankshaft. To assist the positioning of the scissor lever arms for loading and unloading of crankshafts front and rear vertical guide surfaces are provided on the stationary frame, one at the front of the frame via vertical spars and the other toward the rear of the frame via housings for the suspension devices, and along which roll rollers on the upper ends of the scissor lever arms.

A large number of hydraulic cylinders are used in the rolling machine disclosed in U.S. Pat. No. 5,943,893 to shift the scissor arms and to apply the rolling force. There are hydraulic cylinder devices that operate to shift the scissor arms through a long travel stroke, another hydraulic cylinder to open and close the roller heads, and yet another hydraulic cylinder shifts the scissor arms and rolling heads to apply the roll hardening force to the crankshaft.

Further, each of these hydraulic devices is pivotally mounted to various of the operating components for moving the scissor arms. In all, fourteen distinct pivot points for each set of scissor arms can be identified. And when there are ten such sets of arms, the machine will have one-hundred-and-forty pivot connections for the scissor-rolling arms. As is apparent, where the crankshaft bearings are very closely spaced, the number of the cylinders and their diameter sizing will make it very difficult to have the cylinders all fit in a compact fashion on one side of the crankshaft without staggering axially adjacent cylinders from each other, or separating the arms that roll the pin bearings from those used to roll the mains such as in the aforementioned '761 patent and as shown in U.S. Pat. No. 5,138,859. Also, the large number of pivotally mounted cylinders provide potential failure points due to the high number of moving parts and pivot points which may wear and cause seizing of parts. Accordingly, the reliability and maintainability of the '893 machine is significantly impaired by the large number of pivotal cylinders it employs. In other words, a machine that needs so many cylinders and pivot connections is much more prone to failure and will require more in the way of maintenance attention and expenses than is desirable.

From the foregoing, it will be seen that there is a need for an improved, high-production rolling method and apparatus that is simpler than the scissor action machines and yet is able to roll harden crankshafts or the like with the high quality required and at the high production speeds needed for automotive vehicles. More specifically, there is a need for an apparatus and method that simplifies the closing of the rolling heads into rolling engagement with the crankshaft bearings and subsequent opening of the heads. Preferably, the rolling parts will be suspended in a manner that allows them to be shifted in the axial direction to either roll other bearings on the same crankshaft or to be repositioned to roll bearings on other longer or shorter length crankshafts that have their respective bearings at different spacings such as in the aforementioned '761 patent which is incorporated herein by reference.

SUMMARY OF THE INVENTION

In accordance with the present invention, there is provided, a new and improved apparatus and method for rolling workpieces such as crankshafts. In one aspect of the invention, the apparatus has first and second rolling heads mounted at spaced positions along a common rolling arm to receive a crankshaft bearing therebetween which can then be shifted relative to one another along the common rolling arm to close the heads or rolling tools for clamping onto the workpiece. This eliminates the need for scissor action levers.

In accordance with one preferred form of the invention, a drive or motor for shifting the rolling heads relative to each other comprises a power or fluid cylinder mounted on the common rolling arm for shifting the first and second rolling heads relative to each other. In this form, the first rolling head may be fixedly mounted or secured to the common rolling arm and the second rolling head is moved by the drive between the open release position and a closed, rolling position for applying the rolling force to the crankshaft bearing. As such, independent arms for each rolling head are avoided to provide attendant space savings for the present apparatus. Further, the pivot connections and linkages between the arms to provide a scissor clamping action on the crankshaft are not necessary in the present apparatus significantly simplifying its construction and operation enhancing the reliability and maintainability thereof.

In accordance with another aspect of the invention, at least one of the rolling heads is slidably mounted on guide surfaces on the rolling arm for movement between the open and closed positions. Preferably, the guide surfaces are bearing surfaces that guide an associated rolling head for rectilinear travel along the rolling arm toward the other rolling head. Accordingly, once in the operative rolling position ready to be clamped on to the crankshaft bearing, the rolling arm does not have to be shifted and only one rolling head needs to be shifted for clamping both heads onto the bearing unlike prior scissor action machines which pivot both arms to bring their associated heads into clamping engagement with the bearing.

In accordance with a further aspect of the invention, a first rolling head is backed by a fixed, integral portion on the common rolling arm to resist the rolling forces being applied thereto through the crankshaft, and a hydraulic cylinder device has its main body portion secured to the common rolling arm and its movable actuator portion secured to the second rolling head. Preferably, the movable rolling head is mounted on bearing and guide surfaces on the common rolling arm and is shifted along a rectilinear path between the open and closed positions.

The respective common rolling arms for the respective crankshaft bearings are pivotally mounted to follow the movement of the bearing to which they are clamped, particularly the pin bearings. In the preferred form of the invention, the rolling arms extend generally in a fore and aft direction and are pivotally mounted on support levers that extend transverse to the extending arms. In the illustrated form of the invention, the rolling arms extend generally or substantially in a horizontal direction and the support levers extend at a substantial angle to horizontal, i.e., in a general vertical direction, to allow the clamped rolling heads to travel up and down and forwardly and rearwardly to follow the eccentric path of a pin bearing. The rolling heads, which are following and rolling a main bearing, may shift in a path concentric with the axis of the crankshaft.

In accordance with another aspect of the invention, the common rolling arms are shifted to the operative rolling position by a separable arm support or positioner that then moves away to allow the rolling action. At the end of a rolling cycle, the crankshaft stops rotating at a predetermined rotational position, and the arm support is again positioned against each rolling arm to support it for shifting away from the working area. The rolled crankshaft is then removed by a workpiece handling device. In the preferred form of the invention, the arm support is in the form of support carriages traveling upwardly to lift the support arms to a position where their rolling heads are positioned to be clamped onto the crankshaft. After clamping onto the crankshaft, the support carriages are lowered to clear the rolling arms, each of which is now supported by its pivoted support lever and its rolling head clamped onto its respective crankshaft bearing.

The arm carriages or positioning members together form an arm phasing or carriage assembly with the positioning members arranged in each assembly to correspond to a particular crankshaft configuration when the crankshaft is set at a predetermined rotary position, as between head and tailstock units. Different arm phasing assemblies to be removably mounted to the positioner can be provided each tailored via the orientation of the positioning members thereof to a particular crankshaft configuration in terms of the spacing and configuration of its bearings. In this way, when the arm positioner is shifted to bring the arms from retracted positions to their operative positions with the crankshaft in its predetermined rotary position, the arms are advanced in unison to their operative position by the selected arm phasing assembly so that the bearings will be disposed between the tool heads on the arms ready to be clamped thereby. In a preferred form, at least one of the arms that is to roll a main bearing is not retracted via the arm positioner, and instead remains fixed such as by a support attached to the positioner with the tools thereof clamped onto the main bearing to provide a steady rest for the crankshaft intermediate the ends held in the head and tailstock units during a rolling operation.

In the illustrated form, the arm positioner includes a body and a vertical slide carrying the selected arm phasing assembly that is motor driven for riding up and down on the body with the body pivoted by a power cylinder. Accordingly, to shift the arms into position for clamping onto all of the bearings of the crankshaft, only one slide member, one motor, and one cylinder is needed in the present invention. This is a vast improvement over prior crankshaft rolling machines that usually have separate cylinders and slides and rod locks for each arm, at least for those that are to roll the pin bearings, such as shown in the '761 patent. Also, there is no need for setting up the machine for each new crankshaft configuration by individual adjustment of each arm as instead once the correct phasing assembly is mounted to the positioner and the rolling arms connected, the remainder of the tool clamping operation is automated as the crankshaft is rotated to its predetermined rotary position under software control, and the arm positioner can then be activated to bring the arms to their operative positions. Further, the crankshaft need not be rotated once in its predetermined rotary position to enable all the bearings to be clamped such as in the machine disclosed in the '893 patent, thus keeping time spent for clamping of the tools onto the crankshaft to a minimum.

As the rolling head end of the arms are weighted by the rolling tools, preferably a counter-balancing weight is associated with each end of a rolling arm opposite the clamping end having the rolling heads thereon for ease in manipulating and lifting of the arms as may be needed during crankshaft changeover operations by machine operators. Instead of a weight, pneumatic or hydraulic counterbalancing cylinders can be utilized to provide a balanced arm. Each support lever is pivotally connected to the lever arm between the rolling head end and the counterweighted end of the rolling arm and allows its associated rolling arm to oscillate during the rolling operation.

The preferred rolling apparatus comprises a rotational drive apparatus adapted to hold and rotate the workpiece about its rotational axis. The rolling arms and their suspension may be shifted by an adjusting or axial slide mechanism in a direction parallel to the rotational axis to align the respective rolling arms each with a respective main or pin bearing. An arm positioner is provided to lift the rolling arms from a retracted position to an operative position where the rolling heads are in position to clamp onto a bearing. First and second rolling heads on each of the common rolling arms are shifted from the clearance or open jaw position to a clamping position by a drive on each of the common rolling arms. An arm support preferably in the form of a pivoted lever supports the rolling arm at a location spaced from the rolling heads so that during the pin rolling action the rolling arms are free to swing and to follow the eccentric path of the pin bearings.

In the illustrated method and apparatus of the invention the crankshaft is supported and rotated about its longitudinal rotational axis by a rotational drive having a headstock and a tailstock with a center. The crankshaft is lowered by a handling device between centers of the headstock and tailstock; and after being clamped therebetween, the crankshaft will be rotated by the chuck of the headstock so that it is in a predetermined rotary position. The arm phasing or carriage assembly of the arm positioner can support the arms in a lowered position while the crankshaft rotary position is set, and then raises the arms upwardly to bring the first and second rolling heads on each rolling arm into position to clamp onto an associated, aligned bearing. A hydraulic cylinder on each arm is next actuated for sliding travel of the second movable rolling head along cooperating guide and bearings surfaces on the head and on the arm to push the crankshaft tightly against the fixed, opposite first rolling head. With each of the paired rolling heads clamped onto their respectively associated workpiece bearing, the arm carriage assembly is lowered from the rolling arms which are now supported by the clamped jaw heads on the crankshaft and substantially vertically extending support levers or hanger members which are pivotally connected at locations intermediate the opposite ends of the elongated rolling arms and at the upper support therefor. A counterweight force is applied to the end of the rolling arm opposite the rolling head end of the rolling arm with the pivot lever being pivotally connected at the pivot location intermediate the counterweight end and the rolling head end of the rolling arm. Thus, each pin rolling arm is supported and allowed to swing and to move freely to follow the path of its associated pin bearing.

At the end of the rolling cycle of operation, the crankshaft is stopped at a predetermined rotational position and the arm support carriage is raised to support the rolling arms. The hydraulic cylinders are operated to slide the second rolling heads from the crankshaft rolling position to the open jaw position. The headstock and tailstock are opened to release the crankshaft and the rolling arms are lowered by the support carriage with the crankshaft being lifted and unloaded from the rolling machine. Thereafter, a new crankshaft to be rolled is loaded between the headstock and tailstock to start a new cycle.

BRIEF DESCRIPTION OF THE DRAWINGS

FIG. 3 is a view similar to FIG. 1 and showing an arm positioner for shifting the rolling arms between an illustrated supporting position to allow a clamping onto the bearings by the rolling device and for shifting to release rolling arms for oscillation;

FIG. 4 is a side elevational view similar to FIG. 1 but with a supporting pivot lever being located beneath the rolling arm;

FIGS. 6A and 6B are perspective views of another form of the apparatus shown in FIG. 2 having rolling arms all suspended from one side of the crankshaft axis for rolling of bearings of the crankshaft in a single rolling operation;

FIG. 7 is a perspective view of the apparatus shown in FIGS. 6A and 6B with several of the rolling arms removed for clarity purposes to show the thin configuration of the arms and having some of the auxiliary equipment of the apparatus reoriented;

FIG. 9A is a side elevational view of the arm showing a working tool head and a tall, thin cylinder assembly actuated with the working tool head in its advanced position for clamping a crankshaft bearing between it and backing roller tool head on the arm;

FIG. 9B is a side elevational view of the arm with modifications including to the cylinder assembly and to its forward end;

FIG. 10C is a cross-sectional view taken along line 10C—10C of FIG. 10B showing a pivot connection between the arm and the hanger member;

FIG. 10D is a plan view of the arm showing its narrow configuration in the widthwise dimension thereof;

FIG. 10E is a cross-sectional view taken along line 10E—10E of FIG. 10D showing the saddle assembly including a pivotal tool mount and a force sensor operated thereby, and a guideway system for sliding of the saddle along the arm;

FIG. 11 is an enlarged elevational view of the cylinder, saddle, and rolling tools including a bracket mount for the working tool with the tool housing removed;

FIG. 12B is a rear elevational view of the cylinder assembly showing rear plug members fixed in bores for the piston rods;

FIG. 12D is a plan view of the cylinder assembly showing ports at the rear end of the cylinder block body for hydraulic fluid fed to the piston bores;

FIG. 12E is a rear elevational view of the modified cylinder assembly on the arm of FIG. 9B;

FIG. 12F is a cross-sectional view taken along line 12F—12F of FIG. 12E showing the internal passageways of the block body for supply and removal of hydraulic fluid from the piston bores;

FIG. 13B is a front perspective view of the arm positioner showing a motor for turning a gear that raises and lowers the slide and a power cylinder for pivoting of the arm positioner frame;

FIG. 14A is a rear perspective view of the arm positioner with the arm phasing assembly removed showing a mounting rail on the slide for the arm phasing assemblies;

FIG. 14C is a front perspective view of the arm positioner showing the pivot cylinder in an alternative location;

FIG. 14D is a front elevational view of the arm positioner showing an output shaft for the motor and a gear shaft with a coupling therebetween;

FIG. 15C is a cross-sectional view taken along line 15C—15C of FIG. 15B showing the thin, two-part construction of the hanger arm;

FIG. 15D is an enlarged cross-sectional view of the upper pivot connection of the hanger arm;

FIG. 16A is a schematic view of the forward end portion of the rolling arm modified to include a strain sensor disposed at the bottom of the arm rearwardly offset from the clamped bearing;

FIGS. 16B and 16C are schematic views of alternate scissor-arm rolling tool configuration utilizing the strain sensor;

FIG. 17 is a perspective view of a headstock assembly showing a chuck driven by a servo drive for rotating the held crankshaft;

FIG. 18 is a perspective view of a tailstock assembly including a center for engaging the post end of the crankshaft and a positioning mechanism for shifting of the tailstock center toward and away from the crankshaft; and FIGS. 19A–19F are perspective views of a sequential cycle of operation of the crankshaft rolling machine showing only three rolling arms for clarity with one of the rolling arms fixed and clamped onto the crankshaft to act as a steady rest therefor, the rolling cycle shown including loading of the part, raising of the arms into position for clamping, clamping of the tools onto the crankshaft bearings and after rolling of the crankshaft, lowering of the arms and unloading of the part with axial adjustments occurring as necessary for subsequent crankshaft rolling operations.

DETAILED DESCRIPTION OF THE PREFERRED EMBODIMENTS

Figure 2:
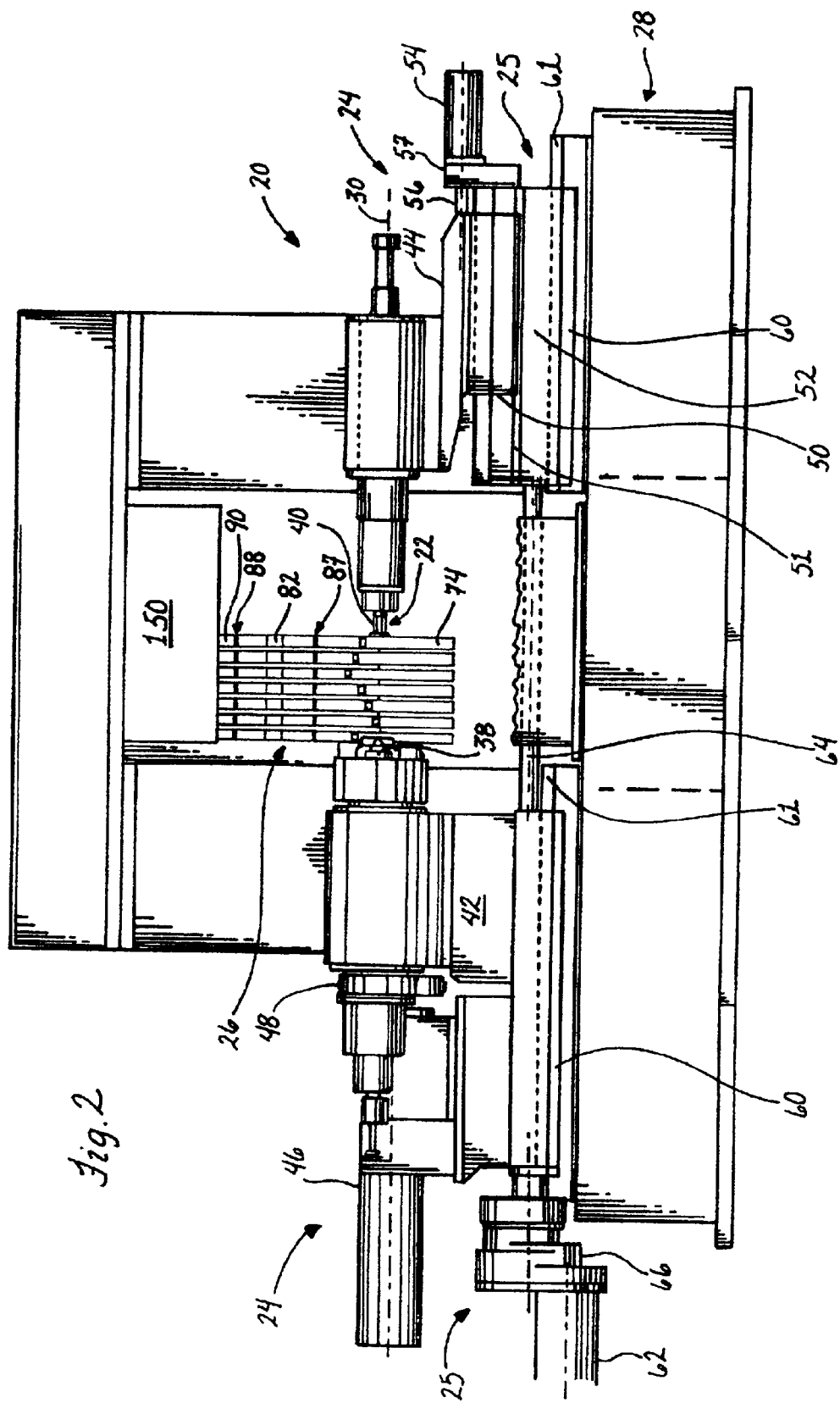
FIG. 2 is a front elevational view of an apparatus for simultaneously deep fillet rolling crankshaft main and pin bearings using the rolling arms of FIG. 1.

As shown in the drawings for purposes of illustration, the invention is embodied in a machining apparatus 20 for surface rolling or deep rolling of workpieces such as cam shafts or the like but will be described in connection with the deep fillet rolling of crankshafts 22. As best seen in FIG. 2, the apparatus includes an adjustable workpiece rotational and support device or apparatus 24 for supporting, rotating and positioning of the crankshaft relative a plurality of rolling tool assemblies 26. The tooling assemblies 26 deep roll fillets of the main bearings 32 on the crankshaft (FIG. 5A) and fillets of the pins or pin bearings 34 which can be divided into two groups, as will be described more fully hereinafter.

Figure 5A:
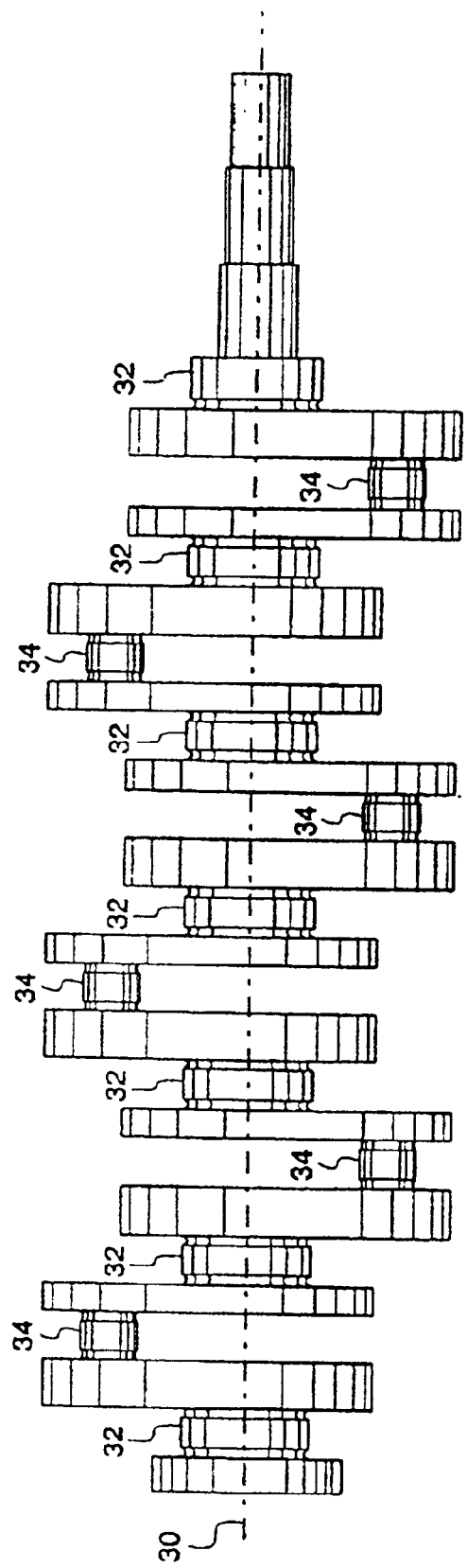
FIG. 5A is a side elevational view of an in-line six cylinder crankshaft.
Figure 5B:
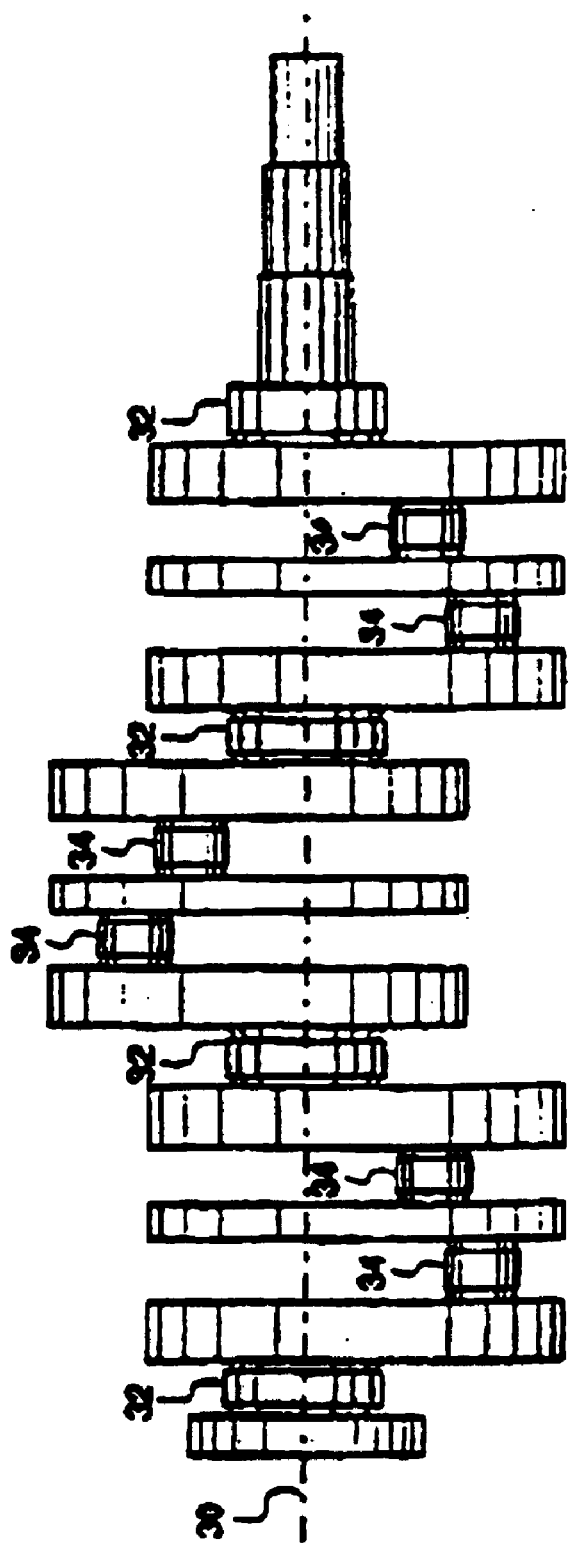
FIG. 5B is a side elevational view of a V-six cylinder crankshaft.

The adjustable workpiece support apparatus 24 for supporting the crankshaft and for rotating the crankshaft 22 are mounted on a machine base or frame 28 (FIG. 2). The workpiece support apparatus preferably includes a chuck 38 on a headstock and a tailstock or quill having a center 40 holding opposite ends of the crankshaft 22, as shown in FIG. 2, to rotate the crankshaft about its longitudinal, rotational axis 30 (FIGS. 5A and 5B). Herein, the chuck 38 is mounted on a shiftable carriage 42 which rotatably mounts the chuck which grips and applies the rotating force to the crankshaft. Preferably, the opposite end of the crankshaft is mounted on the center carried by a movable carriage 44. The crankshaft is driven by a motor 46 through a transmission 48, with both the motor 46 and transmission 48 being mounted on the chuck carriage 42 for shifting therewith.

In order to load and unload crankshafts 22 in the respective holders 38 and 40, the workholders 38 and 40 are shiftable toward or from one another. To this end, when it is desired to release a crankshaft 22 from the holders, the right-hand, sub-carriage 44 is shifted to the right as viewed in FIG. 2 to release the right hand of the crankshaft. The sub-carriage 44 is mounted on a main carriage 52 for slidable movement relative to the main carriage 52. More specifically, the sub-carriage has slidable, linear bearings 50 for sliding along a horizontal bearing or way 51 on the main carriage 52 when a driving screw 56 turns in a nut (not shown) in the sub-carriage. A drive motor 54 is mounted by a bracket 57 on the main carriage and turns the screw 56 in the sub-carriage nut to shift the sub-carriage left or right, in order to clamp or unclamp a crankshaft between the respective holders.

To accommodate longer or shorter crankshafts for four, six or eight cylinder engines, the two main carriages 42 and 52 are shifted simultaneously toward or from one another through equal increments relative to the frame base 28 and the tool assemblies 26 mounted thereon. This is achieved by use of a common drive motor 62 turning a common drive screw 64 extending between these main carriages, and having opposite hand screw threads thereon in the respective nut (not shown) in the respective main carriages 42 and 52.

The carriages 42 and 52 are slidably mounted to the frame 28 on linear bearings 61 and rails 60 for movement parallel to the rotational axis 30. The left and right shifting carriages 42 and 52 are driven together along the rotational axis 30 by a motor 62 driving a transmission 66 which turns the common drive screw 64 which is in threaded engagement with both the left and right shifting carriages 42 and 52. The motor 66 and the transmission 66 are secured on the frame and the drive screw 64 is rotatably supported in a support housing 96 fixed to the frame 28 between the left shifting carriage 42 and the right shifting carriage 52.

In accordance with the present invention, an improved and simplified rolling arm assembly 26 is provided in which a first rolling tool or head 70 and a second rolling tool or head 72 is mounted on a common rolling arm 74 with at least one of the rolling heads being movable relative to the other rolling head on the common arm between a spaced, open jaw or release position to receive a crankshaft pin or main ready to be clamped by the heads and a closed, rolling position where the first and second rolling heads are clamped to the crankshaft bearing. In this illustrated and preferred embodiment of the invention, a drive 75 for shifting the rolling heads relative to one another between the open position and the closed, rolling position is carried on the common rolling arm 74. The illustrated drive comprises a power cylinder device 75, preferably a fluid or hydraulic cylinder, having an actuator 78 in the form of a rod extending from the cylinder 76 to shift the second rolling head 72 to slide or translate along its bearing and guide surfaces 80 which are slidably mounted on bearing and guide surfaces 82 on the rolling arms 74. Herein, the guide and bearing surfaces 80 guide the second rolling head 72 to travel rectilinearly to the left, as viewed in FIG. 1, and to the right to provide an open position.

The rolling arms 74 are pivotally or swingably mounted to allow the first and second rolling heads 70 and 72 to follow the path of the crankshaft main bearing 32 or pin bearing to which they are clamped as the crankshaft rotates about its rotational axis 30. The pin bearings 32 and the first and second rolling heads clamped thereto move in an orbital or eccentric path about the axis 30 and to allow this movement, the rolling arms are pivotally mounted on a support 82, preferably in the form of a pivoted support lever 84. Herein, the rolling arm is journaled or pivotally connected by a bearing 86 and pivot pin 87 to one end of the support lever 84 which is also pivotable mounted at its other end by a pivot pin or journal 88 to a stationary suspension member 90. The oscillatory motion of the pin bearings 34 can be broken down into vertical and horizontal components with the clamped pin rolling heads 70, 72 rocking up and down, as shown by the directional arrow "B" in FIG. 1 about the pivot pin 87 and to follow the horizontal component of the oscillatory motion by the lower end of the support arm 84, pivot pin 87 and rolling arm swinging with the arm upper end pivoting about pin 88, as shown by the directional arrow "C" in FIG. 1. Thus, the pin rolling tool assembly on the outer end of the arm reciprocates back and forth as the support lever swings about upper pivot or journal 88 as indicated by the arrow "C" and simultaneously rocks up and down, as shown by the directional arrow "B" about the pivot pin 87.

Figure 1:
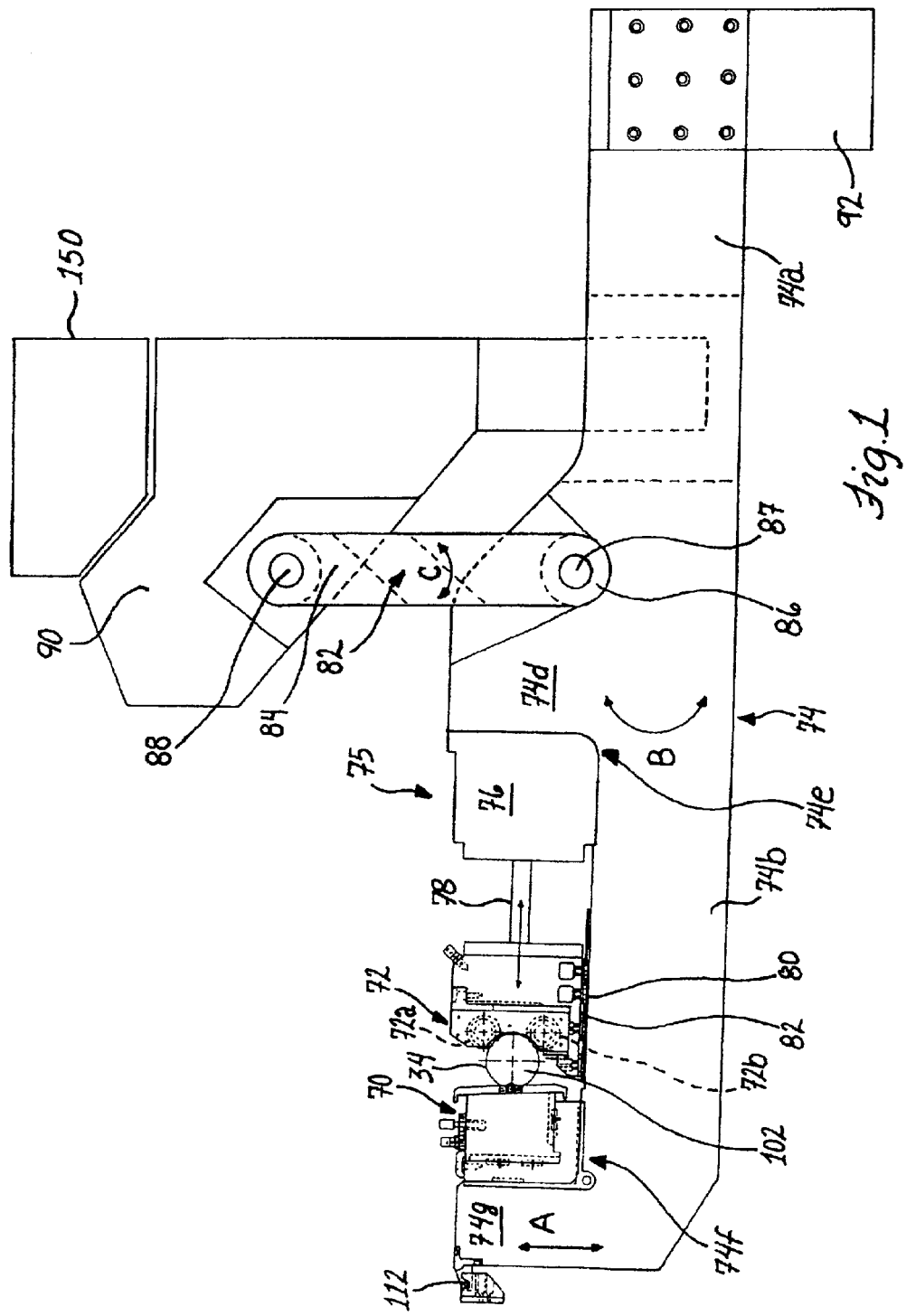
FIG. 1 is a side elevational view of a rolling arm having rolling devices thereon actuated to grip a bearing of a crankshaft in accordance with the invention.

To counterbalance the weight of the pin rolling assembly 26 and that portion 74b of the rolling arm extending to the left of the support lever pivot pin 87, as viewed in FIG. 1, a counterweight 92 is attached to the other opposite end 74a of the rolling arm. That is, the support lever is preferably connected to the rolling arm intermediate its ends and the counterweight assists in keeping the rolling arm substantially level or horizontal in this instance where the support lever is extending transverse or substantially vertically to the substantially horizontally extending rolling arm 74.

In the preferred embodiment of the invention illustrated in FIG. 1, the support lever 84 is suspended from its overhead pivot pin 88 and is above the rolling arm whereas in the embodiment of the invention illustrated in FIG. 4, the rolling arm 74c is attached to the upper end at pivot pin 88c to the support lever 84c located beneath the rolling arm 74c. The rolling arms 74 and 74c could be used together to roll one crankshaft 22 such as with upper mounted arms 74 used for rolling the pins 34 and lower mounted arms 74c used to roll the mains 32, although it will be appreciated that with the preferred and illustrated thin configuration of the arms 74 and 74c such a separation thereof is not necessary as the arms 74 can be disposed in side-by-side aligned orientation on one side of the crankshaft axis 30 providing space conservation in the machine 20. It will be appreciated that the support for the rolling arms may take various forms from that shown herein as a lever support and be oriented other than substantially vertical as illustrated herein and still fall within the purview of the present invention.

In order to clamp onto a bearing of the crankshaft 22 and to be positioned free and clear of the crankshaft during loading and unloading, each of the rolling arms 74 and each of the rolling assemblies 26 thereon is positioned by an arm positioner or device 100 (FIG. 3) that shifts the rolling assemblies between a retracted or loading and unloading position free and clear of its associated pin or main bearing with the rolling heads 70 and 72 shifted away from the working area and the operative position where the open jaw defined between the opened first and second rolling heads 70 and 72 in their clearance or release position is located horizontally and vertically to be centered onto an axis 102 of the bearing via the drive 75, as previously described. The pin bearings 34 will be displaced vertically and horizontally from the main bearings 32, as shown in FIGS. 5A and 5B, which will be all located at substantially the same heights and same location; but spaced axially along the crankshaft. The arm positioner 100 herein is in the form of a series of carriages or positioning members 106 for each rolling arm 74 and the carriages are movable vertically to raise and lower the tool assembly 26 at the outer free end of the arm 74. When the crankshaft is being loaded, the rolling assemblies 26 will be lowered to the retracted or loading and unloading position to allow the crankshaft to be centered between the headstock and the tailstock prior to each of the tool assemblies being raised to operative positions to clamp onto its respectively aligned bearings 32 or 34.

As best seen in FIG. 3, the arm positioning device 100 comprises a plurality shiftable, detachable carriages 106 each aligned to cooperatively engage and disengage with a coupler or pin 112 mounted on and projecting outwardly of the free end 74b of the rolling arm. The carriage travels vertically along a stationary fixed bar 113. To receive the coupler pin 112 and to hold the weight of the associated outer end 74b of a rolling arm, the carriage 106 includes an upwardly opening bracket 114 with outwardly inclined camming surfaces 116 to guide the pin 112 into the open groove between the opposed inclined camming surfaces. The carriage 106 is shifted vertically by a drive 120 which herein includes a motor 122 that rotates a pinion gear 124 to drive a vertical gear rack 126 meshed with the pinion gear and carried by the carriage 106. The carriage includes a vertically extending body 130 carrying an upper channel shaped slide 132 and a lower channel shaped slide 134 each of which receives the stationary bar 113 within its channel. Thus, the arm positioning device comprises the carriage 106 having at its upper end its coupler bracket 114 for engaging the pins 118 when the carriage 106 is driven upwardly by the rack and pinion drive including the motor 122.

The carriage 106 is aligned vertically and horizontally with its associated rolling arm pin 112 such that all of the pins for the main bearing, rolling arms are generally in one vertical plane and at one height when at their upper positions to clamp their respective main rolling assemblies 36 onto main bearings of the crankshaft. The rolling arms for the pin bearings 34 have their pins 112 at different heights and horizontal positions relative to one another and relative to the pins 112 on the rolling arms 74 for the main bearings. After a closing of the rolling heads 70 and 72 to clamp onto each of the bearings, each of the carriages 106 is lowered to a position below the travel path of its previously engaged pin 112 to permit its associated rolling arm oscillation without interference from the bracket 114. The rotation of the crankshaft is stopped under the software and computer control system for the chuck (also, the overall rolling operation is controlled by the same system) at a predetermined rotational position such that each of the bearings pins 112 is at a designated location at a specified height relative to the crankshaft axis 30 and the lowered carriages 106 are driven upwardly to engage their respective brackets 114 with the aligned pins 112 on their associated rolling arm. The headstock and/or tailstock are moved apart under the electronic controller and rolling arms 74 are lowered downwardly by the carriages 106. After unloading of one crankshaft and the loading of a subsequent crankshaft and its being clamped and supported between the headstock and tailstock in their closed driving position, the arm support carriages 106 are then driven upwardly to their operative position to allow for shifting of the tool heads 70 and 72 for clamping of the rolling devices 36 onto the main bearings 32 and pin bearings 34 after which the carriages 106 are driven downwardly to allow oscillation of rolling arms and a rolling operation of the crankshaft fillets.

It will be appreciated that the rolling arms 74 are quite thin in width, for example, about 0.875 inch, because of the narrow spacing between adjacent pin and main bearings on the crankshaft. Hence, the actuator cylinder 76 used herein and supported by the rolling arm is also quite thin such as about 0.875 inch. In order to achieve the force necessary to accomplish the deep rolling of crankshaft fillets, the cylinder is made relatively tall in height and has multiple bores with multiple pistons therein to drive actuator rod 78. To resist the forces being exerted by the pistons and the actuator rod pushing with a rolling force against the bearing 32 or 34, each of the fluid actuators 75 is positioned against an upstanding integral portion 74d on the rolling arm and is seated in a pocket 74e on the rolling arm. The fluid actuator is secured to the rolling arm so as to be fixed and stationary in the arm pocket 74e. Likewise, the rolling head 70 is seated in a pocket 74f on the outer distal end of the rolling arm 74 which includes an upstanding, integral portion 74g of the rolling arm 74 behind the rolling head 70. It is preferred that the roller arm 74 including its component portions 74a, 74b and 74d–g be integrally formed so that both tool heads 70 and 72 are mounted thereon for relative shifting to each other along the common, integral arm 74, unlike prior rolling machines that pivoted two arms, one for each tool head, together to provide a scissor-clamping action on the crankshaft bearing.

Each of the rolling heads 70 and 72 are provided with rotating rollers for engaging in a fillet. While the location and number of rotating rollers may vary from that disclosed herein, the illustrated second rolling head 72 is provided with an upper roller 72a and a lower roller 72b each journaled in a rolling tool block or body 73 to rotate about an axis 140 (FIG. 3). The first rolling head 70 which acts as a backup support to the rolling force rollers 72a and 72b has, in this instance, one roller 70a engaging the fillet being rolled. The rotational axis for the roller 70a is aligned with the axis 102 of the bearing being rolled. Manifestly, the rolling devices or rolling heads may vary substantially from that illustrated to suit the needs of the particular application. Of course, both rolling heads 70 and 72 could be movable rather than one being a fixed rolling head. The necessary hydraulic lines are not shown for the hydraulic actuators 76.

The apparatus 20 disclosed herein is similar in most respects to the apparatus disclosed in U.S. Pat. No. 5,493, 761 which is hereby incorporated by reference as if fully reproduced herein with the important exceptions of the rolling arm apparatus shown in FIGS. 1 and 3 of this application and the arm support devices 106 shown in FIG. 3 of this application. Herein, the suspension members 90 may be mounted on an overhead, stationary tube or other frame support 150 (FIG. 1) to allow the rolling arms 74 to be shifted axially, i.e., in a direction parallel to the rotational axis 30 of the crankshaft to allow locating of the rolling arms and their rolling devices 26 at different locations for rolling bearings on different lengths or kinds of crankshafts. Also, a rolling arm 74 may be lowered by its support carriage and not used for a particular crankshaft or for a particular crankshaft rolling operation, particularly where the crankshafts vary in the number of pins or mains. Herein, the rolling arm apparatus may be used in multistage rolling operations as disclosed in the aforesaid U.S. Pat. No. 5,493, 761 with the crankshaft being shifted axially relative to the rolling arms between a first rolling operation for a first set of pins and/or mains and a second later rolling operation of a second set of pins and/or mains. Such a multistage operation is disclosed fully in U.S. Pat. No. 5,493,761, and hence needs not be described again in this application.

FIGS. 6A and 6B are directed to another crankshaft rolling machine apparatus 200 which utilizes very thin rolling arms 202 that allows for simultaneous rolling of all of the main bearings 32 and pin bearings 34 of a crankshaft 22, even where such bearings are axially spaced by very short distances, such on the order of 0.780 inch. Similar to the previously described arms 74, the arms 202 preferably mount both the force-applying tool head 204 and the backup tool head 206 so that only a single arm 202 is needed to roll each bearing, as can be seen in FIG. 9A. This single arm design for rolling crankshaft bearings significantly reduces the complexity of the machine apparatus 200 in terms of the number of moving parts and thus improves its reliability and lowering maintenance costs therefor.

Figure 8:
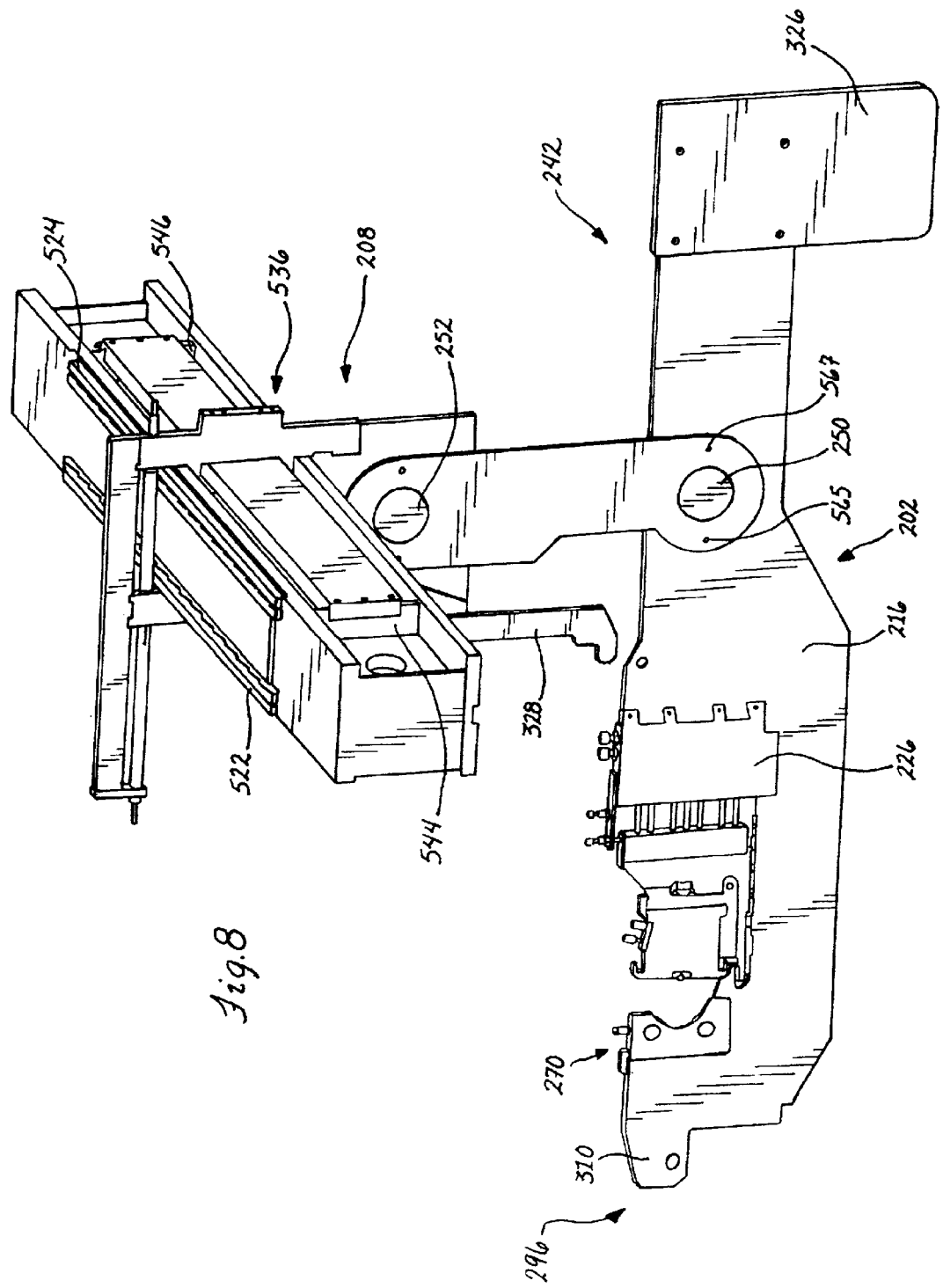
FIG. 8 is a perspective view of a single one of the rolling arms and a pivotal support structure therefor showing a hanger member pivotally attached at its lower end to the arm and at its upper end to an axial slide mechanism for the arm.

As can be seen in FIGS. 6A and 6B, the narrow configuration of the rolling arms 202 herein allows them all to be positioned on one side 207 of the crankshaft axis 30 for the majority of their lengths along with their associated pivotal support structures, generally designated 208 (FIG. 8). For this purpose, a single narrow drive cylinder assembly 210 (FIGS. 12A–12D) is provided for driving the tool head 204 with the force necessary to roll harden the crankshaft 22. The narrow configuration of the drive cylinder assembly 210 allows the arms 202 to be positioned one next to the other on the one side 207 of the axis 30 according to the spacing of the bearings they are to roll with the narrow size of the cylinder assemblies 210 likewise allowing them to be similarly positioned in substantially side-by-side relation to each other. It should be noted that the cylinder assemblies 210 generally will be slightly offset due to the crankshaft bearing configuration, although it will be recognized that the assemblies 210 will typically include some overlap with adjacent assemblies 210, hence their narrow construction to obtain the desired arm positioning as described herein. The narrow cylinder assemblies 210 obviate the need to separate the rolling arms 202 such as in pin and main bearing rolling arm groups or to position the arms 202 so that adjacent cylinders 210 are offset from each other on the machine side 207 and thus provide significant space savings in the present machine 200. In this regard, the arms 202 are designed for universal use for rolling both pin and main bearings of a crankshaft. Further, since the rolling arms 202 can be spaced accordingly to the axial spacing of all of the bearings of a crankshaft to be rolled, there is no need to undertake multiple or two-stage rolling operations in this way providing low cycle times for roll hardening operations with the machine 200 herein.

Figure 12A:
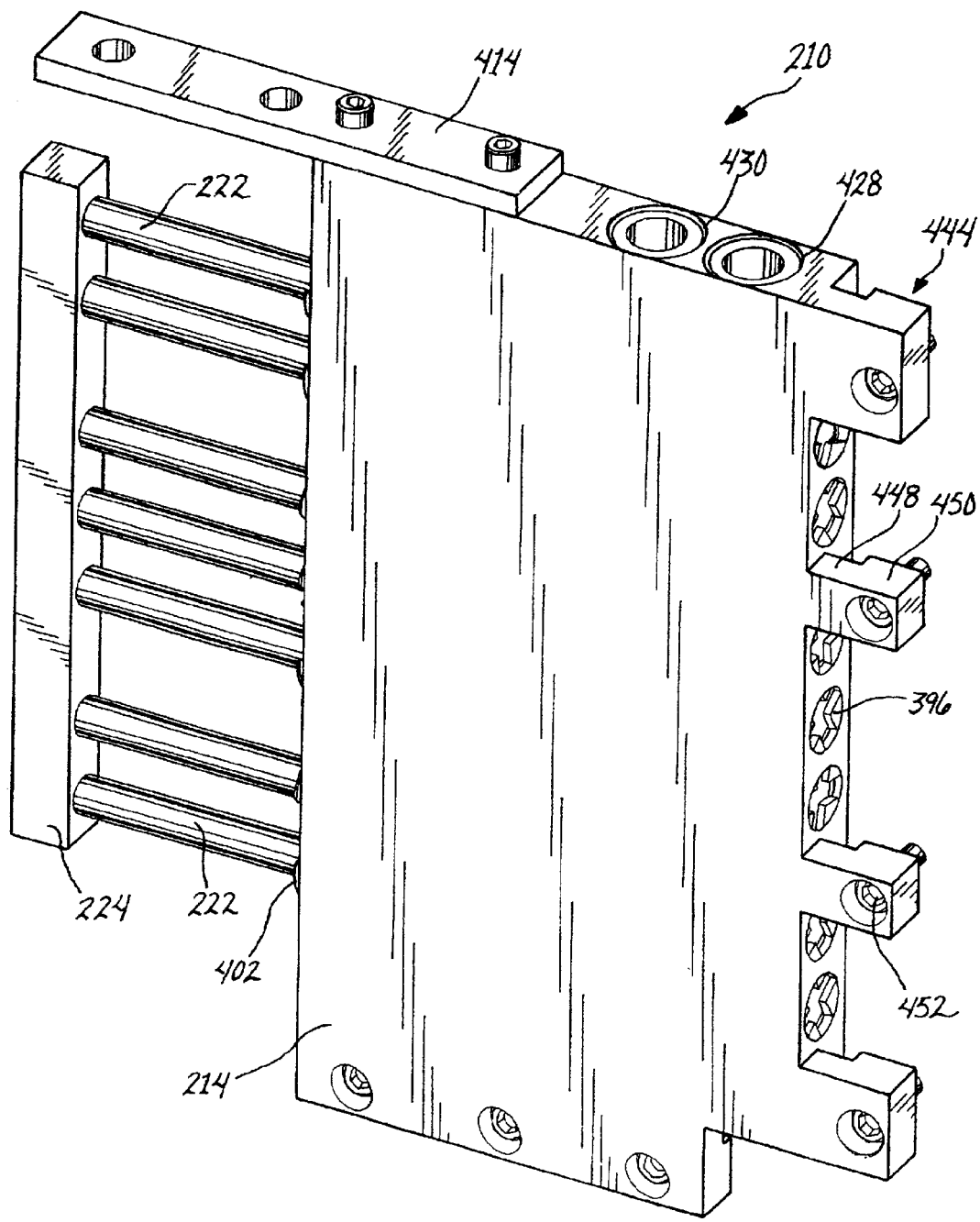
FIG. 12A is a perspective view of the cylinder assembly for advancing the working tool head showing piston rods advanced and interconnected by a common drive bar at outer ends of the rods.
Figure 12C:
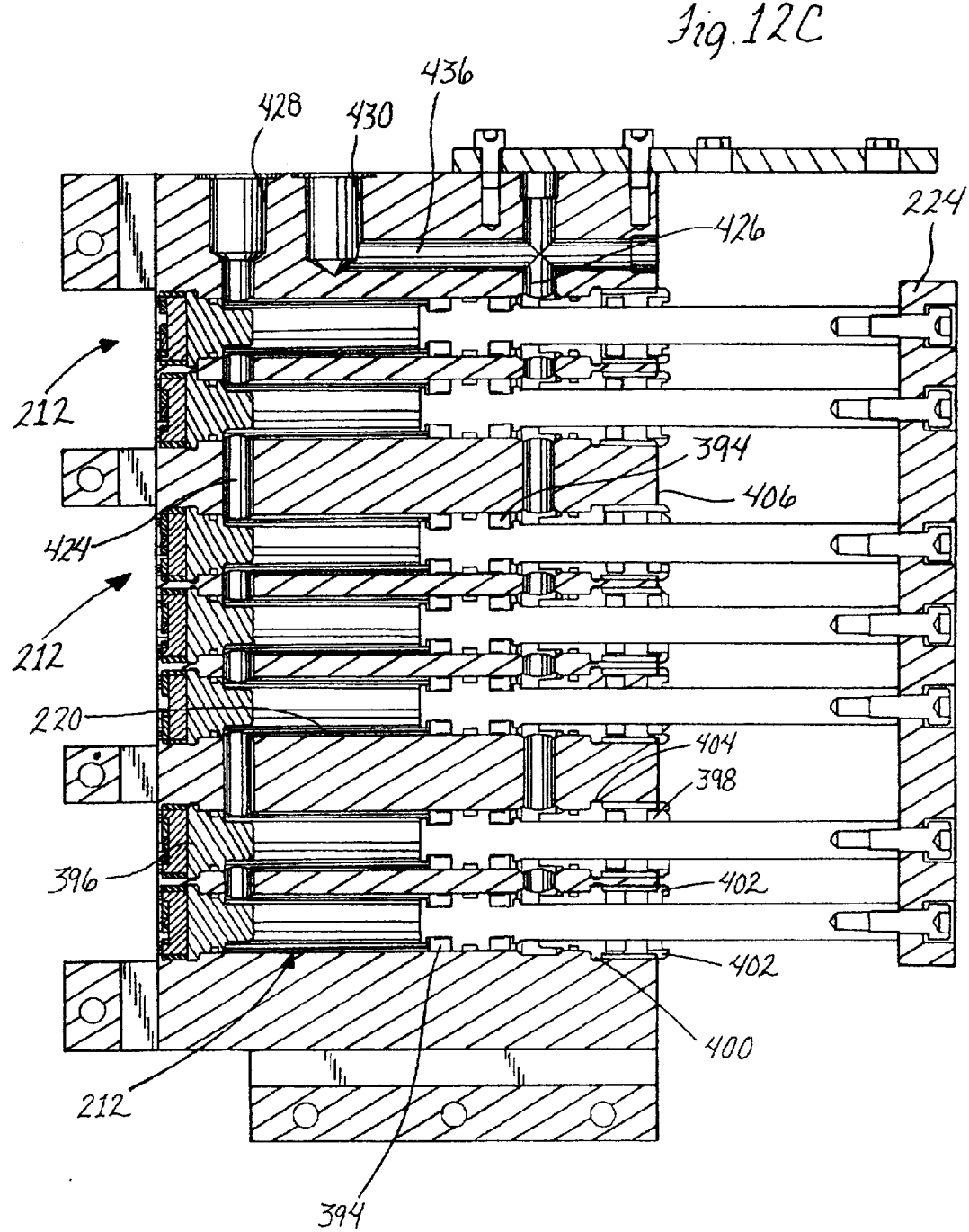
FIG. 12C is a cross-sectional view taken along line 12C—12C of FIG. 12B showing forward seals for the piston rods in each of the bores and a rear piston guide member on respective rear ends of the piston rods.

To apply the necessary clamping force to the crankshaft via the driven tool head 204, the narrow drive cylinder assembly 210 has a plurality of very small force-generating cylinders 212 that are aligned with each other so that the width of the drive cylinder assembly 210 does not exceed the diameter of one of the force generating cylinders 212, as can be seen best in FIG. 12C. In the preferred and illustrated form, the width of block body 214 of the cylinder assembly 210 from one side face 216 across to opposite side face 218 is approximately 23.5 mm or 0.925 inch, and the diameter of the cylindrical bore walls 220 is approximately 16 mm. This is in contrast to prior cylinder assemblies used with scissor arm machines that typically had diameters of approximately two inches requiring that adjacent sets of scissor arms be spaced accordingly limiting the ability to undertake a single rolling operation for all of a crankshaft's bearings, and/or requiring more space in the machine for separating the arms into groups, as previously discussed.

With the preferred and illustrated arrangement of having only a single, thin drive cylinder assembly 210 associated with each arm 202, the height of the cylinder assembly 210 is tailored so that the number of aligned small force-generating cylinders 212 is sufficient to apply the driving force to the tool head 204 necessary to obtain the needed variable and high clamping force at the bearing to be rolled. The cylinder assembly 210 preferably utilizes hydraulic fluid, and with the exemplary sizes set forth above and a hydraulic fluid pressure source 221 at 2000 psi, the illustrated cylinder assembly 210 in FIGS. 12A–12D is provided with an operative height of approximately 250 mm. In this way, seven aligned force-generating cylinders 212 can be provided in the tall and thin block body 214 which cooperate to generate a force of approximately six hundred pounds on the crankshaft bearing via the working tool head 204 sufficient for roll hardening thereof. By utilizing only a single power cylinder, i.e. drive cylinder assembly 210, with each arm 202 for clamping of the tool heads 204 and 206 onto the crankshaft bearings, the number of cylinder assemblies utilized for this purpose is minimized. Further, the cylinder assembly 210 is fixed to the rolling arm 202 so that upon its actuation only piston rods 222 and drive bar 224 are shifted with the thin block body 214 remaining stationary as fixed to the rolling arm 202, unlike prior pivotally mounted cylinder assemblies which were pivotally connected to various links and scissor arms for obtaining the clamping action of the rolling tools at the crankshaft bearing introducing excessive potential failure points in their design, as previously discussed.

To obtain the preferred clamping force, the piston rods 222 and attached drive bar 224 can have a stroke of approximately 50 mm from retracted to extended positions thereof. Generally, most of this stroke distance will occur prior to engagement of the tool head 204 with the bearing, e.g. 45 mm, with the remainder being over-travel, e.g. 5 mm, after engagement for creating the high clamping force on the bearing.

Because the tool head 204 is operably connected to the drive bar 224 to be linearly shifted thereby along the arm 202 for in-line clamping of the bearing as will be described more fully herein, this arrangement, while not obtaining the mechanical advantage that scissor arms provide, provides a high resolution of the pressure applied to the drive cylinder and the clamping force applied to the crankshaft bearing. For example, with prior scissor arms, when hang-ups or binding of the moving components cause force transmission losses to occur between the supplied pressure to the cylinder and the applied pressure at the bearing, these losses can be magnified several times over depending on the scissor arm ratio provided, e.g. 2.5 or 3:1. Accordingly, it can be difficult to maintain a consistent pressure range, e.g. ±30 psi, as output from the cylinder assembly and transferred into the clamping force at the bearing. On the other hand, the present in-line force application arrangement will minimize the effect of any pressure losses on the losses of clamping force at the bearing since there is no multiplication effect as with scissor arms enabling much greater control over the clamping force via adjustments made at the source despite pressure or force transmission losses in the system.

Figure 10A:
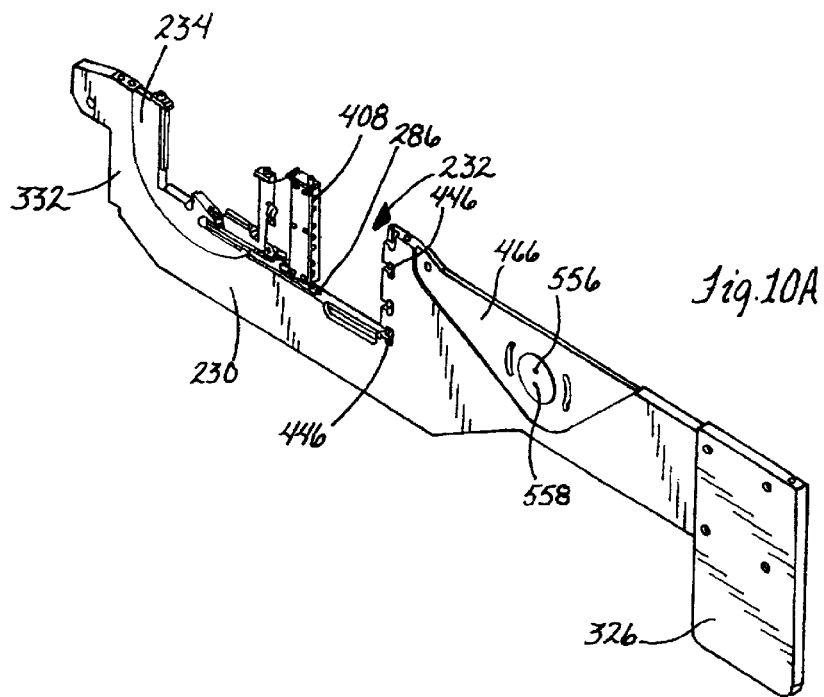
FIG. 10A is a perspective view of the arm with the cylinder and rolling tools removed.
Figure 10B:
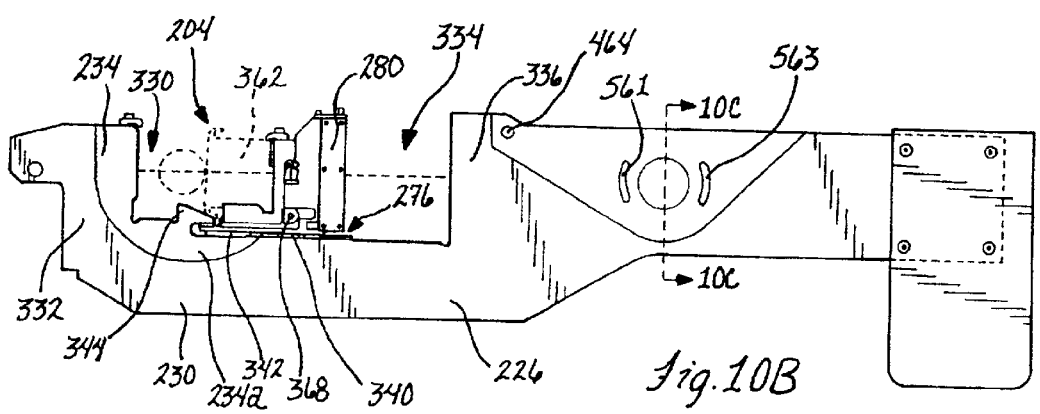
FIG. 10B is a side elevational view of the arm showing a saddle assembly for the working tool head at its advanced position with the working tool head engaged on the crankshaft bearing shown in phantom.

As mentioned, the rolling arm 202 like the drive cylinder assembly 210 has a very narrow construction across the opposite side faces 226 and 228 thereof, such as on the order of 23.5 mm or 0.925 inches. Accordingly, with the drive cylinder assembly 210 fixed to the rolling arm 202, the side faces 216 and 218 of the cylinder block body 214 will be substantially flush with the respective side faces 226 and 228 of the rolling arm 202, such as can be seen with respect to faces 216 and 226 in FIG. 8. As best seen in FIGS. 10A and 10B, the forward portion 230 of the arm includes a generally rectangular shaped, upwardly open cutout 232 for mounting of the tool heads 204 and 206 and drive cylinder assembly 210. Recessed areas 234 are milled out from the arm side faces 226 and 228 toward the forward end of the arm portion 226, with one of such recessed areas 234 shown in FIGS. 10A and 10B. With the preferred arm width of 0.925 inch, the recesses 234 provide clearance for the swing radius of the counterweight cheeks 236 of the crankshafts 22 when there are very tight or close spaces therebetween, such as on the order of 0.780 inches, as previously discussed. This allows the arms 202 herein to be all set on the one side 207 of the crankshaft 22 with the arms 202 axially spaced by very narrow gaps 237 therebetween which substantially correspond to the spacing of the adjacent bearings they are to roll, as best seen in FIG. 6B.

Figure 15A:
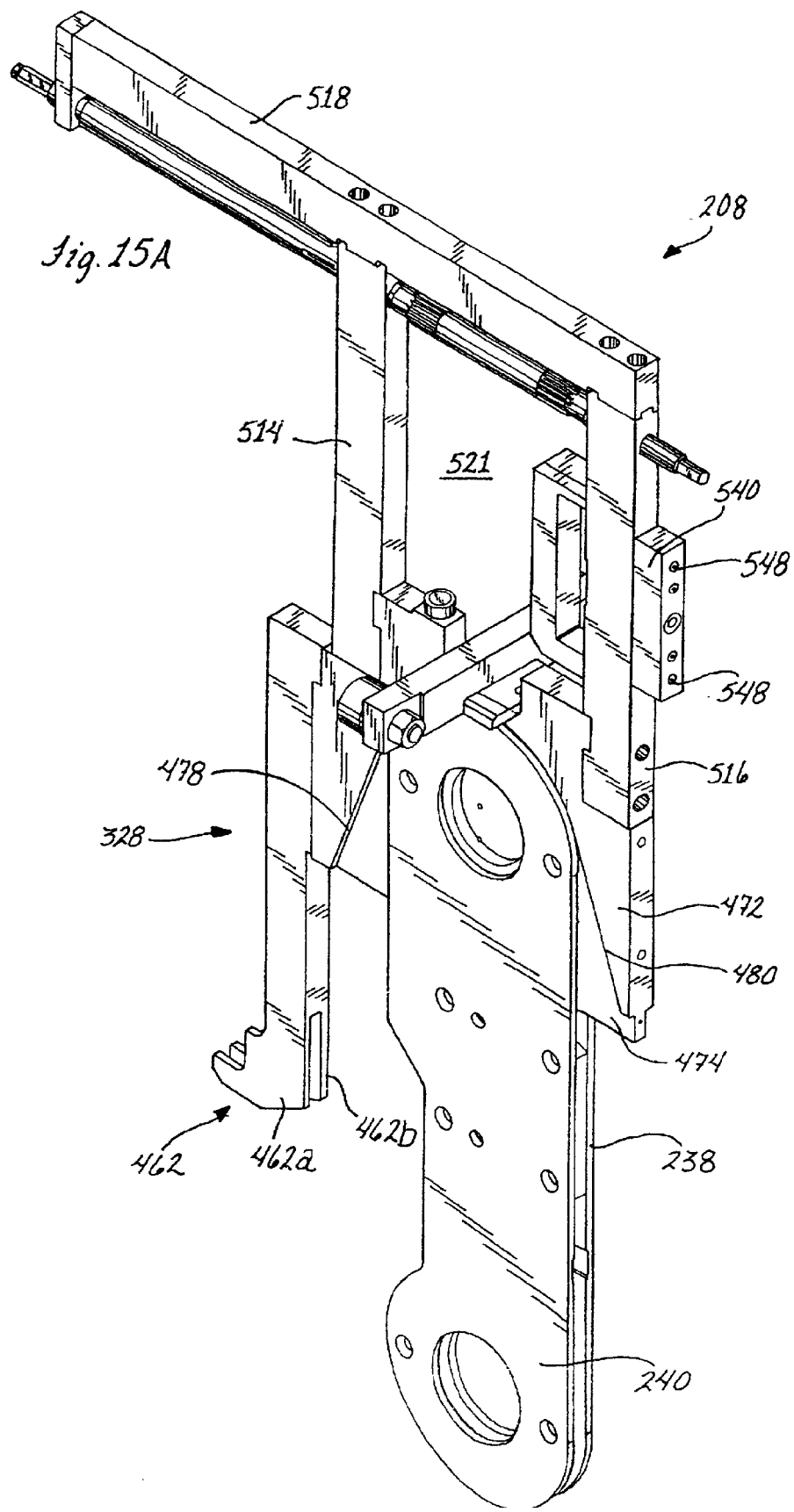
FIG. 15A is a perspective view of the pivotal support structure for one of the arms including the hanger member, an arm suspension member for holding the arm up in a raised position, and a pinion roller shaft of the axial shift mechanism for shifting of the arm along the axis of the crankshaft.

The pivotal support structures 208 are also constructed to have a very narrow width dimension, as can be seen in FIGS. 8, 15A and 15C. The pivotal support structures 208 each include a hanger member 238 having a lower end 240 pivotally connected to the rolling arm 202 that it supports intermediate the forward portion 230 and rear portion 242 thereof. At the upper end 244, the hanger member 238 is pivotally attached to an axial or lateral shift mechanism 246. The lateral shift mechanism 246 cooperates with an upper cross bridge 248 along which the mechanism 246 can be shifted in an axial or lateral direction parallel to crankshaft axis 30 to adjust the arms 202 for crankshafts 22 with differently spaced bearings than those previously rolled.

Accordingly, the hanger member 238 has a lower pivot connection 250 to the arm 202 allowing it to move up and down during a rolling operation, and an upper pivot connection 252 which allows the arm to swing in a fore and aft direction during a rolling operation. In this manner, the arms 202 can follow the path of the eccentric pin bearings 34 as the crankshaft 22 is rotated by the rotary support or drive device in the form of headstock and tailstock units 254 and 256, respectively. Also, the pivotal hanger member 238 allows the rolling arms 202 clamped onto main bearings 32 to accommodate for any deviations from round of the main bearing 32. As will be described more fully hereinafter, in a preferred form at least one of the rolling arms 202a can be clamped onto a main bearing 34 as a steady rest by providing a support 257 (FIG. 13A) for the arm 202a that is fixed during crankshaft rolling operations.

As shown, the illustrated machine apparatus 200 includes a frame 258 having a base 260 which includes a forward raised portion 262 and a rear lowered portion 264. The head and tailstocks 254 and 256 are mounted on the forward raised portion 262 so that the crankshaft axis 30 extends adjacent to the juncture of the frame portions 262 and 264 with the frame side area 207 having the arms 202 and associated pivotal support structures 208 mounted thereat and supported by the frame rear portion 264. For this purpose, large, vertical and laterally or axially spaced sup port columns 266 and 268 extend up from the frame lowered portion 264 adjacent to frame raised portion 262 and taper rearwardly to the top thereof at which the cross-bridge 248 in the form of a flanged beam is attached spanning the support columns 266 and 268. As the support columns 266 and 268 extend higher than the crankshaft axis 30 when held by the units 254 and 256, the hanger members 238 extend generally vertically downward from the cross-beam 248, and the arms 202 will extend from the respective hanger members 238 horizontally forward toward the crankshaft 22 when in their operative positions. The hanger member 238 has a length as between pivot connections 250 and 252 to allow the rolling arms 202 to extend forwardly generally at the level of the crankshaft 22 such that the arm portion 230 is beneath the crankshaft bearing to be rolled with upwardly opening clamping jaw 270 formed by the tool heads 204 and 206 having the crankshaft bearing fit therein. In this arrangement, the drive cylinder assembly 210 has its individual cylinders 212 aligned vertically, one over the other.

Both the tool heads 204 and 206 are of substantially conventional design. Accordingly, the tool head 204 includes a pair of rollers 272 (one of which can be seen best in FIG. 11) that are canted outwardly so that their axes of rotation are transverse to that of the crankshaft axis 30 to allow the rollers 272 to be engaged in fillets of a crankshaft bearing and apply a roll-hardening force thereto via the force generated by the drive cylinder assembly 210. With the bearing closest to the post end of the crankshaft which has only a single fillet to be rolled, the tool head 204 can be modified to include only one canted roller 272. In this instance, a stop member 273 (FIG. 6B) is employed to abut the against the end arm 202b or a component fixed thereto such as cylinder block body 214 to resist lateral shifting due to the asymmetric or non-cancelling rolling forces applied to the single fillet bearing by the single roller tool head 204.

The fixed tool head 206 includes a pair of vertically spaced support or backup rollers 274 and 276 that take the force of the clamped crankshaft bearing as applied by the roller 272. When the arms 202 are in their operative positions, the rollers 272 are substantially aligned with the crankshaft axis 30 with the upper roller 274 higher than the axis 30 and the lower roller 276 lower than the axis 30.

Referring to FIG. 10B and FIG. 11, the tool head 204 is shifted upon actuation of the drive cylinder assembly 210 along the rolling arm 202 in the cutout 232 thereof via a guideway system, generally designated 276. More particularly, the tool head 204 is mounted to an L-shaped saddle 278 which is fixed to the drive bar 224 via an attachment housing 280 connected to the rear of the saddle 278, and particularly vertical portion 282 thereof. The saddle 278 has a lower, horizontally and forwardly extending portion 284 which rides on the guideway system 276 between it and the bottom arm surface 286 in the cut out 232 thereof. In this manner, the tool head 204 is guided for linear travel to and from the bearing to be rolled and in a radial direction relative thereto by the linear bearing or guideway system 276 herein.

Figure 13A:
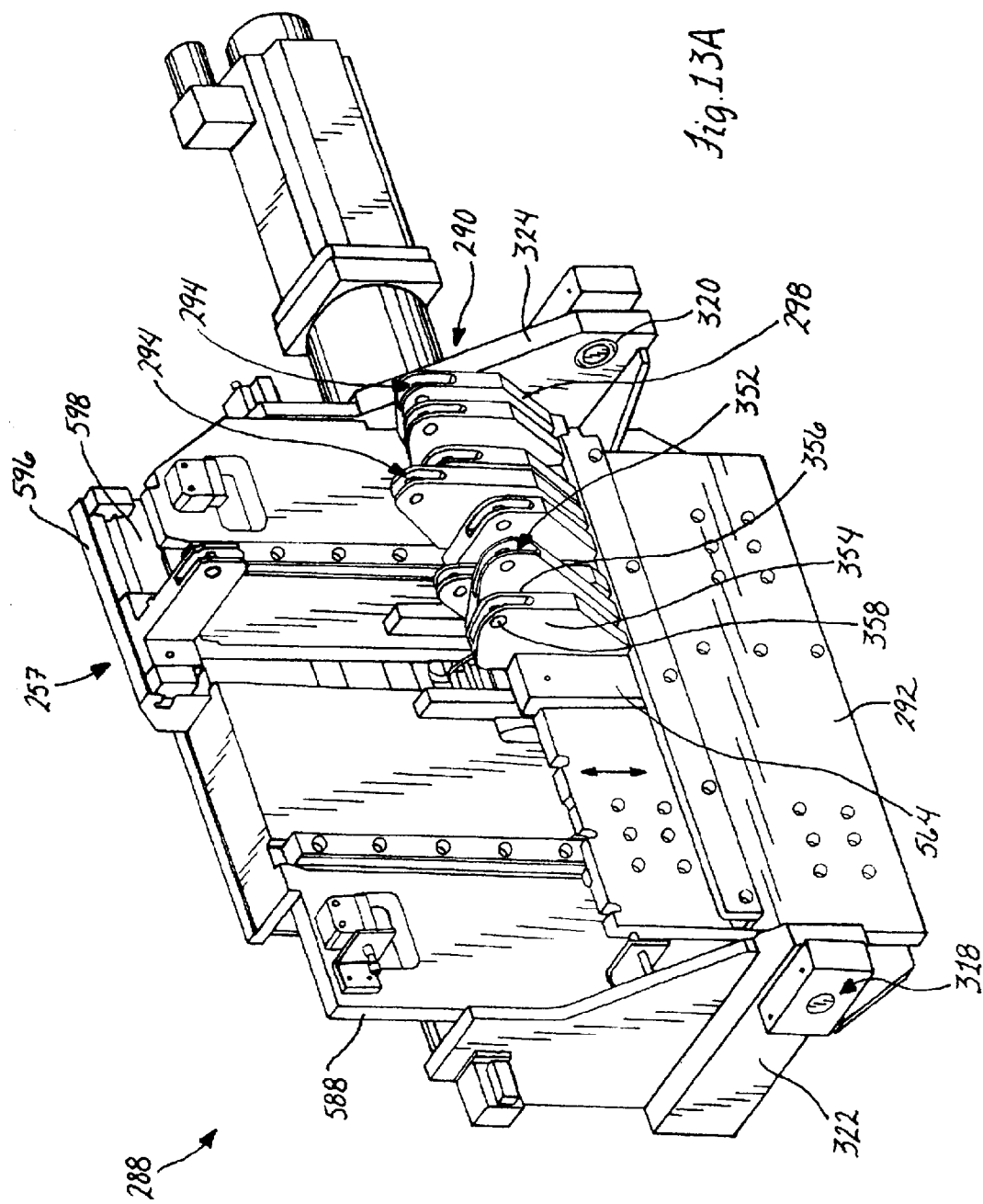
FIG. 13A is a rear perspective view of an arm positioner showing a vertical slide for raising and lowering carriage members of a selected arm phasing assembly along a pivotal frame of the positioner.

To orient the arms 202 in their operative positions, an arm positioner, generally designated 288 is provided, as best seen in FIGS. 13A and 13B. The arm positioner 288 has one of a plurality of arm phasing or carriage assemblies 290 removably mounted to a vertical slide wall 293 thereof. These phasing assemblies 290 have a plurality of coupling portions 294 that are adapted to engage with corresponding coupling portions 296 of each of the rolling arms 202 to lift them into their operative positions. In this regard and as can be best seen in FIG. 13A, the coupling portions 294 which are at the end of positioning members or phasing plates or carriages 298 of each of the arm phasing assemblies 290 are spaced from each other in accordance with the bearing spacings of a specific crankshaft configuration. In this manner, when a different crankshaft configuration is present on a crankshaft to be rolled, the arm phasing assembly 290 can be switched to one that is tailored for the new configuration of the crankshaft having a varied stroke and/or axial spacing of its bearings versus the bearing configuration of a previously rolled crankshaft.

Accordingly, as can be seen, the coupling portions 294 can be spaced in the axial, vertical, and fore and aft directions from each other so as to substantially match the relative positioning of the crankshaft bearings to be rolled when the held crankshaft is set at a predetermined rotary position by rotation of the headstock 254 under software control such as can be provided in electrical panel units 299 on one side or the other of the machine 200. After the arms are in their operative positions relative to respective bearings of the crankshaft, the drive cylinder assemblies 210 are fired, and the arm phasing assembly 290 is lowered with the coupling portions 294 and 296 separating. With the phasing assembly 290 retracted down to this lowered or clearance position, rolling of the crankshaft bearings can begin.

The arm positioner 288 has shift mechanisms 300 and 302 that raise and lower the arms 202 via the arm carriage assemblies 290. As can be seen best in FIG. 13B, the shift mechanism 300 preferably includes a servo drive motor 304 for raising and lowering the slide wall 292, and the shift mechanism 302 preferably includes a power cylinder 306 pivotally attached to frame body 308 of the positioner 288 at one of its ends and to the machine frame 258 at its other end. More particularly, the coupling portions 296 of the arms 202 are disposed at their forward free ends 310 that extend to the other side 312 of the crankshaft axis 30 from the side 207 with the arms 202 in their operative positions. Accordingly, the frame 308 of the arm positioner 288 is pivotally mounted to fixed side walls 314 and 316 at the machine frame portion 262 such that the arm phasing assembly 290 is aligned with the area between the head and tailstock units 254 and 256, as best seen in FIG. 6B. Thus, upon actuation of the cylinder 306, the arm positioner frame 308 will pivot or rotate relative to the walls 314 and 316 about pivots 318 and 320 at rearward ends of opposite side flanges 322 and 324 of the arm positioner frame 308 with the pivoting occurring in a rearward direction. This rearward pivoting takes place after the arms 202 have been lifted to their raised position via the slide wall 292 to provide for final positioning of the arms 202 in their operative positions, i.e. with the tool heads 204 and 206 ready to be clamped onto the crankshaft bearing positioned therebetween.

Figure 15B:
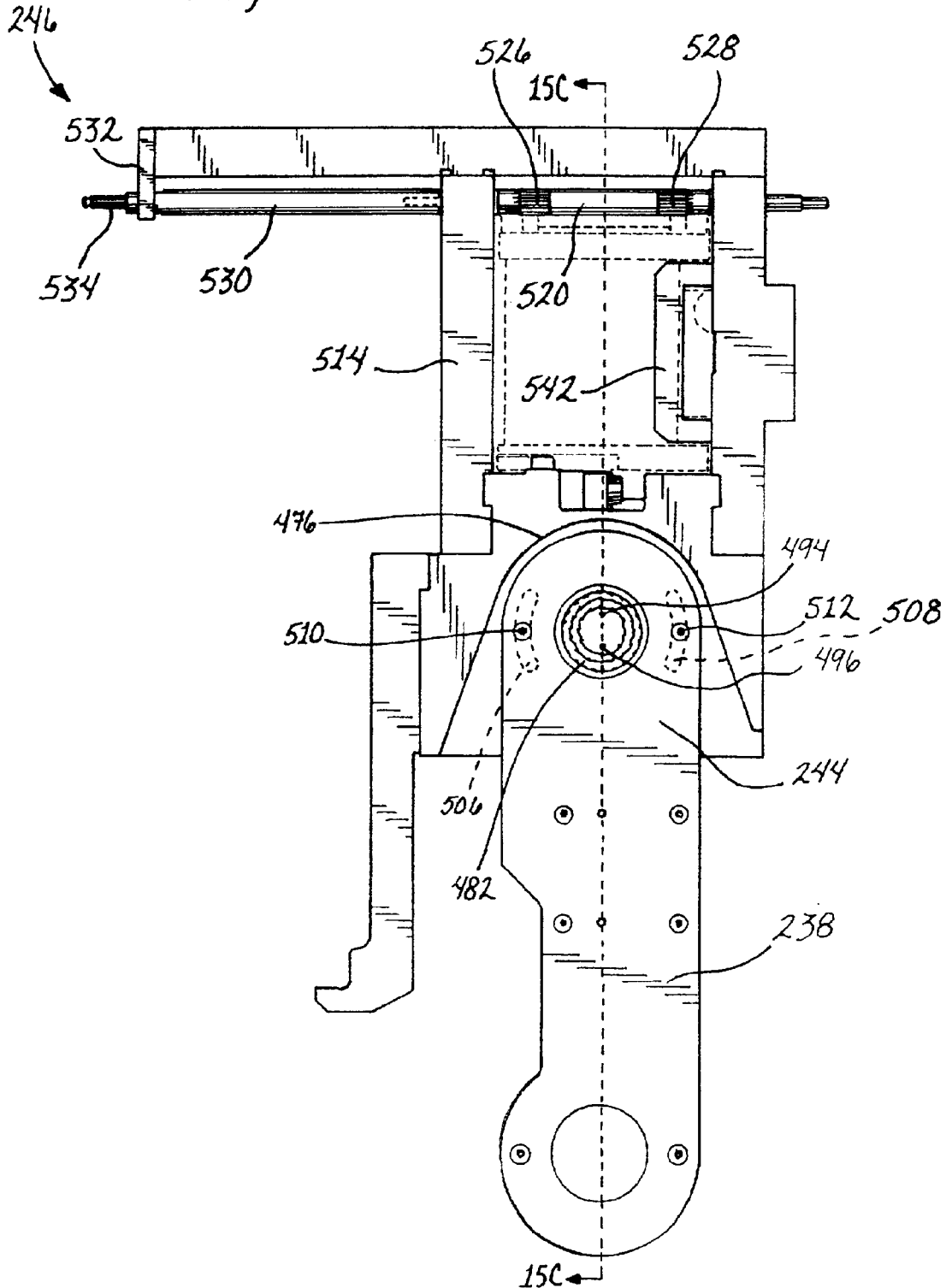
FIG. 15B is a side-elevational view of the pivotal support structure of FIG. 15A showing upper and lower through holes in the hanger member for pivot mounting thereof.

After rolling the crankshaft, the rolling arms 202 are lowered by the arm positioner 288 to allow for unloading of the roll hardened crankshaft, and loading of the next crankshaft to be rolled. The rear portion 282 of the arm 202 extending rearwardly from the pivot connection 250 with the hanger member 238 is preferably weighted as by large counterweight member 326 so that the arm 202 is mass-balanced on either side of the pivot 250. Mass-balancing of the rolling arms 202 provides advantages in terms of ensuring that the influence of the mass of the arms 202 on the rolling process is minimized, and by allowing an operator to easily lift the arm 202 for being placed in a raised or lifted position via hook-arm 328 (FIG. 19F). Referring to FIGS. 8 and 15A, 15B, it can be seen that the hook-arm 328 preferably is attached to the pivotal support structure 208 of the arm 202 so that it shifts axially with operation of the axial shift mechanism 246 for adjusting the axial position of the rolling arm 202 carried thereby. As is apparent, the size of the counterweight 326 is dictated by the weight of the longer forward portion 230 of the arm 202 including the tool heads 204 and 206 and the cylinder assembly 210 mounted thereto which would otherwise excessively weight the forward end portion 230 of the arm relative to the shorter rear portion 242 thereof. It is preferred that the counterweight be sized so that the forward portion 230 has a weight of approximately between two to five kilograms that an operator has to lift when manually manipulating the arms 202.

As previously described, part of the machining cycle with the machine apparatus 200 herein involves the lowering of the arms 202 via the arm positioner 288 for crankshaft unloading/loading operations (FIG. 19E). However, because the illustrated coupling portions 294 of the arm phasing assemblies 290 do not positively capture the corresponding coupling portions 296 of the arms 202, the lowering of the arms 202 is limited by the speed at which the arms 202 fall under the influence of gravity. Accordingly, to reduce cycle times, the mass of the counterweight 326 can be reduced so that the arm forward end portion 230 is sufficiently heavy relative to the arm rear portion 242 so as to increase its speed of descent when lowered by the arm positioner 288. Alternatively, the arm 202 and the size of the counterweight 326 thereof can be substantially maintained to keep the previously described advantages of a mass balanced arm while modifying the coupling portions 294 and 296 so that when engaged, there is a positive capturing of the arm ends 310 by the carriage plates 298 to improve the speed at which the slide 292 can be lowered by the motor 304.

As previously discussed, operation of the drive cylinder assembly 210 linearly advances and retracts the tool head 204 toward and away from the fixed tool head 206. The fixed tool head 206 is releasably mounted in a pocket 330 formed at the forward end of the arm cutout 232 including integral upstanding end portion 332 toward the forward end 310 of the arm 202, as can be seen in FIGS. 10A and 10B. Similarly, the fixed block body 214 of the drive cylinder assembly 210 is mounted in a rearward pocket 334 of the arm cutout 232 including an integral upstanding portion 336 of the arm 202. As the clamping forces on the crankshaft bearing are applied in-line with the fore and aft direction by the tool heads 204 and 206, the opposing arm upstanding portions 332 and 336 aligned in the fore and aft direction with each other serve to provide a robust mounting for the tool head 206 and the cylinder block body 214, respectively, resisting the reactive forces generated by the clamping action of the tool heads 204 and 206.

The guideway system 276 for the advancing and retracting movements of the tool head 204 preferably includes a bearing rail 338 attached to the bottom surface 286 in the arm cutout 232 forwardly of the drive cylinder block 214, as can be seen best in FIGS. 8, 9, 10B and 10E. The tool head saddle 278 can have three roller trucks 340 mounted at the bottom of the lower portion 284 thereof for low friction rolling on the rail 338. At its forward end, the rail 338 terminates adjacent the side face recessed areas 234 of the arm 202, and the trucks 340 are attached toward the rear of the saddle portion 284 as their operative width is greater than that of the arm 202 between the recessed areas 234.

For guiding and supporting the forward portion of the saddle lower portion 284, narrow slide member 342 is fixed to the arm surface 286 forwardly of the slide rail 338 and above the lower portion 234a of the recessed areas 234 of the arms 202. As best seen in FIGS. 10B and 10E, an integral retainer flange 344 projects upwardly into the arm cutout 232 from the arm lower surface 286 substantially aligned below the center point of a clamped bearing. The retaining flange 344 along its bottom surface 346 facing arm surface 286 can have a slide pad member 348 attached thereto. The saddle lower portion 284 can have a reduced or lowered front end extension 350 which slides on the slide member 342 along its bottom surface 350a and is advanced into sliding engagement with the slide pad 348 along its top surface 350b when the drive cylinder 210 is actuated so that the front extension 350 is securely captured between the slide members 342 and 348 during a rolling operation.

As the mass of the crankshaft when it is rotating including the eccentric pins may create forces on the guideway system 276 that are not taken up by the tool head 204, and the low friction roller bearings 338 and 340 only serve to guide the saddle 278, the slide members 342 and 348 are arranged to provide robust support to the tool head 204. In this manner, any reactive forces that may include a component directed toward the guideway system 276 during rolling of the crankshaft can be taken up thereby, and particularly by way of the saddle 278 having its forward end 350 tightly captured between the members 342 and 348. However, to minimize frictional losses in the system 276, the strong slide bearings 342 and 348 are minimized in their size or length by splitting the guiding function for the saddle 278 and tool head 204 carried thereby between the low friction roller bearings 338 and 340 toward the rear of the system 276 and the slide bearings 342 and 348 toward the front of the system 276.

FIG. 9B shows an arm 202' having a slightly modified construction over the arm 202, with modifications to various components attached thereto, such as the drive cylinder assembly 210' and the tool head saddle 278'. For its guideway system, the arm 202' fastens a corresponding pad bearing 348' directly to a stepped portion of the arm 202' to extend rearwardly over the arm surface 286. In addition, the arm 202' at its free end 310' includes the preferred form of a coupling portion 296' for being engaged by the positioning member coupling portions 294. Referring to FIG. 13A, it can be seen that the positioning members 298 preferably include a slotted projecting upper end 352 having opposing side wall portions 354 and 356. The side wall portions 354 and 356 have a coupling pin 358 extending therebetween. The pins 358 of the positioning members 298 are spaced from each other in accordance with the corresponding centerline bearing spacing of the crankshaft to be rolled.

The arm front end 310' is provided with a downwardly opening C-shaped or hook portion 360 sized to fit about a corresponding one of the coupling pins 358 of the positioning members 298. The hook portion 360 can be thinned as by milled-out recesses 362 on either side thereof to allow it to fit between the positioning member side wall portions 354 and 356. With the arm hook portion 360 resting on the pin 358, it will be confined against lateral or axial shifting by the side wall portions 354 and 356.

The construction of the coupling portions could be reversed such that the split wall and pin coupling structure 358 is provided on the arm end 310, as shown in FIG. 9A and FIGS. 19A–19E, whereas the hook portion coupling structure is formed on the projecting ends of the positioning members 298. In this instance, the hook portion coupling structure would be upwardly opening rather than the downwardly opening configuration of the hook portion 360 as used with the arm 202'.

Referring next to FIGS. 10B, 10E and 11, the tool head 204 includes a narrow, main housing 362 having a bracket or cage member 364 for the force-hardening rollers 272 mounted at the front thereof. The tool head housing 362 is releasably secured to an L-shaped mounting bracket 366 which, in turn, is pivotally connected at pivot 366 to the saddle 278. Accordingly, when the tool head 204 is advanced into clamping engagement with the bearing, the housing 362 and attached mounting bracket 266 will rock rearwardly about pivot 368 toward the saddle portion 282. A small, forwardly opening well 370 is formed approximately midway along the height of the vertical saddle portion 282 in which a force sensor or load cell assembly 372 is mounted. As can be seen best in FIG. 10B, the sensor assembly 372 is substantially in-line with the center line of the crankshaft bearing being rolled. The sensor assembly or load cell can 372 be of a piezoelectric-type with there being an actuator pin 374 attached to the back of the bracket 366, that exerts a force on the piezoelectric element when the rollers 272 are clamped onto the bearing. In this regard, the sensor 372 acts as a direct force sensor as its output signal varies based on how much force is applied in a generally normal direction to its sensing element or crystal material by the pin 374 generally in a normal direction to the sensing element.

With the alternative arm 202', the saddle well 370' opens rearwardly. In this instance, the attachment housing 280' provides some play for the tie bar so that once the tool head 204' fixed to the saddle 278' is shifted to its clamped position, the tie bar will continue to shift due to the lost motion in the saddle 278' so that it is the tie bar that actuates the force transducer 372' mounted in the saddle wall 370'.

A shortcoming of the load cell or force transducer 372 is the number of moving parts it relies upon to obtain a determination of the clamping force applied to the crankshaft bearing. For example, if a moving part should bind such as the pivot 368, it is likely that the clamping force readout generated by the load cell 372 will be inaccurate, and likely lower than the clamping force actually exerted on the crankshaft bearing. In this instance, should the source pressure be increased to correct for the inaccurate low force reading generated by the load cell 372 due to the binding, the clamping force applied to the bearing will be excessive potentially causing excessive distortion in the rolled crankshaft. On the other hand, if, for example, the friction in the system such as along the ways 276 causes the force readout to be higher than that actually present at the bearing, and an operator regulates the source pressure downwardly to accommodate for the erroneous reading, then there is the potential for premature fatigue failure of the insufficiently roll hardened crankshaft.

Accordingly, an alternative force transducer or sensor 372 in the form of strain sensor 376 is provided, as shown in FIGS. 16A–16C. The force sensor 376 like that of the load cell 372 can be of a piezoelectric-type, but is one that measures structural deflection in the material of the rolling arm 202 (FIG. 16A) by a change in the elongation of its sensing element due to such structural deflection. With a piezoelectric sensor 376 that is measuring deformation in the rolling arm material, its electrical output signal has to be calibrated by a large multiplier for proper force readings over the piezoelectric sensor signal of load cell 372 due to differences in the mechanical input, i.e. force applied by a pivoting tool head versus very minute structural deflections in substantially rigid metal material such as steel or an aluminum alloy of a rolling arm.

One of the significant advantages of the strain sensor 376 is the reduction in the number of parts needed therefor over those for the load cell 372. Although the strain sensor 376 could be used in conjunction with the load cell 372 as shown in FIG. 16A, it generally will be desirable to use the strain sensor 376 alone because, in addition to part reduction, it can produce more accurate force readouts, as deflection of the rolling arm material is directly proportional to the clamping force placed on the crankshaft bearing and does not rely on any intermediate moving or force-transfer components in the arm assembly. More specifically, the strain sensor 376 allows for the elimination of mounting bracket 366, pivot 368, and the actuator pin 374 all used to transfer force from the pivotal tool head 204 to the sensor assembly 372 on the rolling arm 202. Instead, a single piezoelectric strain sensor 376 and a single retaining screw therefor can mount the sensor 376 in an area of the arm which exhibits linear strain over the range of applied loading. In this way, the strain measured can be calibrated linearly to the force applied to the part during the rolling operation.

Accordingly, with the single arm arrangement as disclosed with respect to rolling arms 202, it is desirable to mount the strain sensor 376 in the area of the upstanding portion 332, although most locations along the arm forward portion 230 should be sufficient to provide a measurable deflection in the arm material such as shown offset slightly rearwardly from the clamped bearing in FIG. 16A. The strain sensor 376 can be used equally well with various scissor-arm arrangements as shown in FIGS. 16B and 16C and still obtain the benefits of part reduction and more accurate measurements of the applied clamping force. As shown in FIG. 16B, upper and lower rolling arms 378 and 380 are pivotally attached at pivot 382 with a drive cylinder assembly (not shown) operable at their rearward ends to pivot the arms 370 and 380 about the pivot 382 for bringing their respective tool heads 384 and 386 fixed thereon into clamping engagement with the crankshaft bearing (see '761 patent). As shown, the strain sensor 376 is attached to the arm 380 toward the end thereof and behind the backup roller head 386. In FIG. 16C, the rolling arms 388 and 390 are pivotally attached at pivot connection 392 and are pivoted thereabout by drive cylinder assemblies (not shown) to bring their respective fixed tool heads 394 and 396 into clamping engagement with a crankshaft bearing (see '893 patent). As shown in FIG. 16C, multiple strain sensors 376 can be used with strain sensor 376a adjacent the force-applying tool head 394 and strain sensor 376b on the arm 390 behind the backup tool head 396.

Regardless of the rolling arm arrangement, the strain sensor 376 is mounted so as to measure a deflection or deformation in the material of the rolling arms which, as mentioned, will typically be directly proportional to the force applied by the tool heads on the crankshaft bearing. This mechanical input is converted to an electrical signal whose output level or voltage will be proportional to the extent of the material deformation. Circuitry for the sensor 376 is provided that allows an operator to calibrate the output so that an accurate readout on the clamping force generated on the crankshaft bearing is provided. Other types of sensing elements besides piezoelectric crystal material could be utilized, such as a capacitive-type or a Wheatstone bridge arrangement, that convert the mechanical distortion of the material in response to applied forces to an electrical signal that is calibrated to measure the clamping force at the bearing. The sensed clamping force can be utilized to servo control machine rolling forces or it can be a monitor for the force being applied. It is believed that the strain sensors 376 will provide for improved control over the applied machine rolling forces and/or more accurate detection of low/high force (load) fault indications when used for force monitoring.

One of the important considerations with the provision of the thin rolling arms 202 herein that mount both the tool heads 204 and 206 thereon for in-line application of clamping force on a crankshaft bearing is in the ability of the drive cylinder assembly 210 to generate the necessary clamping force without reliance on the mechanical advantage a scissor-arm arrangement. Proper force generation by the drive cylinder assembly 210 is also limited by the thin size of the rolling arms 202 that is preferred so that they can be positioned in side-by-side relation for rolling all of the bearings of a crankshaft in a single pass. Accordingly, and as has been described, the block body 214 of the drive cylinder assembly 210 is also made to have a very thin width construction substantially corresponding to that of the rolling arms 202 so as not to increase the width thereof and compromise the ability to roll crankshafts having very narrow axial spacing between adjacent bearings to be rolled. To provide the necessary output force from the drive cylinder assembly 210 so that the desired clamping force on the crankshaft bearing is achieved, the height of the block body 214 is tailored to allow for a sufficient number of small, force-generating cylinders 212 to create the desired output force from the drive cylinder assembly 210 based on the dimensions of the cylinder bores 220 formed in the block body 214. In the preferred and illustrated form, seven such vertically aligned cylinders 212 are provided having bores 220 of approximately 16 mm in diameter with a length sufficient to provide the seven piston rods 222 with a 50 mm stroke. In this regard, the area of each bore 220 is approximately 2.01 square cm, with the operative area for force-generation being approximately 14 square cm for all seven cylinders to provide a total clamping force of approximately 19.4 KN or 623 pounds at the bearing with a source pressure of 138 bar for the drive cylinder assembly 210.

The piston rods 222 have pistons 394 mounted to their rear ends. To minimize pressure losses from the bores 220, the cylindrical body of the pistons 394 preferably have their outer diameter substantially corresponding to that of the bore walls 220 with tolerances therebetween such that the pistons 394 are slip-fit in the bores 220, as shown in FIG. 12C. In one preferred form, the pistons 394 are of a high hardness bronze material that are polished smooth to a precision fit in each bore 220 to minimize friction between the bores 220 and the pistons 394. One of the advantages of the above-described bushing-type of piston 394 rather than the traditional seal type is in its improved performance with respect to wear without slip-stick losses so that the fluid pressure that is translated into forward motion and force output from the drive cylinder assembly 210 is maximized. Since there is no seal to wear out on the bushing pistons 394, even if there is a spot on an edge that wears, there is still the remainder of the body of the piston 394 that is sized to the inner bore surface to keep it sliding tightly thereagainst and with fluid pressure losses minimized. On the other hand with the ring-type contact provided by a traditional piston seal, the wearing of one spot on the seal can create blow-by and eventually ruin the piston seal.

Both the back and front of the cylinder bores 220 are sealed as by screw-plug seals 396 and annular seals 398, respectively. The screw-plug seals 396 are threaded to the rear of the bore 220 and can be cross-slotted as best seen in FIGS. 12A and 12B for engagement by a driver tool. The plug seals 396 completely seal the rear of the bores 220. The annular forward seals 398 are press-fit into the front of the bores 220 with the piston rods 222 extending therethrough. The annular seals 398 include a radially enlarged collar portion 300 toward their rear end, and an enlarged annular lip 402 at their forward end. The bore 200 has a radially enlarged annular groove 404 which receives the seal collar portion 400 therein with the lip 402 engaged tightly against the front face 406 of the cylinder block body 214. The inner surface of the seal 398 is sized to the outer diameter of the piston rods 222 to assist in guiding its travel into and out from the bores 220.

It has been found that with the illustrated piston 394, and seals 396 and 398, pressure losses will be significantly reduced. In practice, where the pressure source is 138 bar or at 2,000 psi, the measured pressure losses are approximately at three to five pounds per cylinder 212 versus approximately the thirty to fifty pound pressure loss found when traditionally designed pistons and sealing arrangements are employed. Of course, with seven cylinders 212, the thirty to fifty pound pressure loss becomes fairly significant, i.e. between 210 and 250 pounds of total pressure loss. In contrast, with the present arrangement, even with multiplication over seven cylinders 212, the pressure losses are still fairly minimal, i.e. twenty-one to thirty-five pounds of total pressure loss. In this way, the present drive cylinder 210 maximizes the amount of the source fluid pressure that is translated into an output force for driving of the tool head 204 into clamping engagement with the crankshaft.

It is also important with so many force generating cylinders 212 that the piston rods 222 thereof all travel at the same speed during a driving stroke of the cylinder assembly 210. As previously described, the piston rods 222 are all attached at their outer ends to a common tie bar 224 as by bolting or the like. The fixed tie bar 224 ensures that all of the piston rods 222 are driven at the same rate out from their cylinder bores 220. The driver tie bar 224 is affixed to the outer ends of the piston rods 222 so as to extend substantially perpendicular to the length of the roller arm 202. In this way, the tie bar 224 cannot be skewed relative to the vertical as it is driven.

The tie bar attachment housing 280 is shown best in FIGS. 10A and 10E. The housing 280 has vertically spaced attachment bores 408 that open rearwardly, one for each of the piston rods 222 so that the forward ends thereof extend therein. The bores 408 each terminate at a vertical internal passage 410 configured to tightly receive the drive bar 224 therein. The attachment housing 280 along its front side is fastened to the rear of the vertical saddle portion 282. Thus, the attachment housing 408 is fixedly coupled to the saddle 278 so that the forward movement of the drive bar 224 and the force generated by the drive cylinder assembly 210 causes forward sliding movement of the saddle 278 for exerting a clamping force on the crankshaft bearing with the tool head 204 carried thereby.

The attachment housing 280 has a flag 412 such as of a metal material fixed at the top thereof for travel therewith. As can be seen best in FIG. 11, the drive cylinder block body 214 has a bracket plate 414 fastened to the top thereof and projecting out forwardly beyond the forward face 406 of the block body 214 above the attachment housing 280 and the flag 412 thereon. As shown in FIG. 12D, the bracket plate 414 has a pair of through apertures 416 and 418 spaced in the fore and aft direction from each other for mounting a pair of sensors 420 and 422 thereto spaced forwardly of the cylinder assembly body 214. The sensors can be proximity switches 420 and 422 that detect the presence of the metallic flag member 412 in the retracted and advanced positions of the piston rods 222 and attached tie bar 224. The rear prox switch 420 detects the flag 412 when the piston rods 222 are in their retracted position as shown in FIG. 11, and the forward prox switch 422 detects the flag member 412 when the piston rods 222 and attached tie bar 224 are in their advanced or clamping positions such as shown in FIGS. 8 and 9A. Accordingly, the prox switches 420 and 422 will detect errors in the firing of the drive cylinder 410 so that an operator knows that the operation thereof is shifting the tool head 204 appropriately with the flag 412 making the switches 420 and 422 accordingly.

As can be seen in FIG. 12C, the bores 220 of the force generating cylinders 212 are all supplied with hydraulic fluid by common manifold passageways 424 and 426 that extend for substantially the length of the drive cylinder block body 214. Ports 428 and 430 are formed at the top of the block body 214 for mounting of respective fluid line couplings 432 and 434 (FIG. 11) thereto. Because each bore uses common manifolds 424 and 426 for hydraulic fluid entering and leaving therefrom, a single valve controlling the fluid supply pressure can be utilized. As shown, the manifold 424 communicates with the rear of each of the bores 420 while the manifold 426 communicates toward the forward end of the bores 220. The port 428 is aligned with the vertical manifold passageway 424 while the port 430 is between the manifold passageways 424 and 426 and has a horizontally extending passageway 436 in communication with the bottom of the port 430 and the top of the manifold passageway 426.

Thus, for an advancing, driving stroke of the drive cylinder assembly 210, hydraulic fluid is fed through the port 428 into the manifold passageway 424 with hydraulic fluid forwardly of the pistons 394 exhausted from the block body 214 through the manifold passageway 426, horizontal passageway 436 and exiting via port 430. For a retracting stroke of the drive cylinder 410, hydraulic fluid is fed through the port 420, manifold passageway 426, and passageway 436 with hydraulic fluid rearwardly of the pistons 394 leaving the block body 214 via the manifold passageway 424 and the port 428 in communication therewith.

An alternative drive cylinder assembly 210' is shown in FIGS. 12E and 12F. The main difference in the drive cylinder assembly 210' over drive cylinder assembly 210 is in its height dimension as it includes an upper portion 438 lacking in cylinder assembly 210 for the provision of a fore and aft throughbore 440 through which services such as lube-lines for the tool heads 204 and 206 and electrical lines for the force transducer assembly 372 can be run back along the arm 202' from the forward tool area thereof. The operative height of the cylinder assembly 210' in terms of its ability to provide the necessary output force for achieving the desired clamping force at the crankshaft bearing as well as a robust mounting to the arm 202' as will be described hereinafter will remain substantially the same as that of drive cylinder assembly 210, i.e. approximately 250 mm.

Because of the extended height of the drive cylinder assembly 210', the top thereof is not drilled for fluid porting or fasteners as is cylinder assembly 210. Instead, the corresponding fluid ports 428' and 430' are open to the stepped rear face 442, and extend horizontally forward into communication with the respective vertical manifolds 424' and 426'. The corresponding bracket mount for the prox switches 420 and 422 is a right angle bracket 414' (FIG. 9B) secured to the stepped front face 406' of the drive cylinder assembly 210' as by fastening thereto.

Both of the cylinder assemblies 210 and 210' have a plurality of rearwardly projecting locking arms 444 for interlocking the cylinder assemblies 210 and 210' to the arm upstanding portion 336, and in particular in corresponding recesses 446 (FIG. 10A) formed therein to provide a strong anchoring of the cylinder assemblies 210 and 210' to their respective rolling arms 202 and 202'. As can be seen best in FIGS. 12A and 12D, the locking arms 444 include a narrow rearwardly extending portion 448 aligned with the side face 216 of the block body 214 with a distal enlarged or thicker portion 450 of the arm 444 formed at the rear of the narrow portion 448. The arm recesses 446 are configured to have a mirror image shape to that of the locking arms 444 formed in the side face 226 of the rolling arms 202 and 202' so that a deeper portion of the recess 446 is provided for snugly receiving the arm enlarged portion 450 therein. Bolt fasteners 452 extend through the enlarged arm portion 450 into corresponding tapped apertures in the deep portion of the arm recesses 446 for securing the locking arms 444 into the recesses 446. In the illustrated cylinder assemblies 210 and 210', the locking arms 444 are vertically spaced so as to separate the cylinders 212 into three groups, an upper and a lower pair of cylinders 212 with an intermediate set of three cylinders 212 between the upper and lower pairs. The bottom of the cylinder assemblies 210 and 210' are similarly secured to the arms 202 and 202' albeit with the arm portion 448 projecting downwardly flush with the block body face 216 and having the enlarged portion 450 at its lower distal end with both elongated in the fore and aft direction, as seen in FIGS. 12A and 12B. Similarly, the corresponding recess 446 on the arm is formed on the bottom surface 286 of the arm cutout 232 adjacent the upstanding arm portion 336 extending in the fore and aft direction and is milled in the arm face 226.

As best seen in FIG. 12F, the upper portion 438 of the cylinder assembly 210' has a varying width construction with the fore and aft throughbore 440 formed in an enlarged width section 454 and there being thinner sections 456 and 458 above and below the intermediate portion 454. As can be seen in FIG. 12F, the upper thin section 456 of the cylinder assembly portion 438 has a small transverse through aperture 460. A dowel pin is press-fit in the aperture 460 so that it projects from either side thereof. The hook arm 328 has a split or forked hook end 462 as shown in FIG. 15A to allow opposing side portions 462a and 462b to fit on either side of the thin section 456 of the drive cylinder portion 438. In this manner, the hook arm 328 is able to support the dowel pin projecting out from either side of the aperture 460 for raising the arm 202' to its lifted position to allow for axial adjustments via the axial shift mechanism 246 of the pivotal support structure 208.

Similarly, the arm 202 has a through aperture 464 corresponding to that of through aperture 460 provided in thinned area 466 rearwardly of the upstanding portion 336 of the arm 202. The thinned area 466 is formed by recesses milled out from opposite side faces 226 and 228 of the arm 202 to allow the hook end split portions 462a and 462b to fit thereabout for supporting ends of the pin projecting out from either side of the through aperture 464 with the arm 202 in its lifted or raised position for axial shifting thereof.

Turning next to FIGS. 15A–15D, the pivotal support structure 208 will be more specifically described. As can be seen in FIG. 15C, the hanger member 238 is formed by a pair of large, elongated plates 468 and 470 separated by a spacer member 472 approximately midway along their length between the lower and upper ends 240 and 244 of the hanger member 238. The upper pivot connection 252 is formed between the hanger member 238 at the upper end 244 thereof and a hanger mounting plate 472. The mounting plate 472 has a thinned portion 474 to which the hanger plates 468 and 470 are pivotally attached on either side thereof. The thin portion 474 is milled from the mounting plate 472 to have a curved upper section 476 with downwardly extending walls 478 and 480 that taper away from each in the forward and rearward directions, respectively. In this manner, pivoting of the hanger member 238 in the fore and aft directions about upper pivot connection 252 is accommodated by the tapered configuration of the mounting plate thin portion 474.

The mounting plate portion 474 has a through aperture 482 formed therein with corresponding apertures 484 and 486 formed in respective hanger plates 468 and 470. To connect the plates 468 and 470 through the mounting plate aperture 482, the hanger plates 468 and 470 include respective connecting pin portions 488 and 490, as shown in FIG. 15D. The connecting pin portion 490 has a central recess 492 into which the connecting pin portion 488 is tightly received and secured therein as by fasteners 494 and 496 so that the attached pin portions 488 and 490 serve as a pin bearing for the hanger member 238.

Continuing reference to FIG. 15D, it can be seen that the mounting plate portion 472 includes a small lip section 498 that projects radially into the aligned plate apertures 484 and 486. Accordingly, the connecting pin portions 488 and 490 have enlarged cover portions 500 and 502, respectively, sized at their outer diameter to the plate apertures 484 and 486 so that the lip section 498 is captured therebetween at their outer peripheries. In this manner, the bearing pin formed by the pin portions 488 and 490 is retained in the aperture 482. To allow for pivoting between the hanger member 238 and the mounting plate 472, an annular bushing 504 is fit between the bearing pin portion 490 and the lip section 498 of the plate portion 474. The bushing 504 at its inner diameter bears against the outer diameter of the pin portion 490, and at its outer diameter against the inner diameter of the plate section 498.

For guiding the fore and aft pivoting of the hanger member 238 about the upper pivot connection 252, opposing arcuate slots 506 and 508 are formed in the plate portion 474, as shown in FIG. 15B. As can be seen, the slots 506 and 508 are configured so that slot 506 is forwardly of the aperture 482 and slot 508 is rearwardly of the aperture 482 with both following the curvature of the aperture 482 and centered on the horizontal centerline thereof and extending for approximately thirty degrees upwardly and lowerly therefrom. The hanger member 238 includes guide members 510 and 512 in the form of bolt fasteners or the like that are secured to the hanger member plates 468 and 470 extending through the respective slots 506 and 508. The guide members 510 and 512 are diametrically opposite each other and arranged so that with the hanger 238 in its vertical orientation and the arm 202 in its horizontal orientation, the guide members 510 and 512 will be aligned horizontally.

The guide members 510 and 512 slide in the slots 506 and 508 as the hanger member 238 is caused to pivot during a rolling operation of a crankshaft, and particularly with a rolling of a pin bearing thereof. The ends of the slots 506 and 508 will define limits of the pivoting movement of the hanger member 238 with the guide members 510 and 512 engaged thereagainst. Further, the mounting plate walls 478 and 480 are tapered so as to permit the full range of the fore and aft pivoting component of the pivoting of the hanger member 238 as allowed by the cooperating slots 506, 508 and guide members 510, 512.

The mounting plate 472 is suspended from the cross-beam 248 by vertical members or bars 514 and 516 fixed to the plate 472 at their lower ends and elongate attachment bar 518 fixed at their upper ends. The vertical bars 514 and 516 have a geared shaft 520 of the axial shift mechanism 246 that is journaled to their upper ends adjacent to and below the attachment bar 518. The vertical bars 514 and 516 are positioned and sized so that they define a space 521 therebetween and over the top of the mounting plate 472 and below the shaft 520 through which the cross-beam 248 extends with the bars 514 and 516 arranged forwardly and rearwardly, respectively, of the beam 248. Along the top of the beam 248 are a pair of axially extending gear racks 522 and 524 of the shift mechanism 246. The shaft 520 has a pair of geared sections 526 and 528 which cooperate with the respective gear racks 522 and 524 so that upon rotation of the shaft 520, the entire pivotal support structure 208 will be shifted axially. The cross-beam 248 and gear racks 522 and 524 are provided with a length sufficient to allow one or more arms 202b to be axially shifted to a parked position (FIG. 6A) axial offset relative to the working area between the head and tail stocks 254 and 256.

For this purpose, the shaft 520 is coupled to an extension shaft 530 extending forwardly from the bar 514 to a forward mount 532 to which the shaft 530 is journaled with a short actuator member 534 connected to the shaft 530 and extending forwardly from the mount 532. The mount 532 is rigidly attached to the support structure 208 via the attachment bar 518 that extends forwardly beyond the forward vertical bar 514 and which is fastened to the mount 532 at its forwardmost end. Accordingly, to adjust the axial position of the rolling arm 202 or 202', the operator lifts the rolling arm to hook the pin fixed in the arm aperture 464 or the cylinder aperture 460 onto the hook end 462 of the arm 328, which is fixed to the forward end of the mounting plate 472. With the arm 202 or 202' in its lifted position, the operator then rotates the actuator member 534 causing the shaft geared sections 526 and 528 to drivingly engage in the respective gear racks 522 and 524 for advancing the support structure 208 in the desired axial direction.

Once the operator has achieved the desired axial positioning of the rolling arm 202, arm lock 536 is employed to affix the arm in the adjusted axial position thereof. The arm lock 536 can be integrated to the vertical bar 516 and also includes a strike plate 538 on the cross-beam 248. More particularly, the arm lock 536 includes a piston block 540 formed integrally with the bar 516 and projecting rearwardly therefrom, as best seen in FIGS. 15A and 15B. A generally U-shaped slide bracket 542 opens rearwardly and is attached to the front side of the vertical bar 516 in general alignment with the piston block 540. The strike plate 538 is elongated in the axial direction and is mounted to the back of the cross-beam 248 offset therefrom by mounting plates 544 and 546 at either end thereof. As shown in FIG. 8, the offset provided by the plates 542 and 546 allows the strike plate 538 to fit in the space between the U-bracket 542 and the front of the vertical rail 516 for axial sliding of the piston block 540 and bracket 542 along the strike plate 538.

The piston block 540 is provided with piston bores 548 which open forwardly and through which piston rods (not shown) are driven for locking of the structure 208 in fixed axial position relative to the cross-beam 248. It is preferred to utilize hydraulic fluid in the piston block 540 from the same source 221 as that for the drive cylinder assemblies 210. In this regard, the piston rods are driven to be advanced out from the piston bores 548 for spearing the strike plate 538 by 2,000 psi of pressure. The distal ends of the piston rods can be provided with a friction material akin to that utilized for brake lining for high-pressure engagement with the strike plate 538. Both the hydraulic cylinder assemblies 210 and cylinder blocks 540 can be supplied high pressure hydraulic fluid by a common line so that operation of the same valve controls actuation of the cylinder assemblies 210 and 540. Thus, when the tool head drives 210 are fired, the arms 202 will be simultaneously locked in their axial position by operation of the arm locks 536. In this manner, the driving operation of the tool head 204 can only occur with the axial locking of the arm 202 being employed to effect an interlock between these two operations.

Similar to the upper pivot connection 252, the lower pivot connection 250 is formed by a connecting pin and bushing arrangement, and thus will only generally be described hereinbelow. Both the hanger member plates 468 and 470 extend on either side of the arm thinned portion 466, as best seen in FIG. 10C. The connecting pin portion 550 of the hanger plate 468 has a central recess 552 open toward the plate 470 for receiving the projecting pin portion 554 thereof. The pin portions 550 and 554 are tightly drawn together by upper and lower fasteners 556 and 558 with the pin portion 554 received in the recess 552, and respective cover portions 556 and 558 sized to capture the radially inwardly extending lip section 560 of the arm thinned portion 466 therebetween. An annular bushing fits in the annular gap formed between the outer diameter of the pin portion 550 and the inner diameter of the lip section 560 so that the pin bearing can pivot relative to the arm thinned area 466 to accommodate up and down pivoting movement of the arm 202 during a rolling operation.

In addition, the arm 202 includes opposing arcuate slots 561 and 563 on either side of its pivot connection 250 to the hanger arm 238 which is provided with guide members 565 and 567 that extend into the slots 561 and 563. In this way, like the previously-described upper slots 506 and 508 and guide members 510 and 512, the arm 202 is guided by the members 565 and 567 riding in the respective arcuate slots 561 and 563 for the up and down component of the pivoting thereof during crankshaft rolling operations. The slot positioning is shown as being slightly modified in the arm 202' with the forward slot 561' shifted to extend further above and around the pivot connection 250, and the rearward slot 563' shifted in a similar fashion but downwardly both by an extra fifteen degrees or so as to remain diametrically opposed with respect to each other and to allow the arm 202' to pivot further downwardly such as for accommodating a further descent of the arm 202' when lowered by the arm positioner 288.

The arm positioner 288 having the arm phasing asssembly 290 removed therefrom will next be described in more detail with reference to FIGS. 14A–14E. The vertical slide 292 includes a mounting or retaining channel bar 562 extending thereacross. The positioning members or carriage plates 298 are attached to plate mounts 564 that are detachably connected to the slide 292 via the channel bar 562. More specifically, the vertical slide 292 includes slots 564 spaced across the top thereof into which the plate mounts 564 can be hooked with the bottom of the plate mounts 564 received and supported in channel 562a of the channel bar 562. As shown, the plate mounts 564 each have two or three carriage plates 298 attached thereto. In this way, an operator need not lift an entire arm phasing assembly 290 for a particular crankshaft configuration for attaching and detaching it to and from the vertical slide 292. In practice, by providing several plate mounts 564 for two or three carriage plates 298 each, it has been found that the total weight to be lifted by an operator can be kept to approximately 10 kg.

Figure 14B:
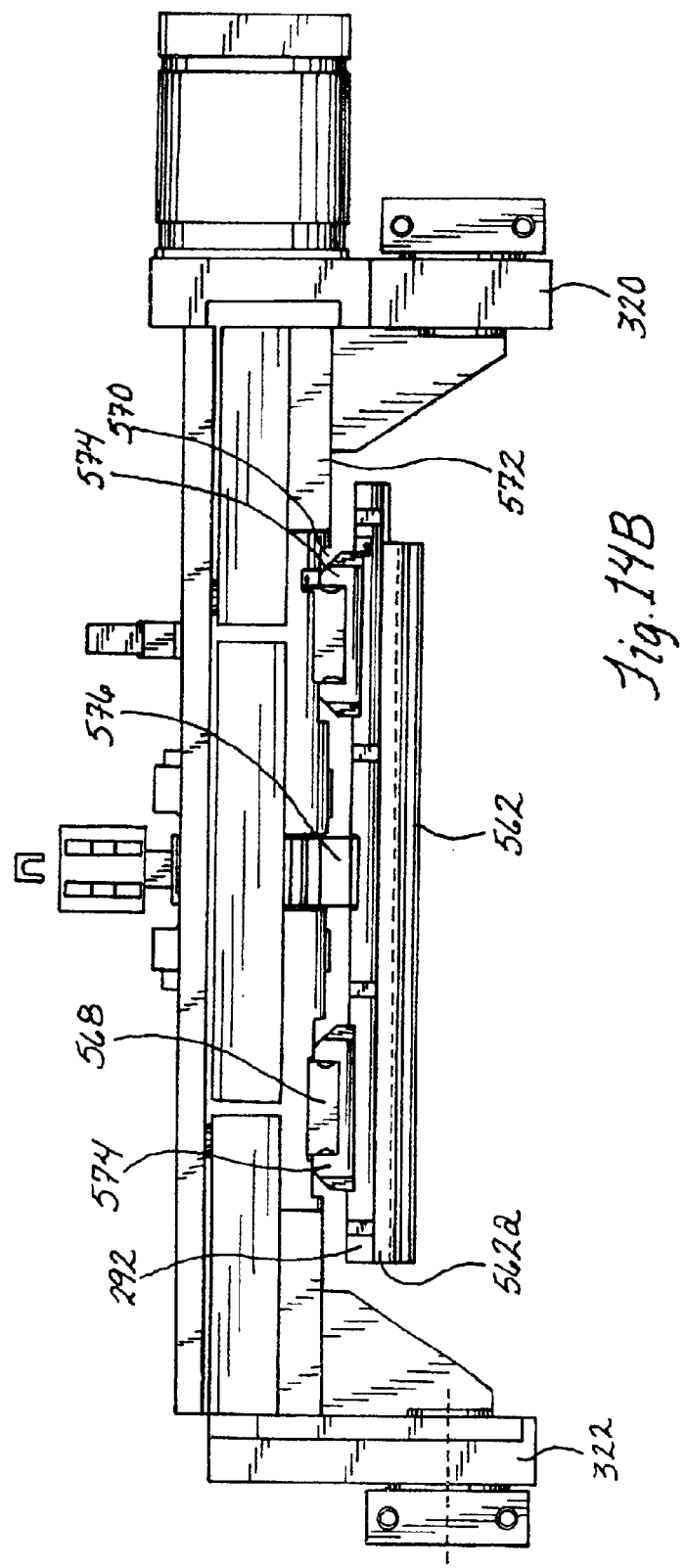
FIG. 14B is a plan view of the arm positioner showing slide bearings for guiding the raising and lowering of the vertical slide.

The arm positioner frame 308 includes a vertical wall 588 along which the slide 292 is shifted. To guide the vertical sliding action of the slide 292 along the frame wall 588, a pair of rollerways 568 in the form of tracks or rails are attached in vertical elongated recesses 570 formed in rearwardly facing surface 572 of the frame wall 588. As best seen in FIG. 14B, the slide 292 has roller bearing trucks 574 attached on the front thereof and captured on the rollerway tracks 568 for rolling thereon during vertical up and down sliding of the slide 292.

Figure 14E:
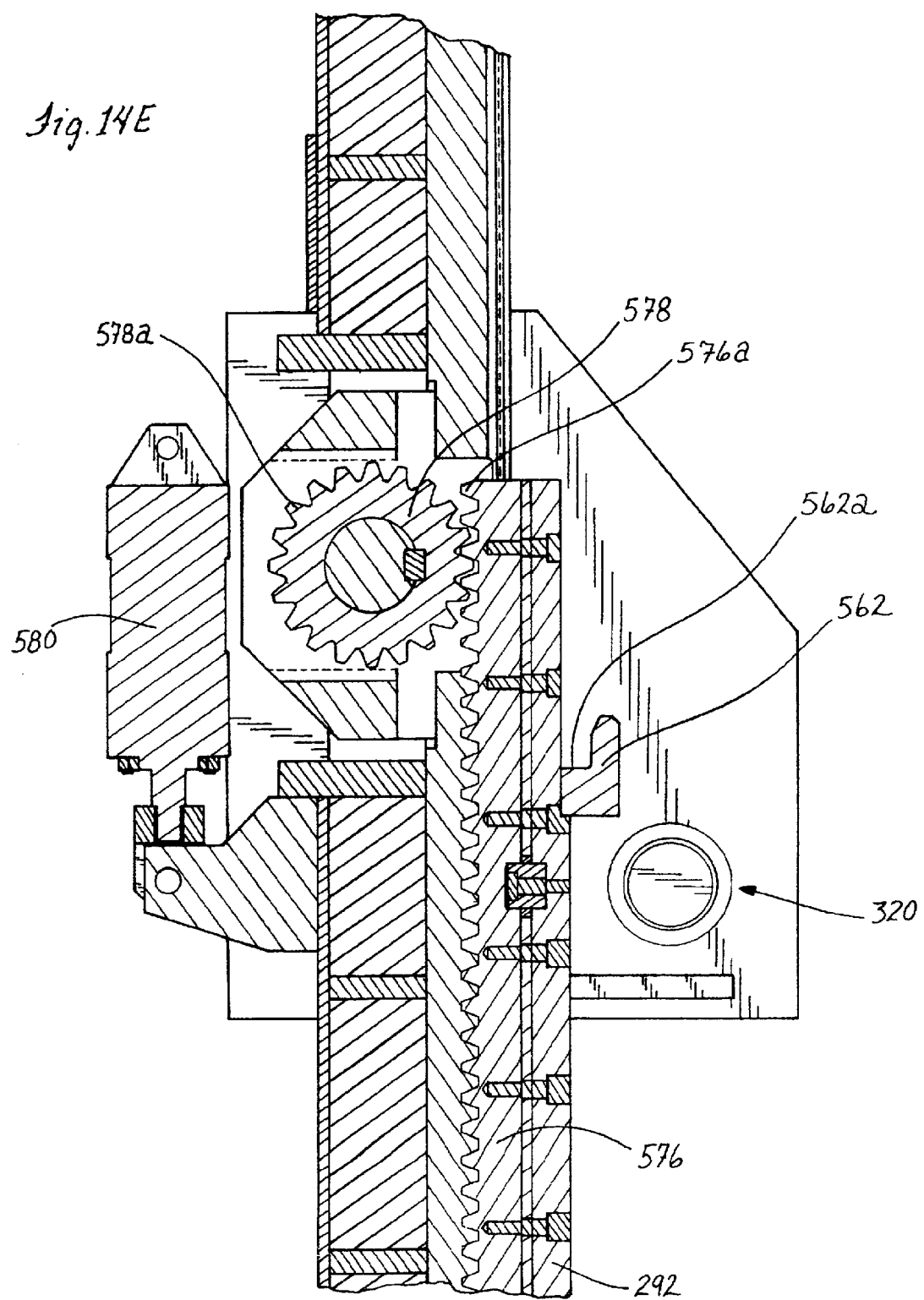
FIG. 14E is a cross-sectional view taken along line 14E—14E of FIG. 14D showing a gear rack attached to the back of the slide and having teeth for meshing with teeth of the gear.

For shifting of the slide 292, a vertically elongated gear rack 576 is attached on the front of the slide 202 between the roller trucks 574, as is shown in FIGS. 14B and 14E. The drive motor 304 of the shift mechanism 300 rotates a pinion gear 578 in gear housing 580 via motor output shaft 582 connected to pinion shaft 584 by shaft coupling 586. The arm positioner wall 588 includes cutout through opening 590 in which the gear housing 580 is mounted. As can be seen best in FIG. 14E, the gear housing 580 allows teeth 578a of the pinion gear 578 to mesh with teeth 576a of the vertical gear rack 576 so that upon operation of the drive motor 304, rotation of the pinion gear 578 causes the gear rack 574 and attached slide 592 to travel upwardly or downwardly depending on the direction of rotation of the gear 578.

As previously discussed, with the slide 292 in its raised position, the shift mechanism 302 is operable to pivot the arm positioner frame 308 via power cylinder 306. The power actuator cylinder 306 can be a hydraulic cylinder that is pivotally mounted at both its cylinder end 592 and at its actuator member or rod end 594 with one pivotally connected to the machine frame 258 and the other connected to the pivotal arm positioner frame 308. The arrangement with the cylinder end 592 pivotally operably connected to the machine frame and the piston rod end 594 pivotally connected to the front of the frame body wall 588 is shown in FIG. 13B, while the reverse arrangement is shown in FIGS. 14C–14E. In either instance, the actuation of the hydraulic cylinder 306 causes the frame body 308 to pivot about the pivots 318 and 320 with the slide 292 already having been shifted to its raised position by operation of the motor 304 of the shift mechanism 300.

Accordingly, it is preferred that prior to operation of the shift mechanism 302 and pivoting of the arm positioner frame 308, the rolling arms 202 are lifted by shifting of the vertical slide 292 with the appropriate arm phasing assembly 290 detachably mounted thereon such that the crankshaft bearings are centered between the tool heads 204 and 206 on the arms 202. To obtain their operative positions, the rearward pivoting of the arm positioner frame 308 causes the positioning members 298 engaged with the respective rolling arms 202 to push the same rearwardly up to the point where the backup tool head 206 is engaged with the crankshaft bearing. In this manner, once the drive cylinder assembly 210 is fired, the driven tool head 204 will clamp the bearing between it and the engaged backup tool head 206. Similarly, when a rolling operation is completed, and the arm positioner slide 292 is raised and pivoted by the respective shift mechanisms 300 and 302 so that the positioning members 298 are engaged with the rolling arms 202 as has been described, the forward pivoting of the rearwardly pivoted frame body 308 by actuation of the cylinder 306 creates clearance between the rolled bearing the tool heads 204 and 206 prior to lowering of the positioning members 298 and engaged rolling arms 202 by actuation of the shift mechanism 300.

In FIG. 19A, it can be seen that the arm 202a is fixed and does not pivot during a crankshaft rolling operation so as to serve as a steady rest function. Particularly, with long crankshafts such as in-line six-cylinder crankshafts, the inertia from rolling can create large pulling and pushing forces on the crankshaft causing deflections, which, if excessive, may result in added distortion to the part after it is rolled. Accordingly, the steady rest arm 202a minimizes such deflections as in addition to end supports provided by the head and tailstocks, there is an intermediate support or supports provided by steady rest arm or arms 202a.

To constrain the arm 202a against pivoting, the fixed support 257 therefor is provided, such as attached to the arm positioner 288, as best seen in FIG. 13A. A mounting block 596 is secured to the top of the positioner 288 and has a rearwardly facing mounting rail 598 formed thereon. The arm support 257 can be adjusted along the rail 598 and affixed thereto so as to be in axial alignment with the main bearing to which the arm 202a is to be clamped. In this regard, the support 257 will be positioned between a pair of adjacent plate mounts 564, as shown in FIG. 13A. Where there are three plate mounts 564, a second like support 257 could be included so that there are two steady rest rolling arms 202a.

The headstock unit 254 and tailstock unit 256 shown in FIGS. 17 and 18, respectively, serve as end supports for the crankshaft and together form the crankshaft rotary support or drive device utilized in the illustrated machine apparatus 200. The headstock 254 includes a box spindle 600 and a servo motor 602 mounted on a headstock carriage platform 604. A pulley belt drive systems 606 connects the output of the servo motor 602 to a chuck 608 of the spindle 600. The chuck 608 has gripping members 608a that can be shifted to hold the flange end of the crankshaft with the tail end held by the tailstock 256, as described hereinafter. Operation of the servo motor 602 rotates the chuck 608 and held crankshaft and allows the crankshaft to be set at its predetermined rotary position for proper shifting of the rolling arms 202 or 202' to be raised and lowered by the appropriately configured arm carriage assembly 290 mounted to the arm positioner 288, as has been described.

The tailstock 256 includes a spring-loaded quill or center 610 for engaging the postend of the crankshaft and accommodating different lengths of crankshafts to be rolled and any axial growth thereof during a rolling operation. The tailstock 256 is mounted on a carriage platform 612 therefor. Both the carriage platforms 604 and 612 are axially adjustable along roller slideways 614 and 616, respectively, each including respective slide rails 618 and 620 that are mounted on the forward raised portion 262 of the machine base 260. Each of the carriages 604 and 612 can be shifted via drives in the form of hydraulic actuators 622 and 624, respectively. Accordingly, during crankshaft unloading/loading operations, the actuators 622 and 624 can be operated to shift the headstock 254 and tailstock 256 axially away from each other. After loading of the crankshaft, the actuators 622 and 624 are operated to shift the headstock unit 254 and tailstock unit 256 axially toward each other for rotatably holding the loaded crankshaft. As shown in FIG. 18, the tailstock unit 256 can include a nest 626 to assist in supporting the crankshaft during chucking operations with the head and tailstocks 254 and 256.

Figure 19B:
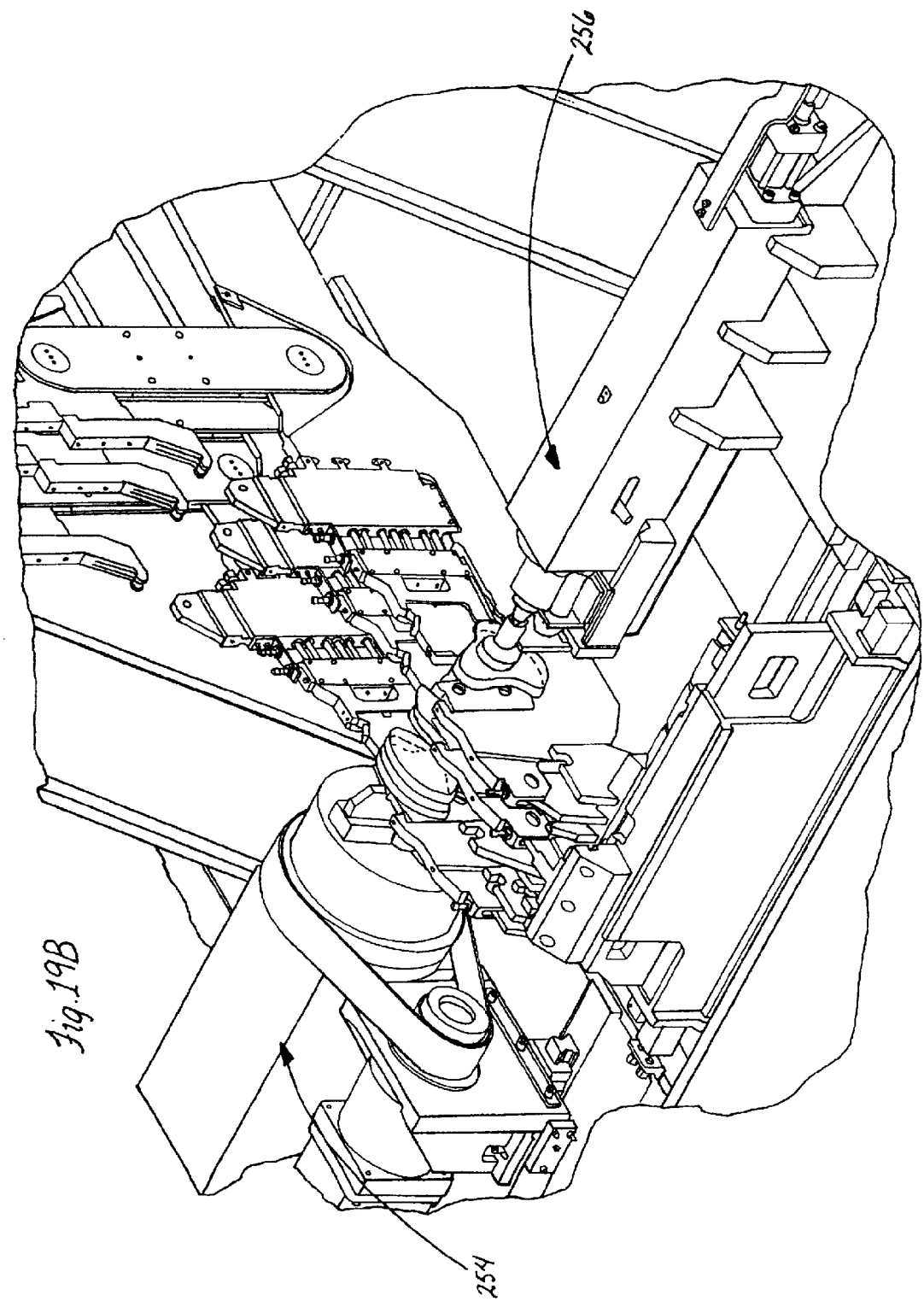

Referring next to FIGS. 19A–19F, a machining sequence utilizing the machine apparatus 200 herein will be described. As shown in FIG. 19A, the headstock 254 and the tailstock 256 are in their retracted positions while the crankshaft is loaded. The crankshaft 22 is illustrated as being supported on the nest 626 of the tailstock at its post end and a similar nest member 628 at the crankshaft flange end. The arm 202a is shown attached to its support 257 on the arm positioner 288 prior to the tool heads 204 and 206 being shifted into clamping engagement with the main bearing of the crankshaft therebetween. In this regard, both tool heads 204 and 206 of the arm 202a will be in clearance or spaced positions relative to the main bearing. At this point, the operator will connect the other rolling arms 202 that are to be used in the rolling operation to the phasing assembly 290, and particularly the positioning members 298 thereof via the coupling portions 294 and 296.

The headstock 254 and the tailstock 256 are then advanced toward each other by operation of their hydraulic actuators 622 and 624 for holding or chucking the crankshaft 22 therebetween with at least the flange and nest member 628 being retracted downwardly for clearance during a rolling operation. The arm positioner 288 is then operable to raise and to rearwardly pivot the arms 202 including rearward pivoting of the steady rest arm 202a to their operative positions with their associated tool heads 204 and 206 ready to be clamped onto the crankshaft bearings they are to roll, as shown in FIG. 19B. After rearward pivoting, the rollers of tool head 206 will be engaged with the bearing they are to roll.

Figure 19C:
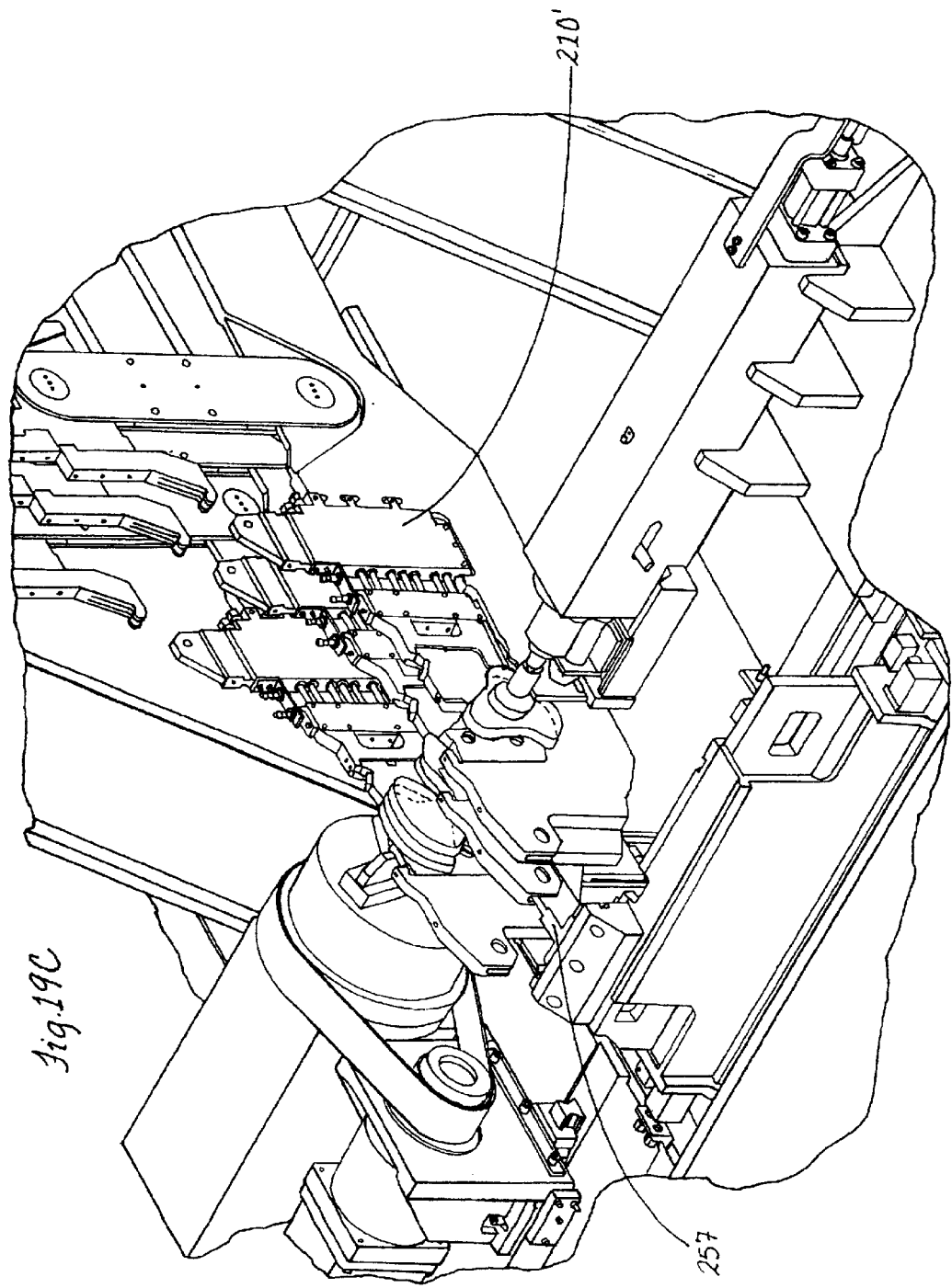

Next, the drive cylinder assemblies 210' are fired to advance their associated tool heads 204 into clamping engagement with the crankshaft bearings to be rolled, and the chucking or gripping members 608a are shifted to clamp onto the crankshaft flange end so that it is rotatably held by the chuck 608. The vertical slide 292 of the arm positioner 288 is then lowered via the shift mechanism 300 with the positioner frame 308 still in its rearwardly pivoted state. Lowering of the slide 292 with the arms 202 clamped at the crankshaft bearings causes the phasing assembly 290 to separate from the rolling arms 202 to shift to its clearance position whereas the support 257 for the steady rest arm 202a stays engaged therewith, as shown in FIG. 19C. At this point, the rolling operation is ready to occur by operation of the headstock 254 to drive the crankshaft for rotation. The typical rolling cycle will include two revolutions of the crankshaft to ramp up to the maximum rolling pressure with six revolutions of the crankshaft at the high maximum pressure and two revolutions of the crankshaft to ramp the pressure back down to zero.

Figure 19D:
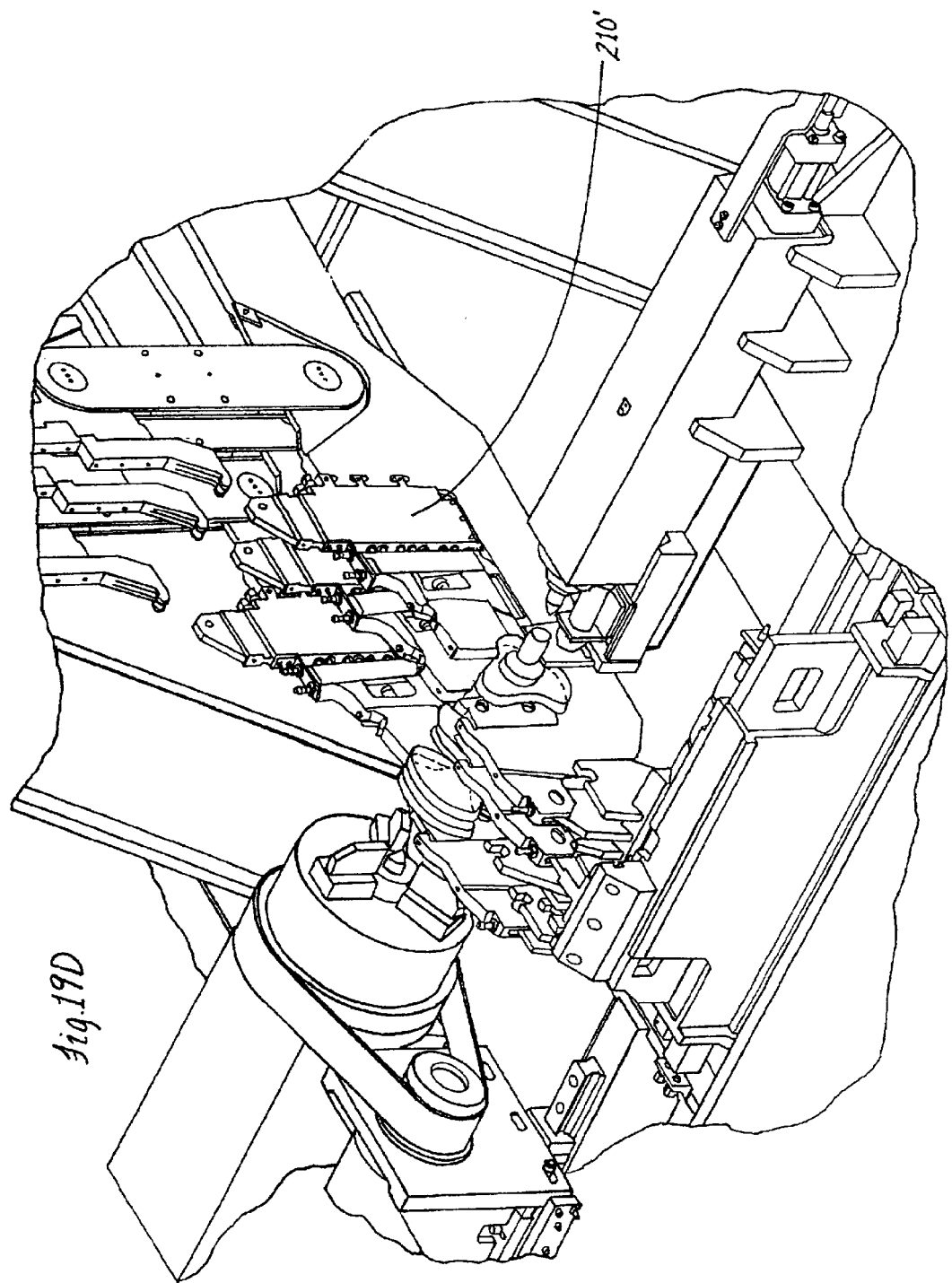

After rolling, the vertical slide 292 is raised along the rearwardly pivoted arm positioner frame wall 588 to bring the positioning members 298 into engagement with the rolling arms 202 with the crankshaft having been rotated to a predetermined programmed rotary position which is the same position of the crankshaft at which the positining members 298 disengaged from the arms 202 prior to the crankshaft rolling operation. The cylinder assemblies 210' are then actuated to retract the tool head 204, the chuck 608 is opened, and the headstock 254 and tailstock 256 are retracted, as shown in FIG. 19D.

The shift mechanism 302 of the arm positioner 288 is then operated to pivot the frame 308 forwardly creating clearance between the tool head 206 on the arms 202 and 202a and the just rolled crankshaft bearing. Thereafter, the shift mechanism 300 is operated to lower the arms 202 to their clearance position to allow for unloading of the rolled crankshaft 22, as can be seen in FIG. 19E. Should a crankshaft having a different configuration of its bearings be the next to be rolled by the machine 200 herein, the operator lifts the arms 202 including any steady rest arm or arms 202a into their lifted position via the hook arms 328 therefor and then operates the axial shift mechanism 246, as has previously been described. A scale 630 can be provided on the front of the cross-beam 248 to allow an operator to make precision axial adjustments of the arms 202.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

We claim:

1. A rolling apparatus for rolling a workpiece rotatable about a rotational axis, the rolling apparatus comprising:
   a rolling arm;
   an arm support for supporting the rolling arm to allow the arm to follow the workpiece as it rotates for being rolled;
   a first rolling head mounted on the rolling arm and including at least one roller to engage the workpiece and apply pressure thereto during a rolling operation;
   a second rolling head mounted on the rolling arm spaced from the first rolling head and including at least one roller to engage the workpiece and to apply pressure thereto during a rolling operation;
   a drive associated with the rolling arm for shifting one of the first and second rolling heads relative to the other rolling head between an open position to provide clearance between the heads for a workpiece bearing to be rolled and a closed position for undertaking the rolling operation;
   guide surfaces of the arm and the one rolling head that guide the shifting of the one rolling head by the drive from the open position to the closed position with the guide surface of the one rolling head engaged with the guide surface of the arm when the one rolling head is shifted to the closed position; and
   a backing portion of the arm that is disposed behind one of the drive for the one rolling head and the other roller head with the backing portion being integral with the arm to provide robust mounting for the one of the drive and the other rolling head for resisting reactive forces generated by the pressure applying tool head rollers in the closed position during the rolling operation of the workpiece bearing.

2. The rolling apparatus of claim 1 wherein the first rolling head is fixed to the rolling arm and the one rolling head comprises the second rolling head that is movable rectilinearly along the rolling arm between the open position and the closed position.

3. The rolling apparatus of claim 2 wherein the guide surfaces comprise slide surfaces on the second rolling head and the rolling arm that are engaged to guide the second rolling head for rectilinear sliding movement along the rolling arm.

4. The rolling apparatus of claim 2 wherein the drive associated with the rolling arm comprises a fluid cylinder mounted on the rolling arm and connected to the second rolling head to shift the second rolling head rectilinearly along the rolling arm.

5. The rolling apparatus of claim 1 wherein the drive associated with the rolling arm comprises a motor drive mounted on the rolling arm and connected to at least the second rolling head to shift it between the open and closed positions.

6. The rolling apparatus of claim 1 wherein:
   the first rolling head is fixed on the rolling arm;
   the rolling arm and the second rolling head include the guide surfaces that guide the second rolling head for movement toward and from the first rolling head; and
   the drive is mounted on the rolling arm for shifting the second rolling head toward or away from the first rolling head.

7. The rolling apparatus of claim 6 wherein the drive is a hydraulic cylinder device having one portion fixed to the rolling arm and a second movable portion fixed to the second rolling head to move the second rolling head.

8. The rolling apparatus of claim 1 wherein the rolling arm is elongated horizontally; and
   the backing portion on the rolling arm is positioned behind the other rolling head to resist the forces applied during the rolling operation.

9. The rolling apparatus of claim 1 wherein:
   the drive comprises a hydraulic cylinder having a substantially fixed body portion and a moveable actuator portion for shifting the second rolling head to the closed position; and
   the backing portion of the arm is positioned behind the hydraulic cylinder body portion to resist the forces applied during the rolling operation.

10. The rolling apparatus of claim 1 wherein the guide surfaces comprise bearing surfaces on the arm and the one rolling head that substantially stay engaged with each other as the one rolling head is shifted from the open position to the closed position.

11. The rolling apparatus of claim 10 wherein the roller of the one rolling head stays approximately the same distance from the arm bearing surface as the one rolling head is shifted from the open position to the closed position.

12. The rolling apparatus of claim 1 wherein the drive comprises a hydraulic cylinder having an actuator rod with the rod being fixed to the one rolling head and extending and retracting as the one rolling head is shifted between open and closed positions.

13. The rolling apparatus of claim 1 wherein the backing portion comprises a pair of backing portions with one backing portion disposed behind the drive and the other backing portion disposed behind the other roller head.

14. A rolling apparatus for rolling a workpiece rotatable about a rotational axis, the rolling apparatus comprising:
   a rolling arm;
   an arm support for supporting the rolling arm to allow the arm to follow the workpiece as it rotates for being rolled;
   a first rolling head mounted on the rolling arm and including at least one roller to engage the workpiece and apply pressure thereto during a rolling operation;
   a second rolling head mounted on the rolling arm spaced from the first rolling head and including at least one roller to engage the workpiece and to apply pressure thereto during a rolling operation;
   a drive associated with the rolling arm for shifting one of the first and second rolling heads relative to the other rolling head between an open position to provide clearance between the heads for a workpiece bearing to be rolled and a closed position for undertaking the rolling operation;
   guide surfaces of the arm and the one rolling head that guide the shifting of the one rolling head by the drive from the open position to the closed position with the guide surface of the one rolling head engaged with the guide surface of the arm when the one rolling head is shifted to the closed position wherein the arm support comprises a lever having spaced ends with one end pivotally connected to the rolling arm for pivoting of the rolling arm in one direction, and
   an axial shift assembly to which the other end of the arm is pivotally connected for pivoting of the lever arm in another direction.

15. A rolling apparatus for rolling a workpiece rotatable about a rotational axis, the rolling apparatus comprising:
a rolling arm;
an arm support for supporting the rolling arm to allow the arm to follow the workpiece as it rotates for being rolled;
a first rolling head mounted on the rolling arm and including at least one roller to engage the workpiece and apply pressure thereto during a rolling operation;
a second rolling head mounted on the rolling arm spaced from the first rolling head and including at least one roller to engage the workpiece and to apply pressure thereto during a rolling operation;
a drive associated with the rolling arm for shifting one of the first and second rolling heads relative to the other rolling head between an open position to provide clearance between the heads for a workpiece bearing to be rolled and a closed position for undertaking the rolling operation;
guide surfaces of the arm and the one rolling head that guide the shifting of the one rolling head by the drive from the open position to the closed position with the guide surface of the one rolling head engaged with the guide surface of the arm when the one rolling head is shifted to the closed position, wherein the first and second rolling heads are at one end of the rolling arm; and
a counterweight mounted on an opposite end of the rolling arm to counterbalance the arm.

16. The rolling apparatus of claim 15 wherein the arm support comprises a pivoted lever which is pivotally connected to the rolling arm between the rolling heads and the counterweight.

17. A rolling apparatus for rolling a workpiece rotatable about a rotational axis, the rolling apparatus comprising:
a rolling arm;
an arm support for supporting the rolling arm to allow the arm to follow the workpiece as it rotates for being rolled;
a first rolling head mounted on the rolling arm and including at least one roller to engage the workpiece and apply pressure thereto during a rolling operation;
a second rolling head mounted on the rolling arm spaced from the first rolling head and including at least one roller to engage the workpiece and to apply pressure thereto during a rolling operation;
a drive associated with the rolling arm for shifting one of the first and second rolling heads relative to the other rolling head between an open position to provide clearance between the heads for a workpiece bearing to be rolled and a closed position for undertaking the rolling operation; and
guide surfaces of the arm and the one rolling head that guide the shifting of the one rolling head by the drive from the open position to the closed position with the guide surface of the one rolling head engaged with the guide surface of the arm when the one rolling head is shifted to the closed position,
wherein the drive comprises a hydraulic cylinder having an actuator rod with the rod being fixed to the one rolling head and extending and retracting as the one rolling head is shifted between open and closed positions and the cylinder has a thin and relatively tall construction to include multiple bores and drive pistons therein.

18. A rolling apparatus for rolling a workpiece rotatable about a rotational axis, the rolling apparatus comprising:
a rolling arm;
an arm support for supporting the rolling arm to allow the arm to follow the workpiece as it rotates for being rolled;
a first rolling head mounted on the rolling arm and including at least one roller to engage the workpiece and apply pressure thereto during a rolling operation;
a second rolling head mounted on the rolling arm spaced from the first rolling head and including at least one roller to engage the workpiece and to apply pressure thereto during a rolling operation;
a drive associated with the rolling arm for shifting one of the first and second rolling heads relative to the other rolling head between an open position to provide clearance between the heads for a workpiece bearing to be rolled and a closed position for undertaking the rolling operation; and
guide surfaces of the arm and the one rolling head that guide the shifting of the one rolling head by the drive from the open position to the closed position with the guide surface of the one rolling head engaged with the guide surface of the arm when the one rolling head is shifted to the closed position, wherein the rolling heads in the open position define a generally upwardly opening jaw to allow the arm to be lowered for workpiece loading and raised to position the rolling heads on either lateral side of the workpiece bearing for undertaking the rolling operation.

19. The rolling apparatus of claim 18 wherein the arm support includes a pivotal support member that is pivotally attached to the arm to support the arm to extend generally in a horizontal direction with the support member extending generally in a vertical direction.

20. The rolling apparatus of claim 19 wherein the pivotal support member and the rolling arm include a pivot connection therebetween with the first and second rolling heads on one side of the pivot connection; and
a counterweight attached to the arm at the other side of the pivot connection to keep the rolling arm generally extending in the horizontal direction.

21. A rolling apparatus for rolling a workpiece rotatable about a rotational axis, the rolling apparatus comprising:
a rolling arm;
an arm support for supporting the rolling arm to allow the arm to follow the workpiece as it rotates for being rolled;
a first rolling head mounted on the rolling arm and including at least one roller to engage the workpiece and apply pressure thereto during a rolling operation;
a second rolling head mounted on the rolling arm spaced from the first rolling head and including at least one roller to engage the workpiece and to apply pressure thereto during a rolling operation;
a drive associated with the rolling arm for shifting one of the first and second rolling heads relative to the other rolling head between an open position to provide clearance between the heads for a workpiece bearing to be rolled and a closed position for undertaking the rolling operation;
guide surfaces of the arm and the one rolling head that guide the shifting of the one rolling head by the drive from the open position to the closed position with the guide surface of the one rolling head engaged with the guide surface of the arm when the one rolling head is shifted to the closed position, wherein the arm support comprises a pivotal support member; and a frame support that extends axially to allow the pivotal support member and the rolling arm supported thereby to be shifted axially substantially parallel to the workpiece rotational axis.

22. The rolling apparatus of claim 21 wherein the pivotal support member includes spaced ends with one end being pivotally connected to the rolling arm; and a suspension member supported for axial shifting along the frame support and to which the other end of the pivotal support member is pivotally connected.

* * * * *